United States Patent [19]
Arora et al.

[11] Patent Number: 5,911,145
[45] Date of Patent: Jun. 8, 1999

[54] HIERARCHICAL STRUCTURE EDITOR FOR WEB SITES

[75] Inventors: Samir Arora, San Jose; Gagan Arora, Santa Clara, both of Calif.; Rajagopal Lakshminarayan, Lafayette, Ga.; Gregory Brown, Sumter, S.C.; Martin Fried-Nielsen, Santa Cruz, Calif.; Clement Mok; David Kleinberg, both of San Francisco, Calif.

[73] Assignee: RAE Technology, Inc., Redwood City, Calif.

[21] Appl. No.: 08/687,971

[22] Filed: Jul. 29, 1996

[51] Int. Cl.⁶ ...................................................... G06T 3/00
[52] U.S. Cl. .......................... 707/514; 707/513; 707/501; 707/517; 345/334; 345/335; 345/348; 345/356
[58] Field of Search .................................... 707/500, 501, 707/514, 517, 513; 345/339, 348–349, 333, 334, 335, 356, 357; 395/200.33, 200.48

[56] References Cited

U.S. PATENT DOCUMENTS

| | | | |
|---|---|---|---|
| 5,446,837 | 8/1995 | Motoyama et al. | 707/514 |
| 5,632,022 | 5/1997 | Warren et al. | 707/501 X |
| 5,634,062 | 5/1997 | Shimizu et al. | 707/501 |
| 5,634,095 | 5/1997 | Wang et al. | 345/326 |
| 5,644,736 | 7/1997 | Healy et al. | 345/357 X |
| 5,644,740 | 7/1997 | Kiuchi | 345/357 |
| 5,701,137 | 12/1997 | Kiernan et al. | 345/357 X |
| 5,745,360 | 4/1998 | Leone et al. | 707/513 X |
| 5,748,186 | 5/1998 | Raman | 345/302 |

FOREIGN PATENT DOCUMENTS

WO 94/28480  12/1994  WIPO .

OTHER PUBLICATIONS

Adobe SiteMill User Guide, version 1.0, 1995, see pp. 1–129.
Rupley, "FrontPage gets a Microsoft face–life", PC Magazine Online, taken from http://www.zdnet.com.au/pcmag/news/trends/t960408b.htm, Apr. 8, 1996.
Mullin, "Vermeer lets Web authors skip the programming", Web Week, vol. 1 No. 4, Aug. 1995, taken from http://www.internetworld.com/print/1995/08/01/news/vermeer.html.
M. Rosenthal, "Adobe SiteMill 1.0," reprinted from Web Developer Magazine, vol. 2 No. 2 May/Jun. 1996, http://www.webdeveloper.com/categories/management/management_reviews_site6/2/98.ml, 6 pages.
"Weaving Your Web," http:/www/zdnet.com/macuser/mu_0896/sitemanage.html, 2 pages (plus 2 pages of graphics cited in the article) copyright 1996.
"SiteMill 2.0 Features," available from Adobe Systems, Inc., 2 pages, publication date unknown.
Book entitled *Windows 95 for Dummies* by Andy Rathbone, published by IDG Books Worldwide, Inc. (1995), pp. 234–235.
Howlett, "How to build your own Web site", PC User, n274, pp. 41(3), Jan. 1996.
Nie, "Microsoft (the FrontPage 1.1 Web authoring/management software)", Computer Reseller News, n689, pp. 134(2), Jun. 1996.

(List continued on next page.)

*Primary Examiner*—Joseph H. Feild
*Attorney, Agent, or Firm*—Graham & James LLP

[57] ABSTRACT

A method and apparatus for a structure editor implementing a "top-down" approach to designing a Web page. The user uses a "drag and drop" interface to add, delete, and move display elements to define the hierarchy of the site and to define the layout of each page in the site. The present invention automatically generates a layout for each page. This layout contains display elements that represent the links between pages of the site. The present invention automatically adds, removes, and deletes the appropriate links between the pages of the site as the user moves display elements. After the user has defined the hierarchy of the site and the layout of each page in the site, the user "publishes" the site. The publish function automatically generates HTML for each page of the site in accordance with the display elements of each page, yielding true WYSIWYG pages for the site.

48 Claims, 44 Drawing Sheets

OTHER PUBLICATIONS

Rigney, "Microsoft FrontPage (Web authoring software)", PC Magazine, v15 n8, pp. 117(3), Apr. 1996.

Adobe SiteMill User Guide, version 1.0, 1995.

Taylor, "Adobe SiteMill a good remedy for tangled Webe sites", MacWeek Reviews, v 10, n12, Mar. 1996.

Rupley, "FrontPage gewts a Microsoft face–lift", PC Magazine—Trends Online (www.zdnet.com.au/pcmag/news/trends/t960408b.htm, Apr. 1996.

Mullin, "Vermeer lets Web authors skip the programming", Web Week, v 1, n 4 (www.internetworld.com/print/1995/08/01/news/vermeer.html, Aug. 1995.

Raynovich, "New Web tool gets smart", LAN Times Online (www.uworld.com/lantimes/95nov/511a053b.html, Nov. 1995.

Bethoney, "Making quick work of Web pages", PC Week, v13 n10, p63(1), Mar. 1996.

Shankar, "NetDynamics serves data to Web", InfoWorld, v18, n30, plW1(1), Jul. 1996.

Bock, "Vermeer Technologies facilitates home page development", Distributed Computing Monitor, v10, n9, pS5(1), Sep. 1995.

"Publishing on the World Wide Web", Seybold Report on Publishing Systems, v25, n1, p8(11), Sep. 1995.

Levitt, "Mangaging your Web site", InformationWeek, n567, p62(5), Feb. 1996.

Rose, "HTML options soar as Web catches fire", Computer Reseller News, n673, p115 (7), Mar. 1996.

Sullivan, "Netscape tames wild Web: LiveWire Pro ropes in large sites and JavaScript applications", PC Week, v13 n18, p113(1), May, 1996.

Article by Malcolm Gladwell, entitled "Just Ask For It, The Real Key To Technological Innovation," published in The New Yorker on Apr. 7, 1997, pp. 45–49.

Mag–net FrontPage Lesson entitled "Using Microsoft FrontPage," URL=http://130.194.180.26/multimedia/mag–net_frontpage.htm and URL=http://130.194.180.26/multimedia/frontpage_explorer_outline.htm, last edited on Sep. 26, 1996.

"Microsoft FrontPage Top Ten FAQ," URL=http://www.okonline.com/topten/fpfaq.htm, pp. 1–6 (Publication date unknown).

Article by Edward Mendelson entitled "Create High–powered Web Sites Without Writing HTML," published in PC Magazine Online on Sept. 10, 1996, URL=http://search.zdnet.com/pcmag/iu/author/wysiwyg/msfpag11.htm, pp. 1–3.

FrontPage Explorer Link view, URL=http://130.194.180.26/multimedia/frontpage_explorer_link.htm, p. 1 of 1 (Publication date unknown).

FrontPage Explorer—Import File command, URL=http://130.194.180.26/multimedia/frontpage_import_file.htm, p. 1 of 1 (Publication date unknown).

FrontPage Explorer—Using the FP Editor, URL=http://130.194.180.26/multimedia/frontpage_show_editor.htm, p. 1 of 1 (Publication date unknown).

FrontPage Explorer Tools Recalculate Links, URL=http://130.194.180.26/multimedia/frontpage_explorer_recalculate_links.htm, p. 1 of 1 (Publication date unknown).

FrontPage—Start the Explorer first, URL=http://130.194.180.26/multimedia/fronpage_start_here.htm, p. 1 of 1 (Publication date unknown).

FrontPage Editor—Making Hypertext links, URL=http://130.194.180.26/multimedia/frontpage_making_links.htm, p. 1 of 1, (Publication date unknown).

FrontPage—Edit Link Tabs, URL=http://130.194.180.26/multimedia/frontpage_edit_link_tabs.htm, p. 1 Of 1 (Publication date unknown).

Article by Ben Goodman entitled "Microsoft FrontPage 1.1WYSIWYG Web Authoring," Sep. 1996, URL=http://www5.zdnet.com/cshopper/content/9609/cshp0027.html, pp. 1–3.

Article entitled "Microsoft FrontPage 97 Improves HTML Editor, Web Authoring," Dec. 1996 Issue of PC World, URL=http://www.pcworld.com/software/internet_www/articles/dec96/1412p084a.html, pp. 1 and 2.

Adobe Technical Support entitled "HTML Extensions in PageMill 2.0," copyright ©1998, URL=http://www.adobe-.com/supprtservice/custsupport/TECHGUIDE/PMILL/pmill_extens.html, pp. 1–5 (Publication date unknown).

Adobe Technical Support entitled "PageMill 2.0 Product Announcement Press Release," listing a date of May 12, 1997 and copyright ©1998, URL=http://www.adobe.com/supportservice/custsupport/NOTES/28ba.htm, pp. 1–3.

Adobe Technical Support entitled "PageMill 2.0 Press Release," listing a date of Apr. 22, 1996 and copyright ©1998, URL=http://www.adobe.com/supportservice/custsupport/NOTES/2102.htm, pp. 1–3.

Article by Jeff Jurvis entitled "WYSIWYG Web Design," Oct. 28, 1996, pp. 64 and 66.

Article by Kamini Ramani entitled "A Smarter Way to Build Web Sites:NetObjects Fusion Software Addresses Critical Need of Web Site Builders," Jul. 29, 1996, pp. 1–3.

Article by Herb Bethoney entitled "PageMill helps novice users create Web pages," Dec. 4, 1995, pp. 1 and 2.

Article by Arturo Crespo and Eric A. Bier entitled "WebWriter: A browser–based editor for constructing Web applications," May 1996, pp. 1291–1306.

Article by Nikos Drakos entitled "From text to hypertext: A post–hoc rationalisation of LaTeX2HTML," Nov. 1994, pp. 215–224.

Article by Rex Baldazo entitled "Battle of the Web Site Builders," Jul. 1996, pp. 157 and 158.

Article by B. Rousseau entitled "Publishing on the Web," Oct. 25, 1995, pp. 279–293.

Glass, "Pipeline," InfoWorld, v17 n40, p. 45, Oct. 1995.

Miller et al., "Create your own web page," PC/Computing, v8 n9, pp. 171–176, Sep. 1995.

Vermeer: "any server, any time" Release 1.0 v95 n9, pp. 12–13, Sep. 1995.

Gralla, "Browse the Internet and newsgroups, create a Web page, and keep viruses from Win 95," Computer Shopper, v15 n12, p. 658, Dec. 1995.

"Netscape readies Navigator 2.0," The Seybold Report on Desktop Publishing, v10 n21, p. 7, Nov. 1995.

Harvey, "Working on the web: HTML authoring tools," Computer Shopper, v15 n11, p528(8), Nov. 1995.

Mendelson, "HoTMetal PRO," PC Magazine, v14 n17, p205(2), Oct. 1995.

Collins, "HTML first lesson: shareware and other useful tools," PC Magazine, v14 n17, p210(2), Oct. 1995.

Hawn, "A preview of Ceneca's hot Web tools," MacWorld, v12, n , 39(2), Nov. 1995.

Adobe PageMill 1.0 "A powerful Web Authoring Program for the HTML–Challenged," http://www.peimag.com/pagemill.htm, pp. 1–4, 1996 (Publication date unknown).

"Ceneca pioneers easy–to–use authoring and integrated site management tools for world wide web," http://www.ceneca-.com/PressRelease/prductAnnouunce.html, pp. 1–3, Aug. 1995.

"Silicon Graphics drives internet innovation with powerful authoring tools for 3D world wide web sites," http://sgline.epfl.ch/announce_WebMagicPro.html, Aug. 1995.

Pogue, "Claris Works 4.0," MacWorld, v12 n12, p. 62, Oct. 1995.

Laura Lemay, "Teach Yorself Web Publishing With HTML 3.0 In A Week," HTML Assistants; Editors & Converters. 1996, pp. 150–159.

Joan E. Rigdon, "Testing How Easy 'Easy' Really Is, What Marketers Mean When They Say Mom Can Do It," The Wall Street Journal, May 10, 1996.

E–Mail Dated Jul. 22, 1996, "CNET Selling Prism, Web Content Management System, To Web Content Management System, To Vignette For Commercial Development and Marketing," 1996.

Todd Woody, "Construction Site Building A Home On The Web," The Recorder, Jul. 25, 1996, p. 4.

Business Wire, THISoftware Co., Inc. Begins Delivery Of Its Internet Web Site Building And Management Software, "Business Editors/Computers & Electronics Writers," available on or before Jul. 4, 1996.

"IBM Netscape, Sun And The Rockefellers Share On Enthusiasm," The Wall Street Journal, Jul. 26, 1996, p. B3.

Internal Representation

Internal Representation

700

| Number |
|---|
| Type |
| Name |
| Collection Number |
| Parent Number |
| Next Sibling Number |
| First Child Number |
| Current Layout |
| Stacked Flag |
| Expanded Flag |
| Publish Page |
| Page Color |
| Status |
| Comments |

A Page Object/
Node
Fig. 7

Initialize

Create Node/Page

Move Node/Page

Properties Window (Site Tab)

Properties Window
(View Tab)

Collapse a branch

Expand a branch

Banner

Navigator Buttons

Navigator Buttons

Text Button

Publish
(Build HTML for all pages of site)

Build a
Normal Page

Build a
Stacked Page

Create initial HTML

Build an HTML Table

Generation of HTML for an HTML table in accordance with matrix

```
3602    <P> <A HREF = netobjects homepge URL>
            <IMG SRC=link image\ BORDER=0>
            </A>
        </P>
        </BODY>
        </HTML>
```

Generate final HTML
Fig. 36

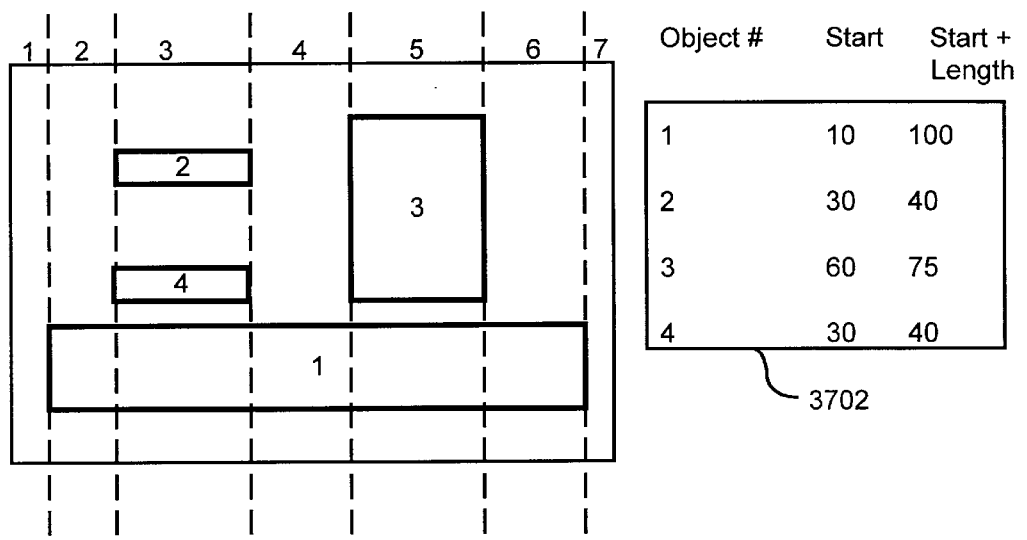
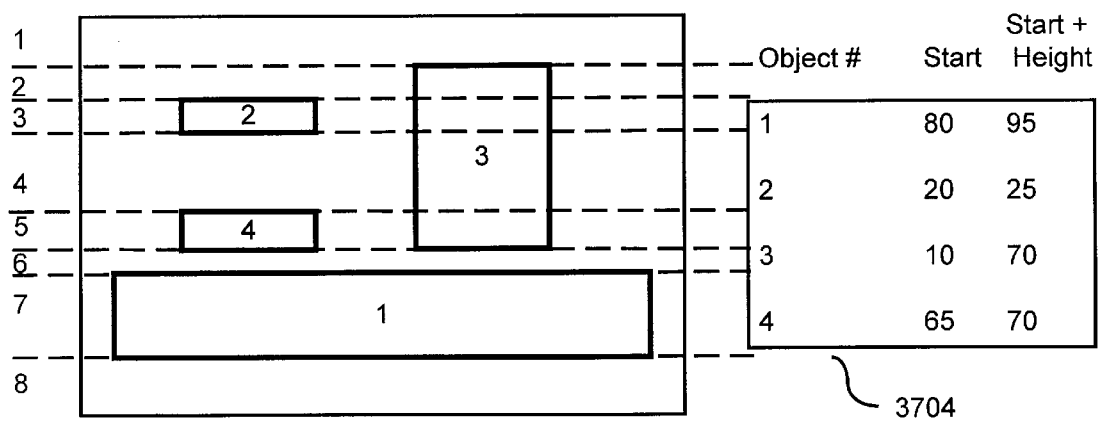
Fig. 37

| Object # | Start | Start + Length | | Object # | Start | Start + Height |
|---|---|---|---|---|---|---|
| 1 | 10 | 100 | | 1 | 80 | 95 |
| 2 | 30 | 40 | | 2 | 20 | 25 |
| 3 | 60 | 75 | | 3 | 10 | 70 |
| 4 | 30 | 40 | | 4 | 65 | 70 |
⇩ Sort and remove duplicates          ⇩ Sort and remove duplicates
Column Edges
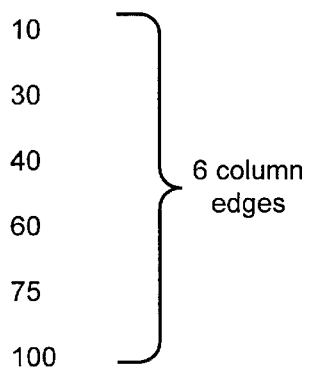
6 column edges: 10, 30, 40, 60, 75, 100
Row Edges
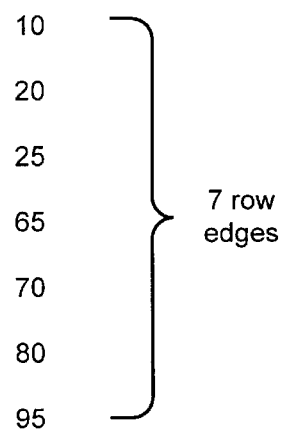
7 row edges: 10, 20, 25, 65, 70, 80, 95
⇩ Determine width of each column          ⇩ Determine height of each row
column widths
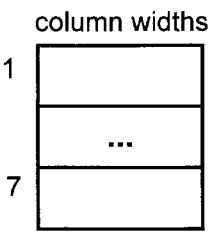
row heights
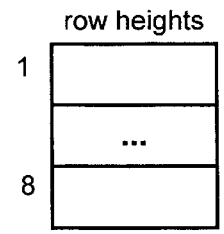
Fig. 38

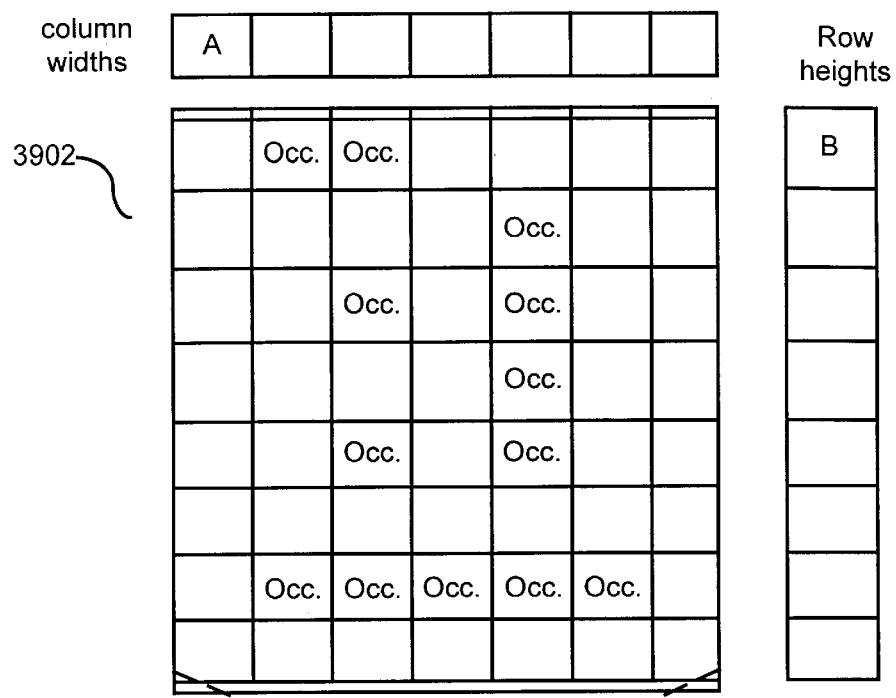
Fig. 40
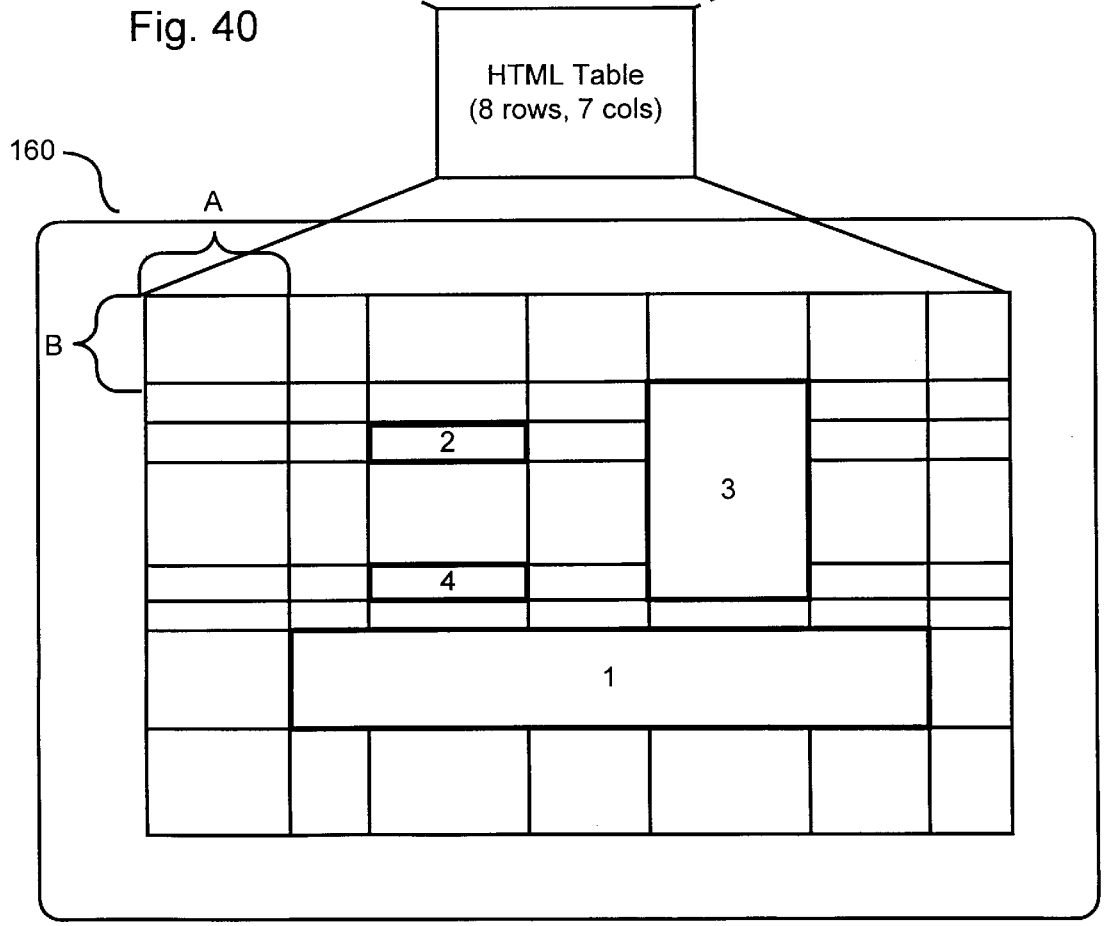

HIERARCHICAL STRUCTURE EDITOR FOR WEB SITES

RELATED APPLICATION

The following application is related to the subject application and is herein incorporated by reference: U.S. application Ser. No. 08/087,971, filed Jul. 20, 1996, pending of Samir Arora et al, filed concurrently herewith, and entitled "Draw-Based Editor for Web Pages."

APPENDIX

Appendix A provides an example of computer code for a draw object for text and a draw object for an image. This Appendix forms a part of the specification and is herein incorporated by reference.

FIELD OF THE INVENTION

This application relates to the World Wide Web and, in particular, to a method and apparatus for managing elements of a World Wide Web site having multiple pages.

BACKGROUND OF THE INVENTION

The past several years have seen an explosive growth of the World Wide Web ("the Web"). The Web is built around a network of "server" computers, which exchange requests and data with each other using the hypertext transfer protocol ("http"). A human designer designs the layout of a Web page, which is then specified using HTML ("Hypertext Markup Language"). Several versions of HTML are currently in existence. Examples include HTML versions 2.0 and 3.0, as specified by the WWW Consortium of MIT. Netscape Communications Corp. has specified additional HTML features that extend the HTML language, including forms and tables.

A user views a Web page using one of a number of commercially available "browser" programs. The browser submits an appropriate http request to establish a communications link with a Web server of the network. A typical http request references a Web page by its unique Uniform Resource Locator ("URL"). A URL identifies the Web server hosting that Web page, so that an http request for access to the Web page can be routed to the appropriate Web server for handling. Web pages can also be linked graphically to each other.

The HTML to describe a Web page is often created by hand by a human being. If the design of the page changes, the corresponding HTML must be rewritten, which is an exacting process. Although several conventional HTML editors exist, these editors only allow the user to specify certain elements of a page and still require the user to enter HTML code. Conventional HTML editors allow the user to specify the page content and general layout, but do not provide the user with "What You See Is What You Get" (WYSIWYG) capability. Thus, the pages generated by conventional HTML editors look different when viewed by different browsers.

A Web "site" consists of a "homepage" and several other related pages. Each page has corresponding HTML that describes the appearance and function of the page. For example, the HTML for the homepage usually contains links to one or more of the other pages and the other pages often contain respective links back to the homepage. When the user clicks on a link of the displayed homepage, the browser requests and displays the linked-to page. Each link must be designed and coded into the HTML for the page. Thus, for example, when a human designer decides to remove a link between the homepage and another page, the HTML for the homepage must be changed to reflect the removed link. This process is exacting and requires that the user manually change the link. Moreover, if the linked-to page has another link back to the homepage, that link may also need to be changed.

It is usually desirable to have a consistent style for all pages of a site. When the user hand codes the HTML for each page of a site, it is difficult for the user to remember to use a consistent style. In addition, if the user decides to change the style of a site, each page must be changed individually.

SUMMARY OF THE INVENTION

The present invention overcomes the problems and disadvantages of the prior art by using a "top-down" approach to designing a Web page. The user can use a "drag and drop" interface to move icons representing Web pages into a desired hierarchy of pages for the site. The hierarchy can, but does not necessarily represent links between the pages of the site.

The user drags and drops display elements to define the hierarchy of the site and to define the layout of each page in the site. The present invention automatically generates a layout for each page. This layout contains display elements that represent the links between pages of the site. Thus, the user does not have to manually specify links for each page. As the user drags and drops icons to add, move, and delete pages of the site hierarchy, the present invention will automatically add, remove, and delete the appropriate links between the pages of the site. A preferred embodiment also automatically creates a banner across the top of each page that contains a user-specified page name.

After the user has defined the hierarchy of the site and the layout of each page in the site, the user "publishes" the site. The publish function automatically generates HTML for each page of the site in accordance with the display elements of each page. In the described embodiment of the present invention, the publish function generates an HTML table for each page. The number of cells in each table reflects the number and placement of display elements on a corresponding page, yielding a true WYSIWYG page for the site.

In accordance with the purpose of the invention, as embodied and broadly described herein the invention is a method of allowing a user to define a World Wide Web site having a plurality of pages with a hierarchical organization comprising the steps, performed by a data processing system, of: receiving an indication that the user wants to add a new page at a position in the site hierarchy; adding a page data structure for the new page to a tree of other page data structures reflecting the site hierarchy, where the page data structure is added in accordance with the position of the new page in the site hierarchy; and automatically creating in the memory a layout data structure for the new page, the layout data structure having a link in accordance with the position of the new page in the site hierarchy.

In further accordance with the purpose of this invention, as embodied and broadly described herein the invention is a method of allowing a user to define a World Wide Web site having a plurality of pages with a hierarchical organization comprising the steps, performed by a data processing system of: displaying a plurality of page icons in a hierarchical fashion, on a display device where the hierarchy of the page icons reflects the hierarchal organization of the pages; receiving an indication that the user has dragged one of the page icons in the site hierarchy from an old position to a new position; displaying, in accordance with the new position, an indicator on a second page icon indicating where the new page icon would be added in the site hierarchy; receiving an indication that the user wants to move the new page to the new position; removing the page icon from the old position on the display device; displaying the page icon in proximity to the indicator; and moving a page object, corresponding to the moved page icon, within a tree structure in accordance with the new position of the moved page icon.

Advantages of the invention will be set forth in part in the description which follows and in part will be obvious from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 7 shows a format of a page object corresponding to a page in the site.

FIG. 36 is an example of steps performed by the structure editor to generate final HTML for a site.

FIG. 37 is an example of first steps involved in determining an HTML table size.

FIG. 38 is an example of second steps involved in determining an HTML table size.

FIG. 40 is a block diagram of how the matrix of FIG. 39 is used to generate an HTML table, which a browser uses to display a portion of a page.

DETAILED DESCRIPTION OF PREFERRED EMBODIMENTS

Reference will now be made in detail to a preferred embodiment of the invention, an example of which is illustrated in the accompanying drawings. Wherever possible, the same reference numbers will be used throughout the drawings to refer to the same or like parts.

I. System Overview

Figure 1:
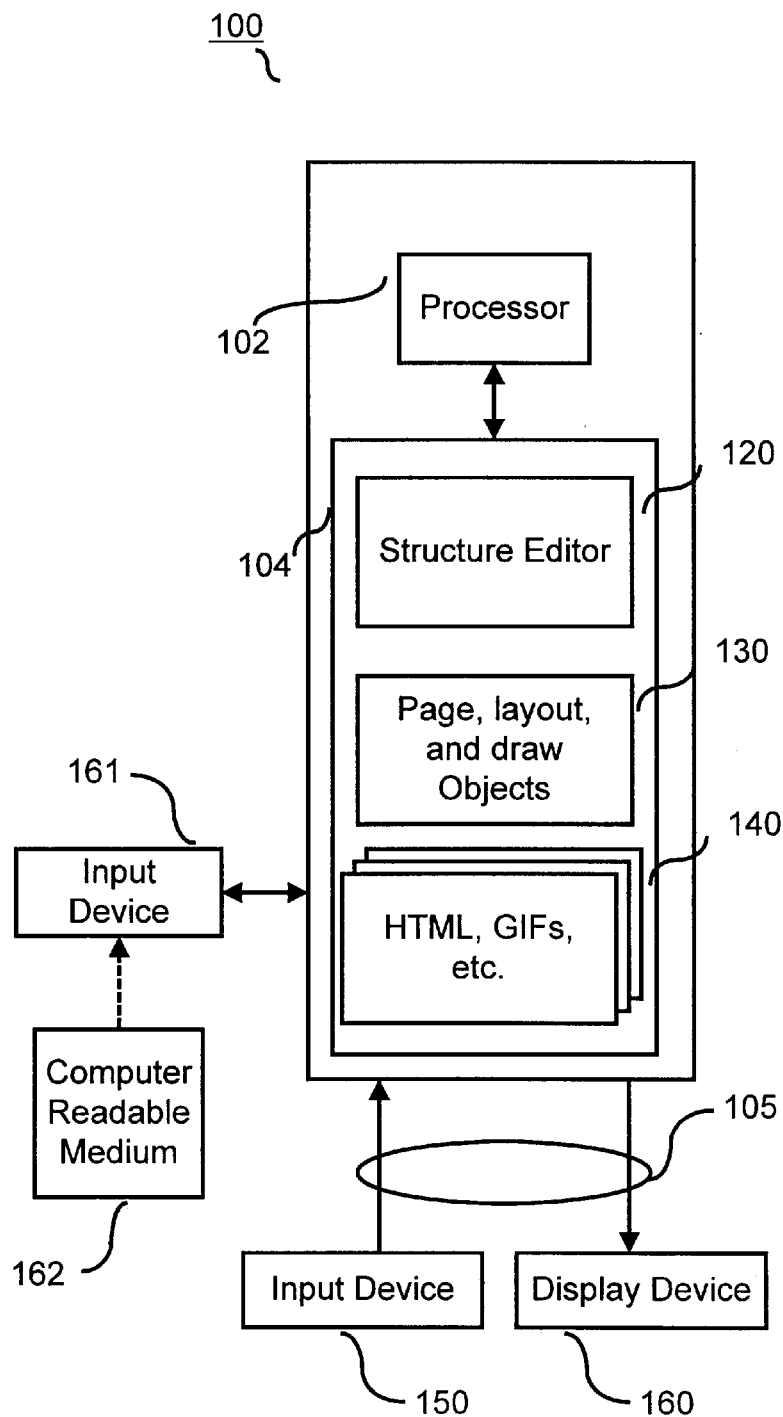
FIG. 1 is a block diagram of a computer system in accordance with a preferred embodiment of the present invention.

FIG. 1 is a block diagram of a computer system 100 in accordance with a preferred embodiment of the present invention. Computer system 100 includes a CPU 102; a memory 104; input/output lines 105; an input device 150, such as a keyboard or mouse; and a display device 160, such as a display terminal. Computer 100 also includes an input device 161, such as a floppy disk drive or CD ROM reader, that reads computer instructions and data stored on computer readable medium 162, such as a floppy disk or a CD ROM. These computer instructions are the instructions of e.g., structure editor software 120. Memory 104 includes structure editor software 120, page objects, layout objects, and draw objects 130, HTML 140, and image files 140, etc., as described in further detail below.

A person of ordinary skill in the art will understand that memory 104 also contains additional information, such as application programs, operating systems, data, etc., which are not shown in the figure for the sake of clarity. It also will be understood that computer system 100 can also include numerous elements not shown in the Figure for the sake of clarity, such as disk drives, keyboards, display devices, network connections, additional memory, additional CPUs, LANs, internet connections, input/output lines, etc.

II. Site Creation and Manipulation

The following paragraphs describe how the user creates a hierarchy of pages for a site. It will be understood that all flow charts in this document represent steps performed by processor 102 executing instructions of structure editor software 102.

Figure 2:
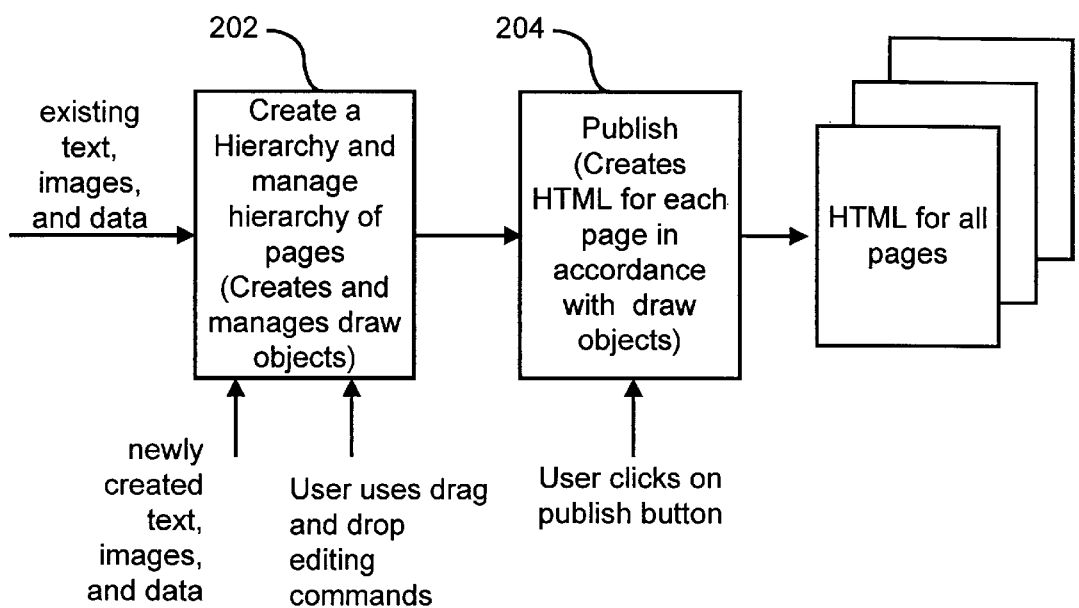
FIG. 2 is a block diagram showing input and output to structure editor software of FIG. 1.

FIG. 2 is a block diagram showing input and output to structure editor software 120 of FIG. 1. Structure editor 120 includes a portion 202 that creates and manages a hierarchy of pages and a portion 204 that publishes the pages of the site. The user uses a drag and drop interface to define the hierarchy of the site. Pages in the site can include new text and images or preexisting text and images. The user initiates publish portion 204 by clicking on a "publish" button as described below. Publish portion 204 generates a plurality of HTML pages, as described below. Each page includes one or more HTML tables that yields a WYSIWYG Web page.

Figure 3:
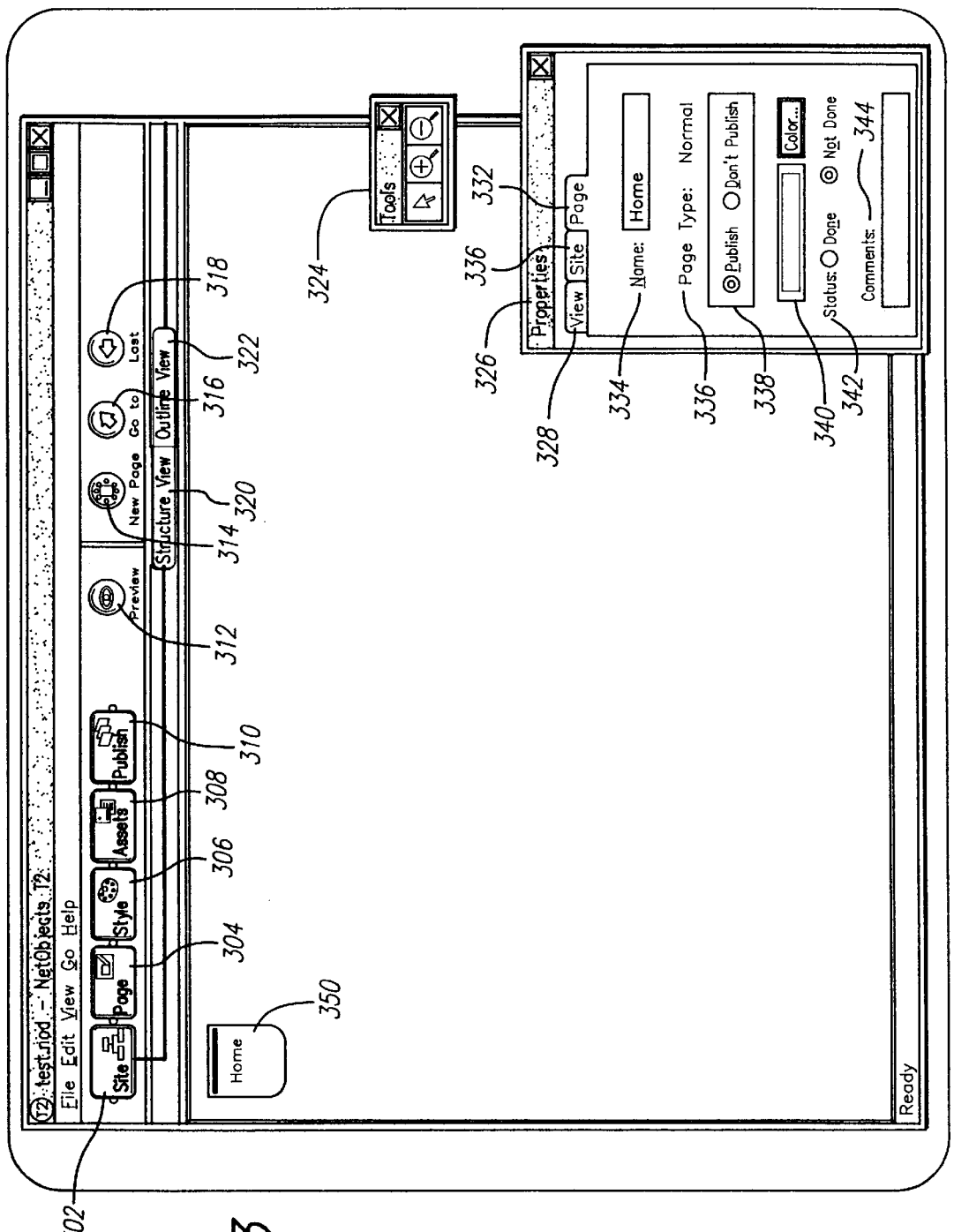
FIG. 3 shows a first display on a display device generated in accordance with the embodiment of FIG. 1, where the display shows all pages of a Web site.

FIG. 3 shows a "site view" displayed on display device 160. In the described embodiment, the display of FIG. 3 is displayed by processor 102 upon beginning execution of structure editor software 120. The site view of FIG. 3 is also displayed when the user selects Site button 302. FIG. 3 shows that the software automatically creates a node representing a "Home" page and displays an icon 350 corresponding to the home page node.

The display of FIG. 3 includes a plurality of buttons: a "Site" button 302, a "Page" button 304, a "Style" button 306, an "Assets" button 308, and a "Publish" button 310. The display also includes a "Preview" button 312, a "New Page" button 314, a "Goto" button 316, and a "Last" button 318. Each of buttons 302–314 are discussed below in turn. The Goto and Last buttons 316, 318 transfer control to a most recent display or a user-selected previous display, in a manner known to persons of ordinary skill in the art. The described embodiment keeps a "history" of execution of structure editor 120 in order to implement the Goto and Last buttons.

Figure 4:
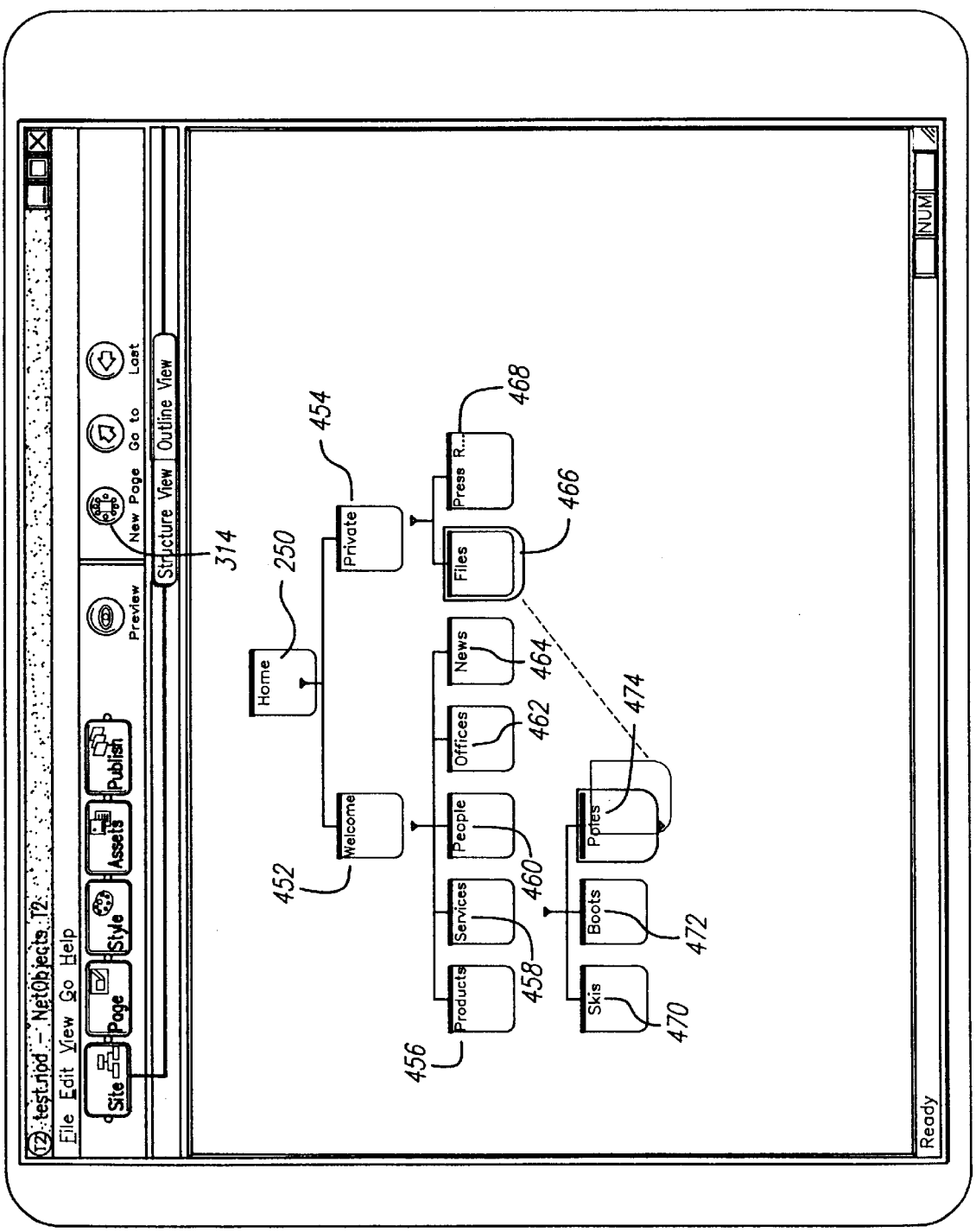
FIG. 4 shows a second display on a display device generated in accordance with the embodiment of FIG. 1, where the site has multiple pages added and one page has been moved from its original position.
Figure 6:
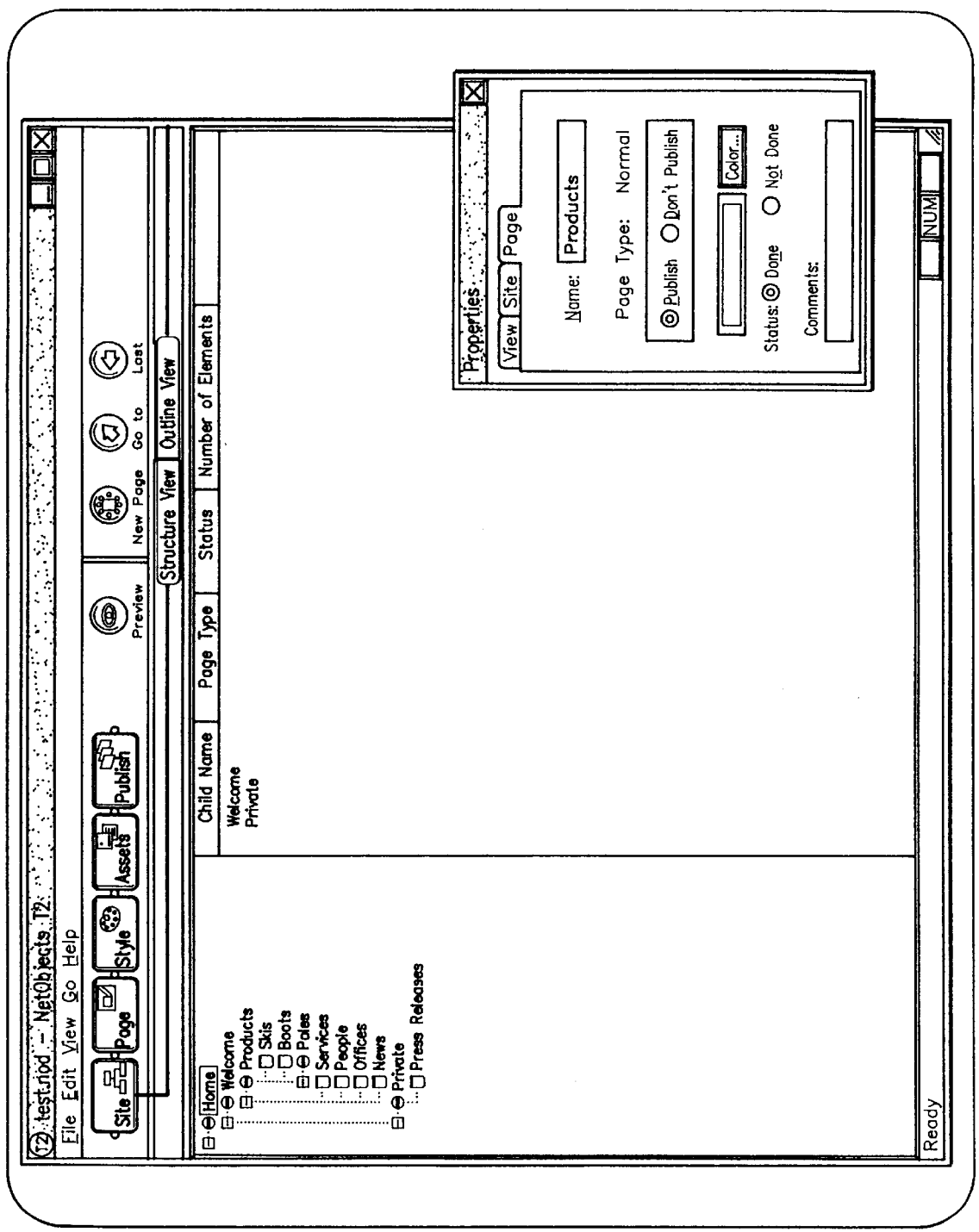
FIG. 6 shows an alternate display for the objects of FIG. 5(b).

The display of FIG. 3 further includes a "Structure View" toggle 320 and an "Outline View" toggle 322. When the user clicks on Structure View toggle 320, a display having a format of FIGS. 3 and 4 are displayed. When the user clicks on Outline View toggle 322, a display having a format of FIG. 6 are displayed. The user can drag and drop page icons in either the Structure view or the Outline view.

The display of FIG. 3 further includes a "Tools" window 324. Tools window 324 includes a "cursor" tool, and "zoom in" and "zoom out" tools, as are known in the art. Depending on the implementation used, windows are also called "dialog boxes."

The display of FIG. 3 further includes a "Properties" window 326. Properties window 326 includes three tabs: a "View" tab 328, a "Site" tab 330, and a "Page" tab 332. Properties window currently shows page properties because page tab 332 is selected. Properties window 326 includes a "Name" area 334, a "Page Type" area 336, a "Publish/Don't Publish" area 338, a "Color" area 340, a "Status" area 342, and a "Comments" area 344.

The user can "select" a page icon, such as page icon 350, in a manner known to person of ordinary skill in the art. When a page icon is selected, the values shown in Properties window 326 are values for the selected page. Thus, in FIG. 3, when "Home" page icon 350 is selected, the name field in Properties window 326 is "Home." The page type is "normal." ("Stacked pages" are discussed below). The user has indicated that the page should be published during the Publish function. The user also can indicate that the page should not be published during the publish function). The color of page icon 350 is the color indicated in Color area 340. (Note that this is different from the background color of the page itself.) The user has indicated that the status of the page is "not done." The user has not entered any comments about the page. It will be understood by persons of ordinary skill in the art that structure editor software 120 stores values corresponding to Properties window 326 and for each Properties window and Properties tab discussed herein in memory 104.

FIG. 4 shows a second display on a display device generated in accordance with the embodiment of FIG. 1, where the user has added multiple pages to the site and one page has been moved from its original position. In FIG. 4, the user has added page icons 452–474 by selecting (e.g., clicking) on New Page button 314 for each new page icon added. Each new page icon represents a new page added to the site hierarchy. The site hierarchy uses a "tree" structure. Each branch of the tree represents a "logical" (or "structural") connection between two pages. As discussed below, these logical connections may also represent links between the pages, but do not necessarily represent such links. Moreover, links between pages may exist that do not represent branches of the site hierarchy.

Figure 17:
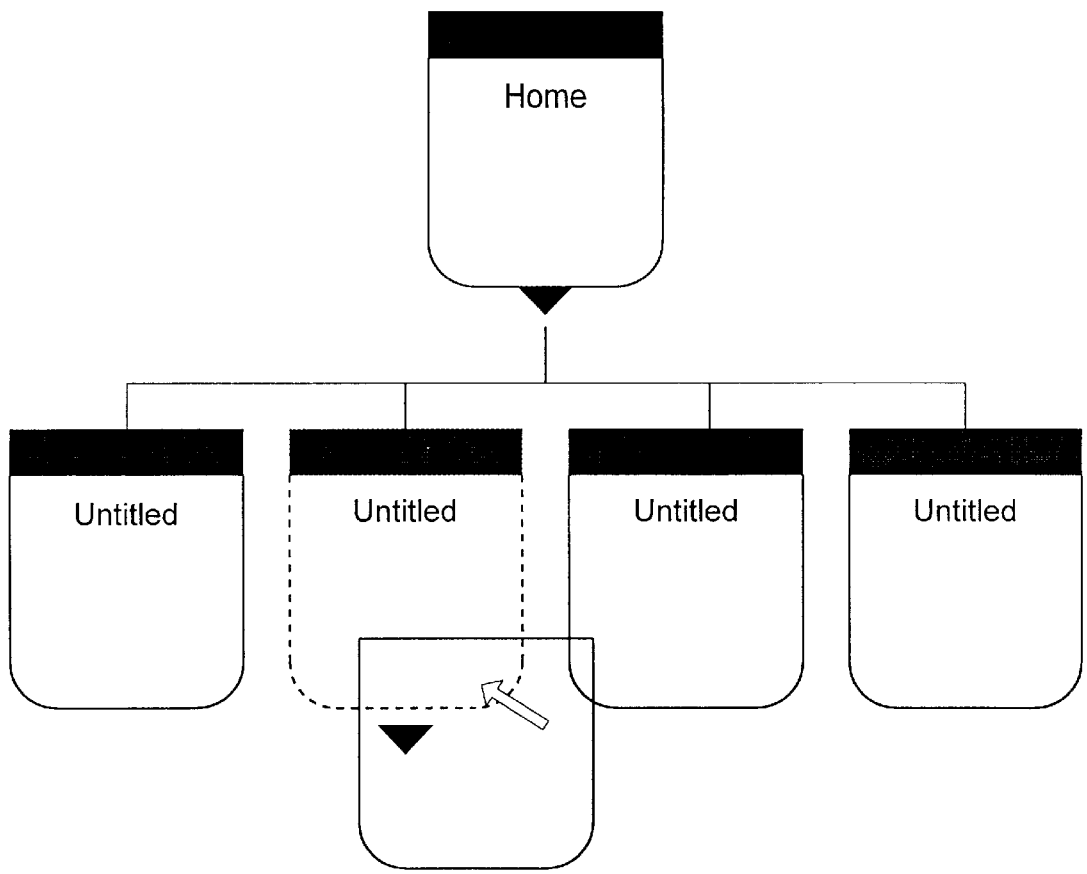
FIG. 17 shows an example of adding a child page to the site.

FIG. 4 shows a display after the user has selected page icon "Files" 466 and dragged page icon 466 on top of page icon 474. The dotted line in FIG. 4 indicates the path of the dragged page icon, but is not displayed. In the described embodiment, page icon 466 is highlighted when it is selected. When a page icon is dragged, it is represented by a dotted outline of a page icon (not shown). As shown in FIG. 4, when the user drags a first icon on top of a second icon, the first icon is displayed with an arrow indicating where the second page icon will connect to the first page icon. Thus, in FIG. 4, if the user drops page icon 466 on top of page icon 474 (and slightly below icon 474), page icon 466 will be displayed as "child" of page icon 474 (and removed from its previous display location). FIG. 17 shows another example of moving a page icon so that it becomes a child icon.

Figure 18:
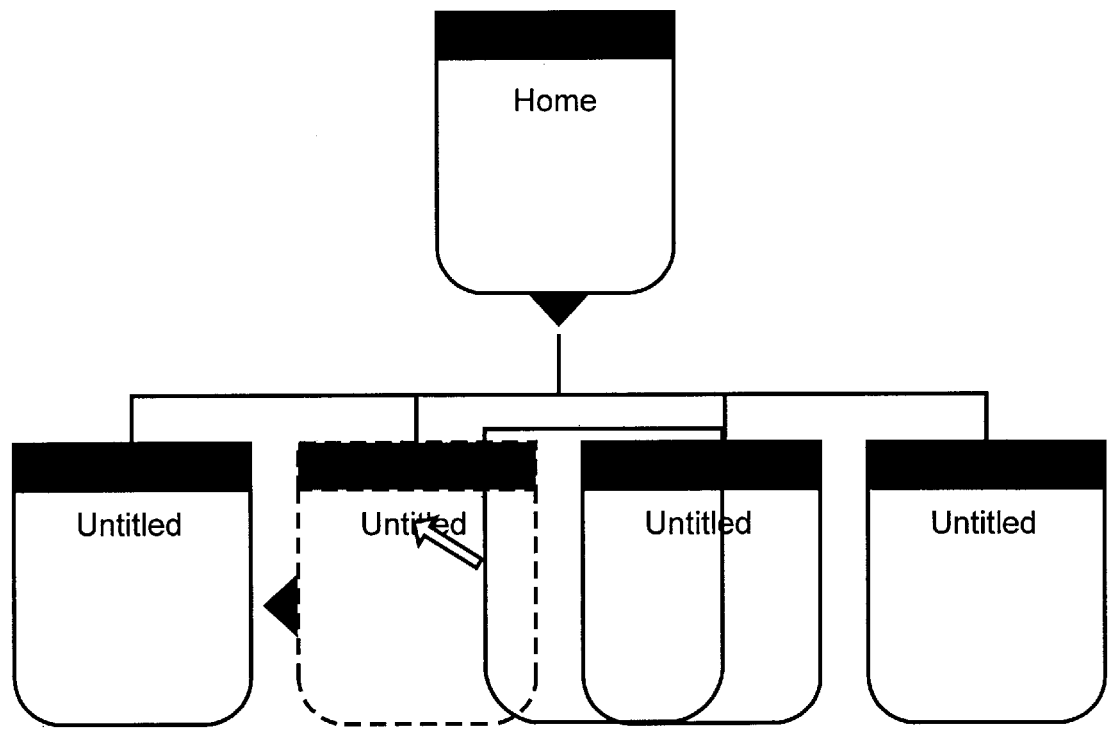
FIG. 18 shows an example of adding a sibling page to the site.

FIG. 18 shows an example of moving a page icon so that it becomes a sibling page icon. If, in FIG. 4, page icon 466 was moved to the left side of icon 474 instead of to the bottom, an arrow would appear on the left side of icon 474, indicating where the page icon 466 will connect to page icon 474 if it is dropped. Thus, in FIG. 4, if the user drops page icon 466 on top of page icon 474 (and slightly to the left, not shown), page icon 466 will be displayed as "sibling" of page icon 474 (and removed from its previous display location).

Figure 5A:
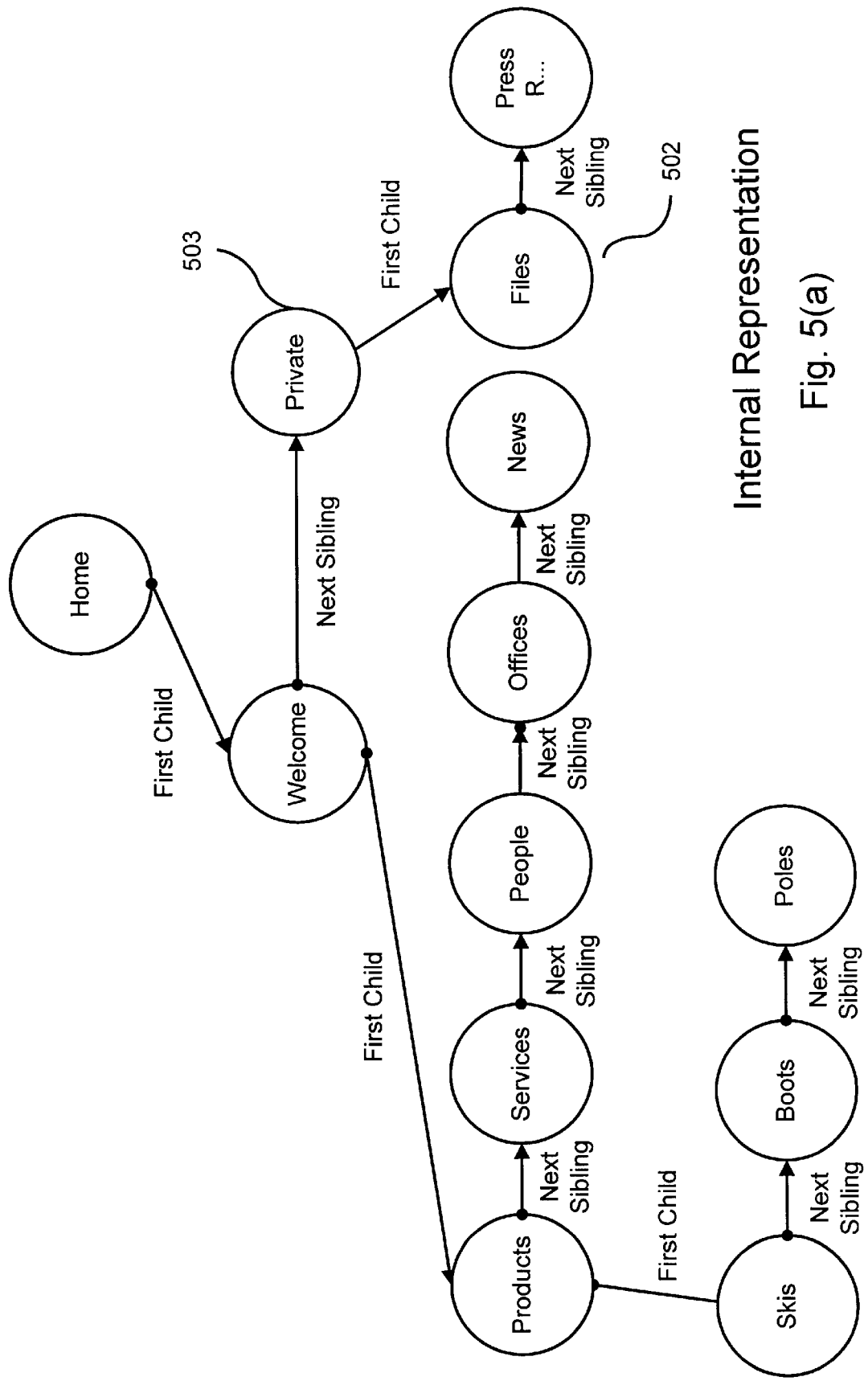
FIG. 5(a) show an example of an internal representation of page objects corresponding to the pages of FIG. 3 before the page is moved.

FIG. 5(a) show an example of an internal representation of page objects corresponding to the page icons of FIG. 4 before page icon 466 is moved. Page objects and page icons are also called "nodes." The page objects of FIG. 5(a) form a tree data structure in memory 104. Page object 502 is a child of a "Private" page object 503, since page icon 466 is a child of "Private" page icon 454. In the tree of FIG. 5(a), each node has zero or one "first children." Other children of the node are indicated as "next siblings" of the first child.

Figure 5B:
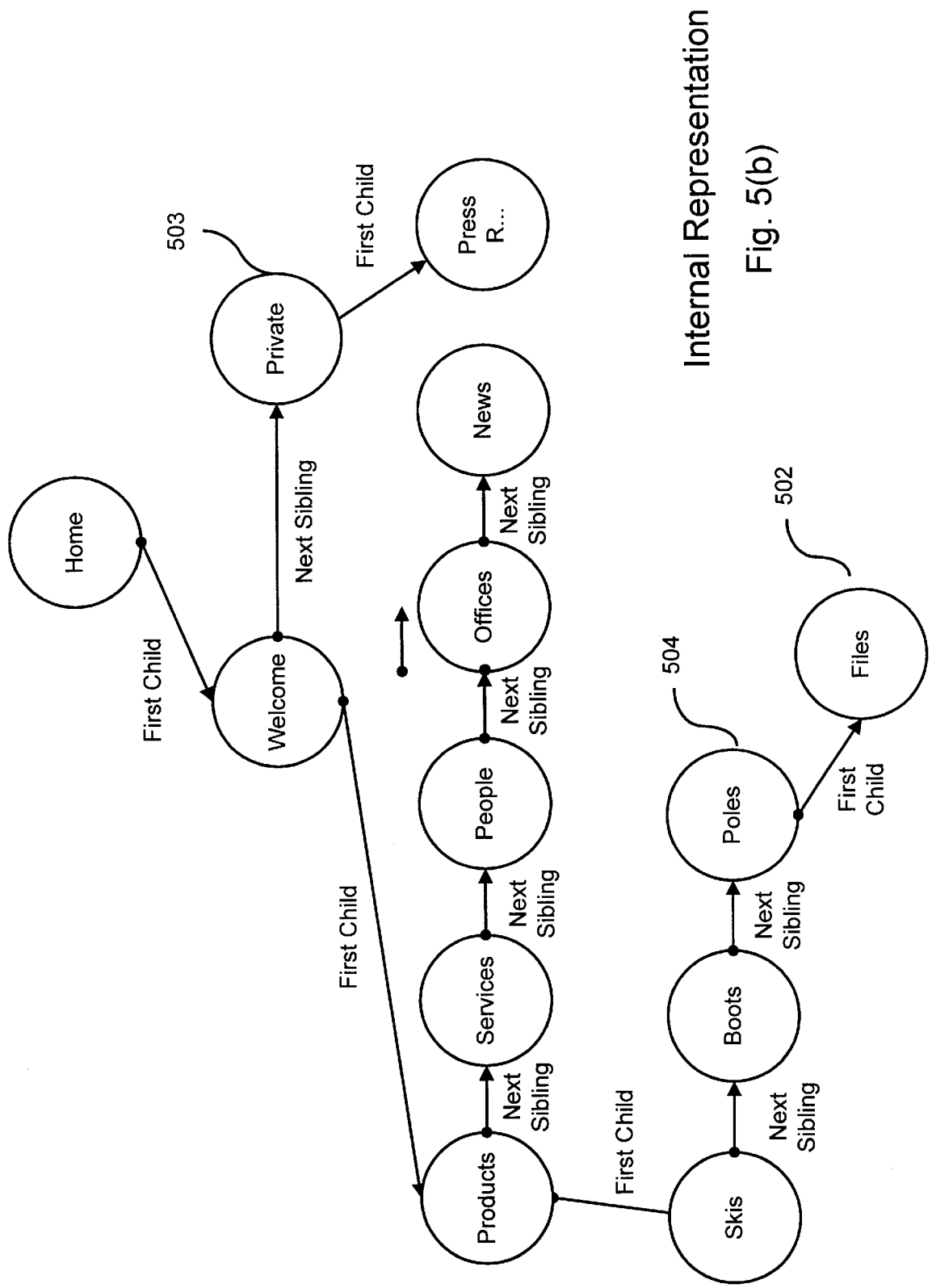
FIG. 5(b) show an example of an internal representation of objects corresponding to the page objects of FIG. 4 after the page is moved.

FIG. 5(b) show the internal representation of page objects corresponding to the page icons of FIG. 4 after page icon 466 is moved. Page object 502, which corresponds to page icon 466, is a child of page object "Poles" 504 since page icon 466 has been moved to be a child of "Poles" page icon 474.

FIG. 7 shows a format of a page object 700. Each page object of FIGS. 5(a) and 5(b) has this format. FIG. 7 shows only the information in the object, not the size or type of the information. Page object 700 includes an object number, an object type, an object name (e.g., "Products"), a collection number (currently unused), a number of a parent node/page, a next sibling number, a first child number, a pointer to a list of draw objects in a current layout of the page (discussed below), a flag indicating whether the page is a stacked page, a flag indicating whether the page is currently expanded on the display, a flag indicating whether the page is currently collapsed on the display, a flag indicating whether the page should be published when the site is published, a color of the page icon for the page, a status (e.g., "done," "not done"), and user-entered comments.

Figure 8:
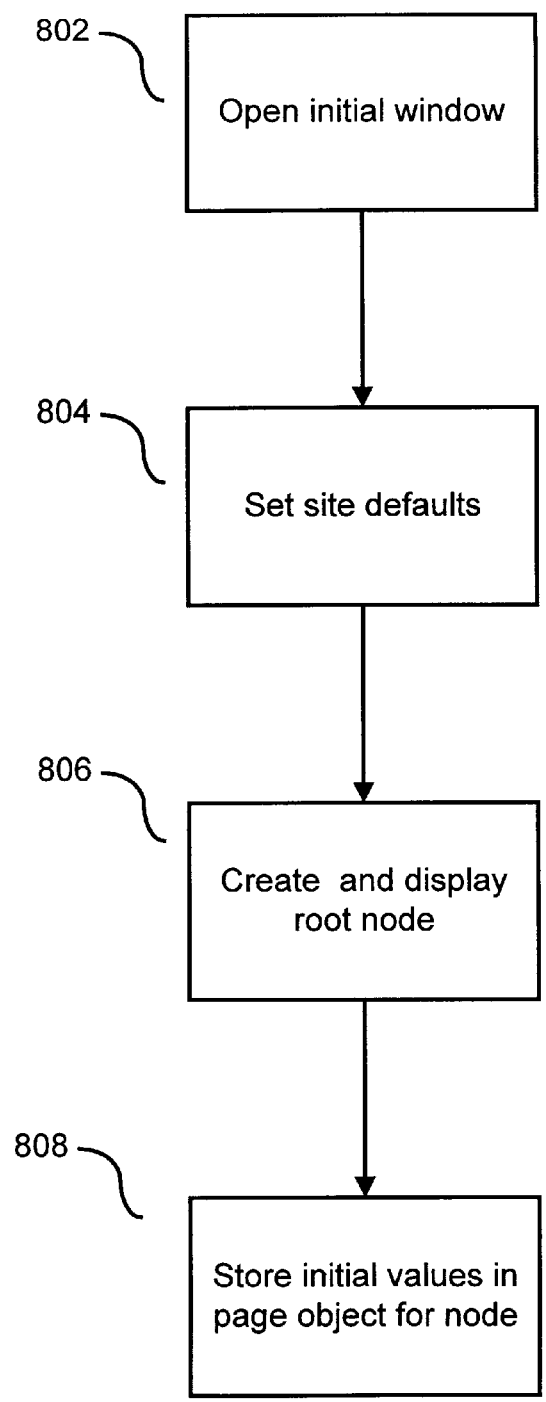
FIG. 8 is a flow chart showing initialization steps performed by the structure editor software.

FIG. 8 is a flow chart showing initialization steps performed by structure editor software 120 upon execution. Step 802 opens the initial window of FIG. 3. Step 804 sets default values for the site in memory 104. These default values include a style of the layout, header, and footer, as discussed below. Step 806 creates and displays a page object for the homepage (root node) of the site in memory 104. The created page object has a format shown in FIG. 7 and has no parent node. Step 808 stores default initial values in the root page object.

In the described embodiment, the default name is "Home". The default class is node. The default parent number, sibling number, and first child number is "0". The default layout includes a banner having the default name "Home". The stacked flag defaults to "false." The expanded flag and the publish flag default to "true." The color of the page icon defaults to a predetermined page icon color. Alternately, the each level of page icon defaults to a different predetermined color. The status defaults to "not done". The comments default to <null>.

Figure 9:
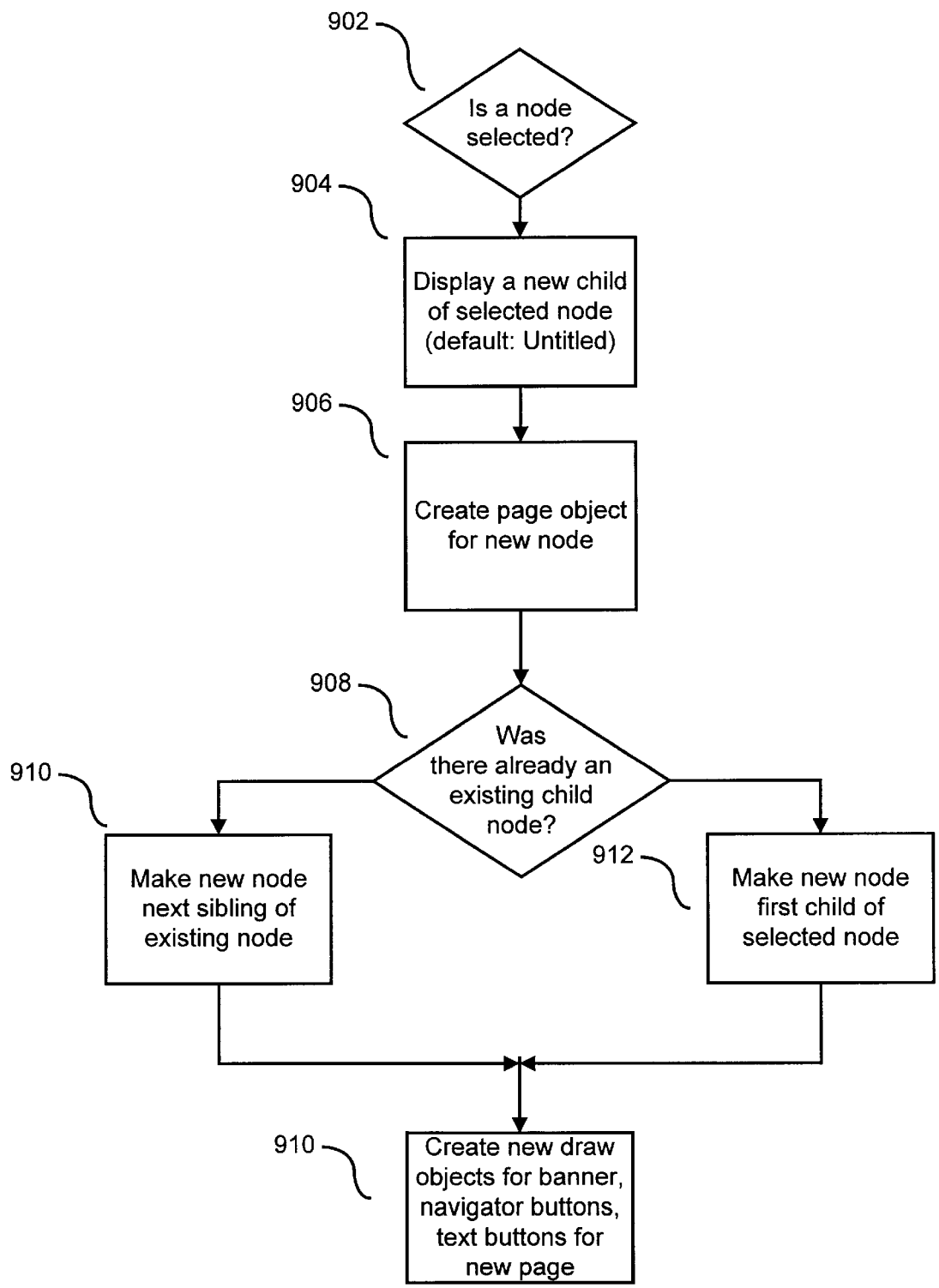
FIG. 9 is a flow chart showing steps performed by the structure editor software to create a new page in the site.

FIG. 9 is a flow chart showing steps performed by structure editor software 120 to create a new page in the site.

The steps of FIG. 9 are performed when the user selects New Page button 314 of FIG. 3. If, in step 902, the user has previously selected a page icon (also called a "node"), then processor 102 displays a new child page icon of the selected page icon in step 904. Step 906 creates a page object in memory for the new page. If the selected node already has an existing child then, in step 910, the new node is made a next sibling of the existing child node. Otherwise, in step 912, if the selected node has no children, then the new node is made a first child of the selected node. In the described embodiment, a new page is always a normal page. Creation of stacked pages is discussed in the copending application.

Figure 43:
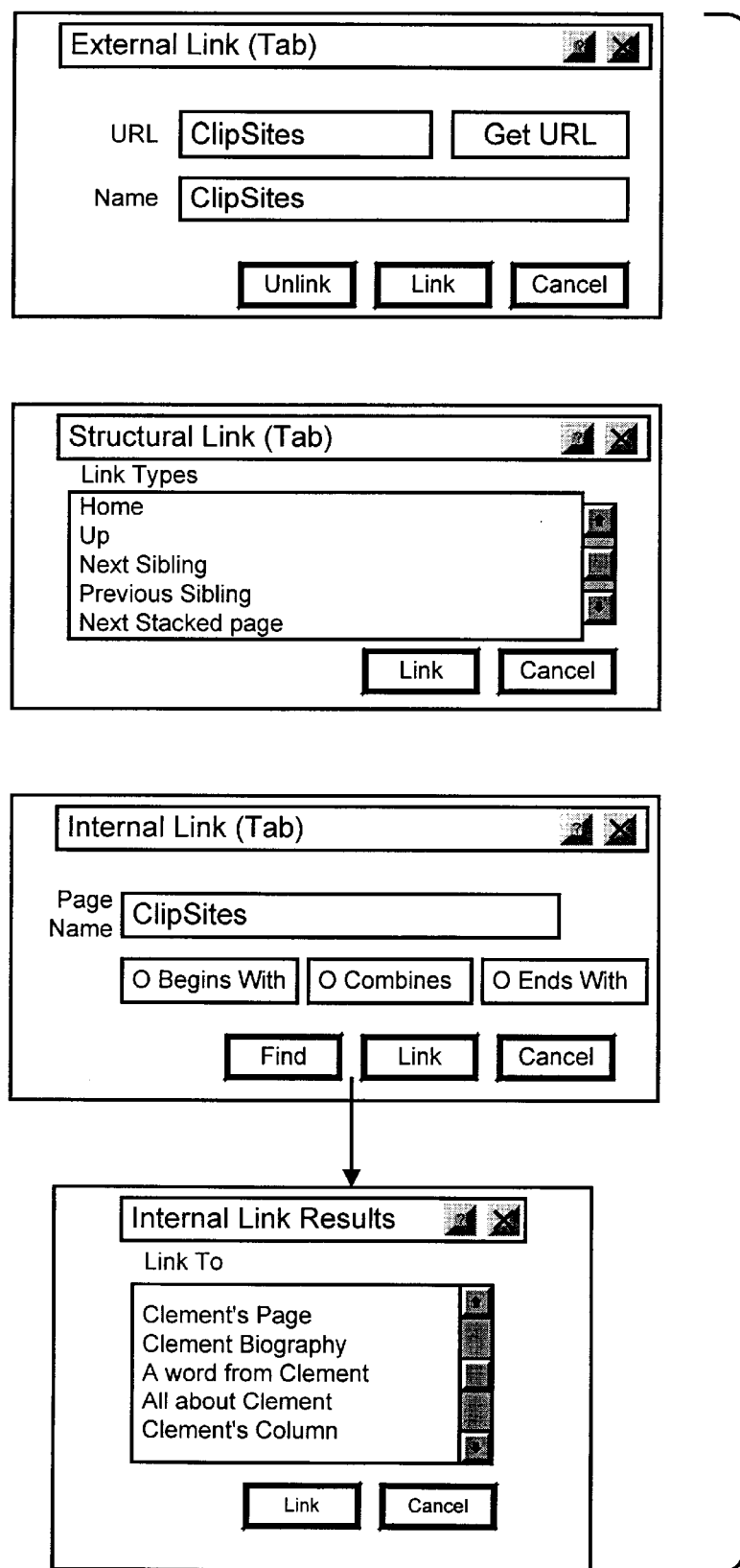
FIG. 43 shows an example of a plurality of link dialog boxes, showing a structural link, an internal link, and an external link.

In the described embodiment, whenever a new page is created, new draw objects are automatically created for that page. These draw objects represent links in the page layout to other nodes in the site. Currently links are created in the header and the footer of the new page to the homepage, to the parent node, and to the "first level nodes" (i.e., to children of the homepage). Links can also be generated for (future) children of the new page. The described embodiment automatically creates "structural links." A draw object is created for each link. A structural link represents a link to a node having a certain place in the site hierarchy, not a link to an absolute page. Thus, a page can contain a structural link to a sibling page. The actual identity of the sibling page is not determined when the draw object for the link is created. The identity of the link is created when the page containing the link is displayed, previewed or published. FIG. 43 shows an example of a plurality of dialog boxes for different types of links.

Figure 10:
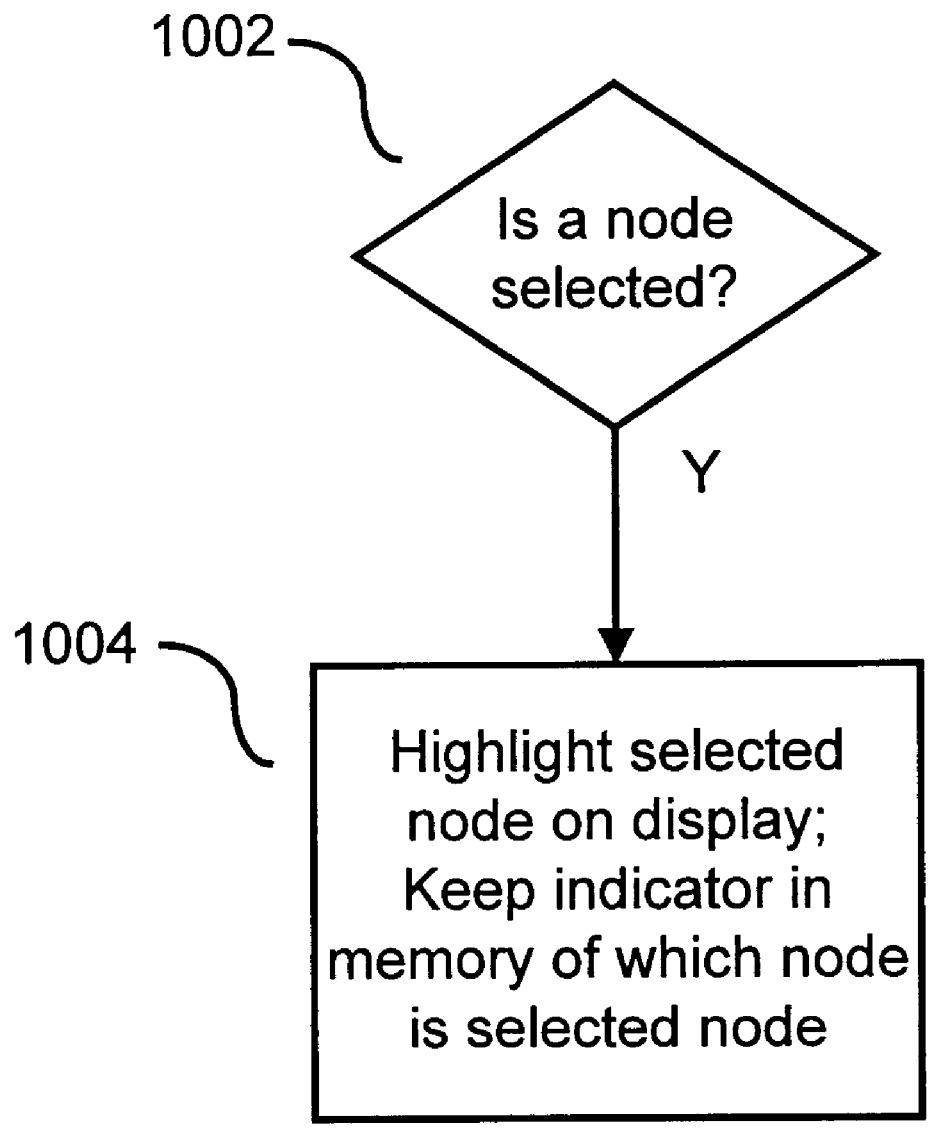
FIG. 10 is a flow chart showing steps performed by the structure editor software when the user selects a node.

FIG. 10 is a flow chart showing steps performed by structure editor software 120 when the user selects a page icon/node. In step 1004, processor 102 displays the selected page icon in a predetermined color, or by drawing a line around the selected page icon, or by displaying some similar indication of selection. Processor 102 also sets a value in memory 104 indicating the current selected node.

Figure 11:
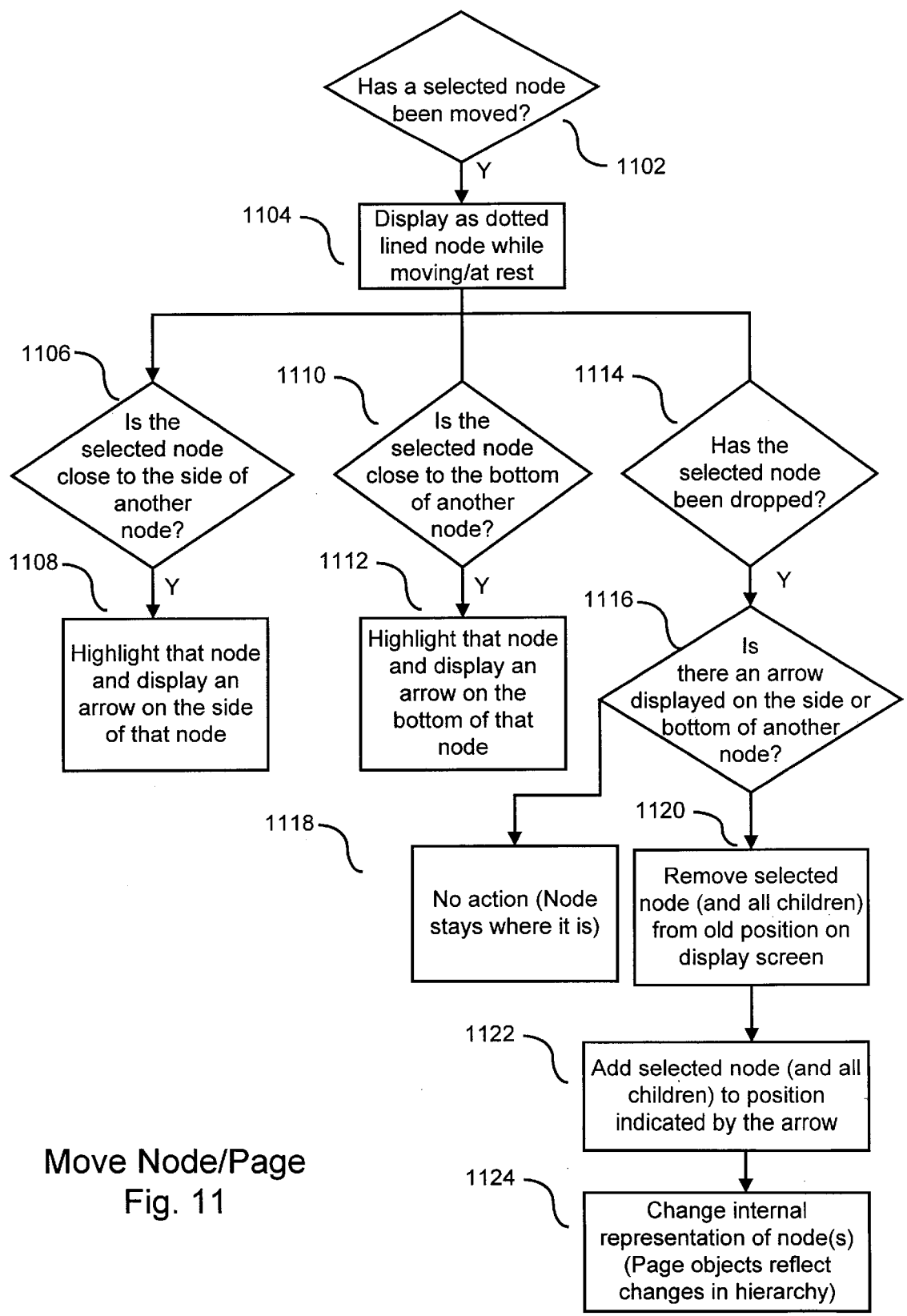
FIG. 11 is a flow chart showing steps performed by the structure editor software when the user moves a node.

FIG. 11 is a flow chart showing steps performed by structure editor software 120 when the user moves a node. Note that, in the described embodiment, the page icon for the homepage cannot be moved. In step 1104, the page icon is displayed as dotted line while it is moving. In step 1106, if the selected node is close to the side of another node then, in step 1108, the node is highlighted and an arrow is displayed on the corresponding side of that node. In step 1110, if the selected node is close to the bottom of another node then, in step 1112, the node is highlighted and an arrow is displayed on the bottom of that node.

In step 1114, if the selected node has been dropped, if the dropped node is not near another node (either side or bottom), then no action is taken. The user cannot drop a node so that it is not a part of the site. If the selected node has been dropped near another node (either side or bottom) then, in steps 1120 through 1126, the page icon/node is moved to a new position in the site hierarchy. Step 1120 removes the selected node (and all its children) from its old display position. Step 1122 adds the selected page icon/node (and all its children) to its new display position. Step 1124 changes one or more page objects in memory so that the page is correctly linked into its new position in the site hierarchy.

In an alternate embodiment, in step 1126, the draw objects of the selected page are altered so that when the selected page is displayed by a browser, the selected page contains links to its new parents, siblings, and/or children. The user may, of course, alter these draw objects if he so desires. The draw objects of the new parents and siblings are also changed so that a link to the moved page will be created.

Figure 12:
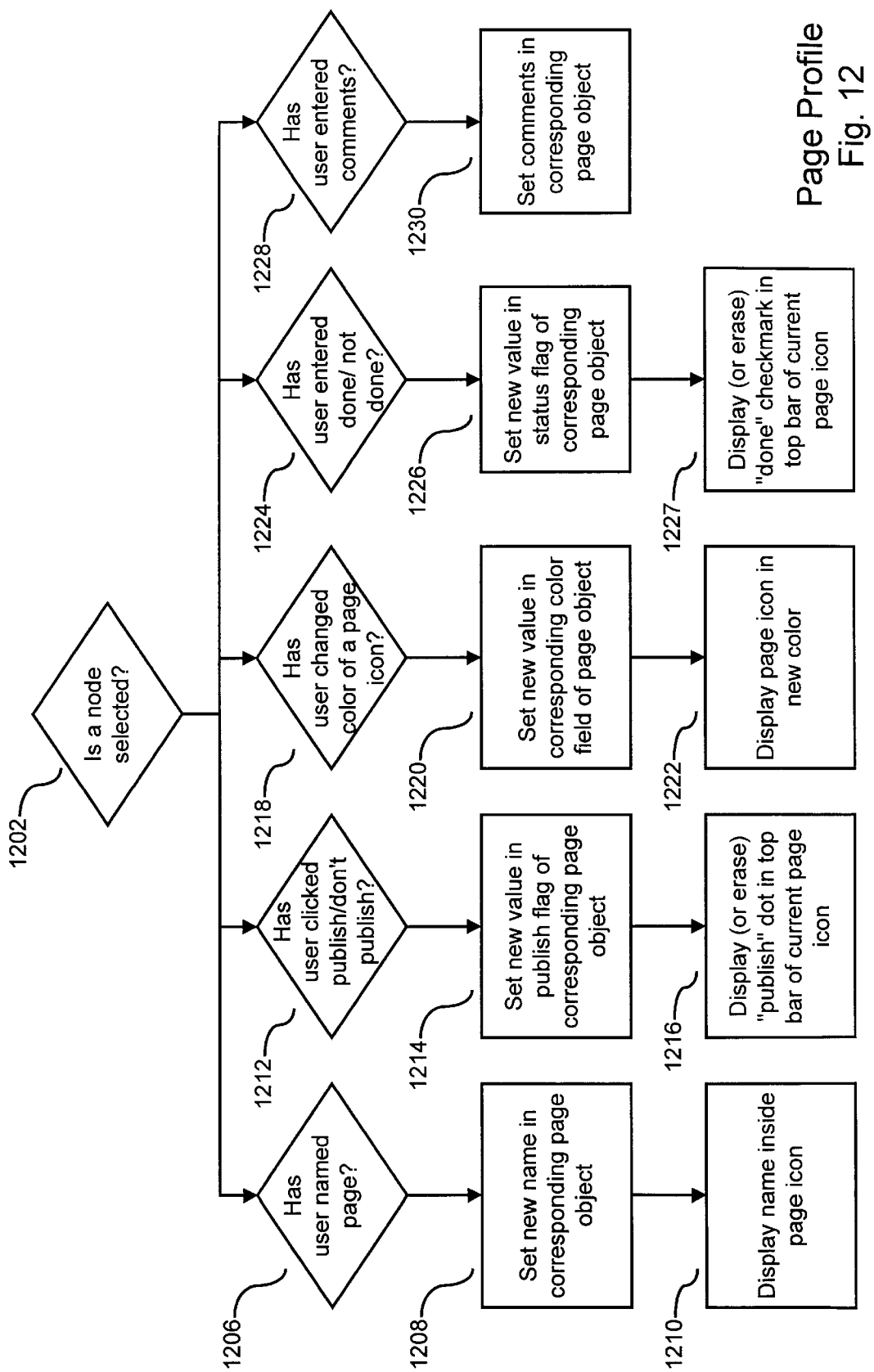
FIG. 12 is a flow chart showing steps performed by the structure editor software when the user changes the profile of a page.

FIG. 12 is a flow chart showing steps performed by structure editor software 120 when the user changes the profile of a page. The steps of FIG. 12 are performed when the user selects "Profile" from a pull down-view menu to display Profile window 326 of FIG. 3. In the described embodiment, the values in the profile window are the current values from the selected page icon/node. If the user enters a page name in step 1206 then, in step 1208, the name is stored in a corresponding page object having the format of FIG. 7. In step 1212, the new name is displayed in the page icon on the display. In an alternate embodiment, the name is changed in any existing draw objects for the selected page (i.e., banners, etc.). Moreover, if other pages link to the selected page, then the name is also changed in any other draw objects of those pages. If the page contains "smart links." The identity of the linked-to page is not determined until the page is displayed, previewed, or published.

If the user selects "publish" or "don't publish" in step 1212 then, in step 1214, the value of the publish flag is changed accordingly and, in step 1216, a dot indicating "publish" is displayed in the page icon. If the user changes the color of the selected page icon in step 1218 then, in steps 1220 and 1222, the color value in the corresponding page object is changed accordingly and the page icon is displayed in its new color.

If the user selects "done" or "not done" in step 1224 then, in step 1226, the done flag in the corresponding page object is changed accordingly and a checkmark indicating "done" is displayed in the page icon. If the user has entered comments in step 1228 then, in step 1230, the comments in the corresponding page object are changed accordingly.

Figure 13:
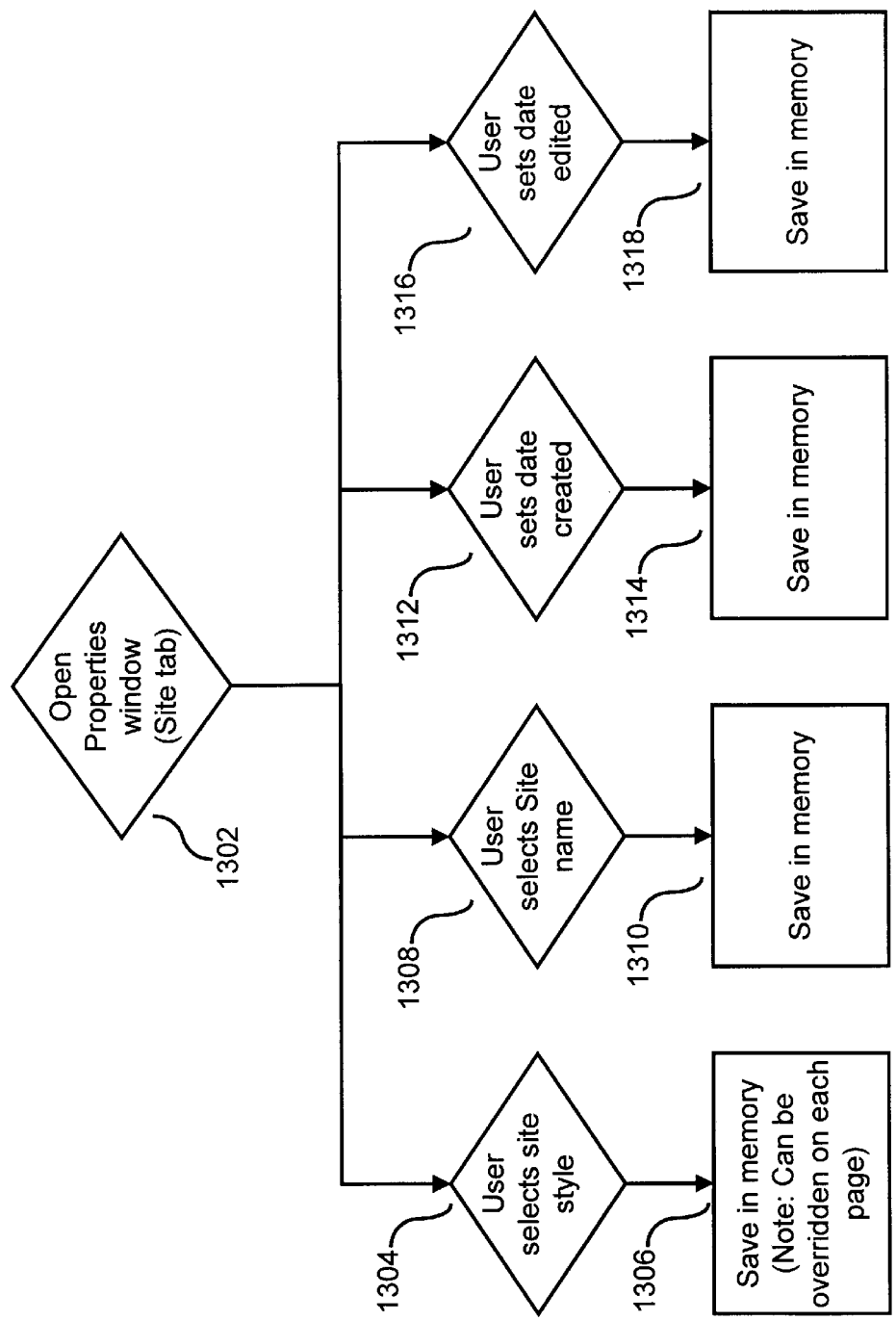
FIG. 13 is a flow chart showing steps performed by the structure editor software when the user changes a property of the site.

FIG. 13 is a flow chart showing steps performed by structure editor software 120 when the user clicks on a Site tab of a site property window. The user can change the style and name for the site and save the creation and edit dates.

Figure 14A:
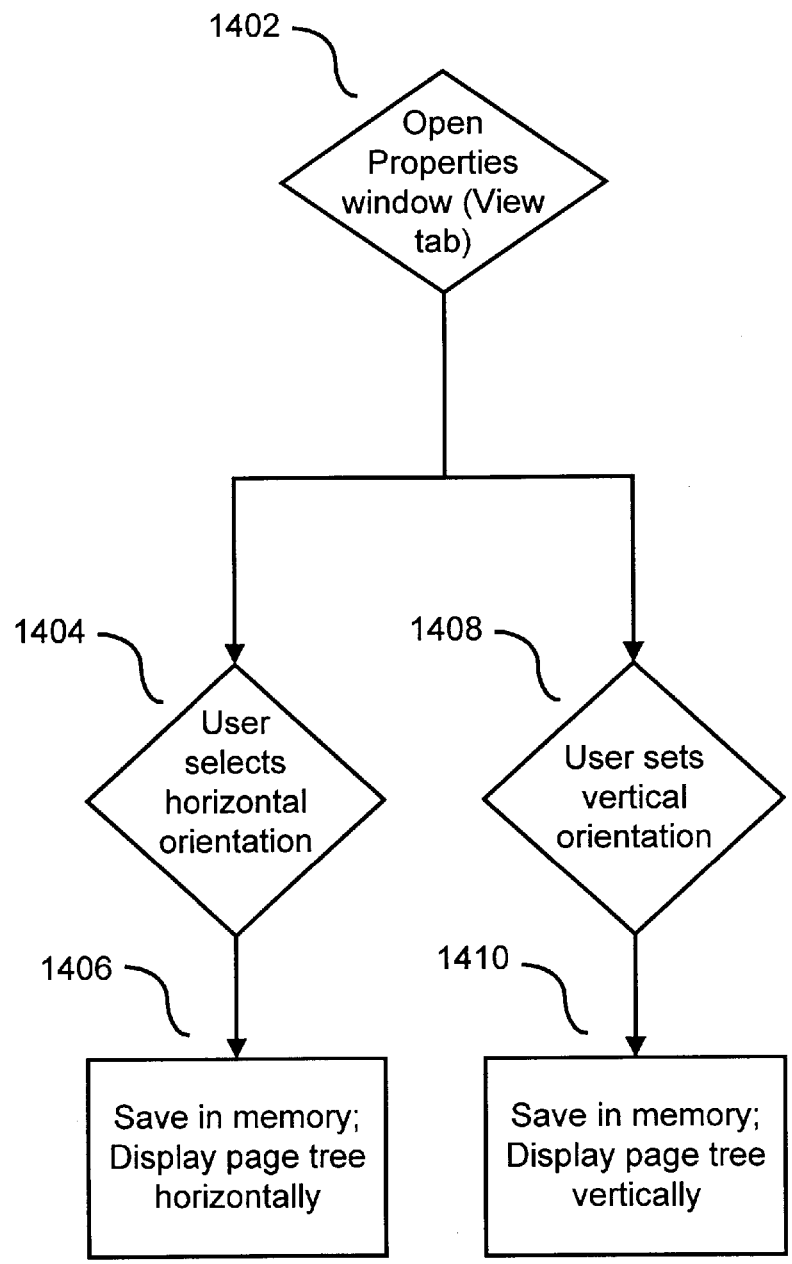
FIG. 14(a) is a flow chart showing steps performed by the structure editor software when the user changes a view of the site.
Figure 14B:
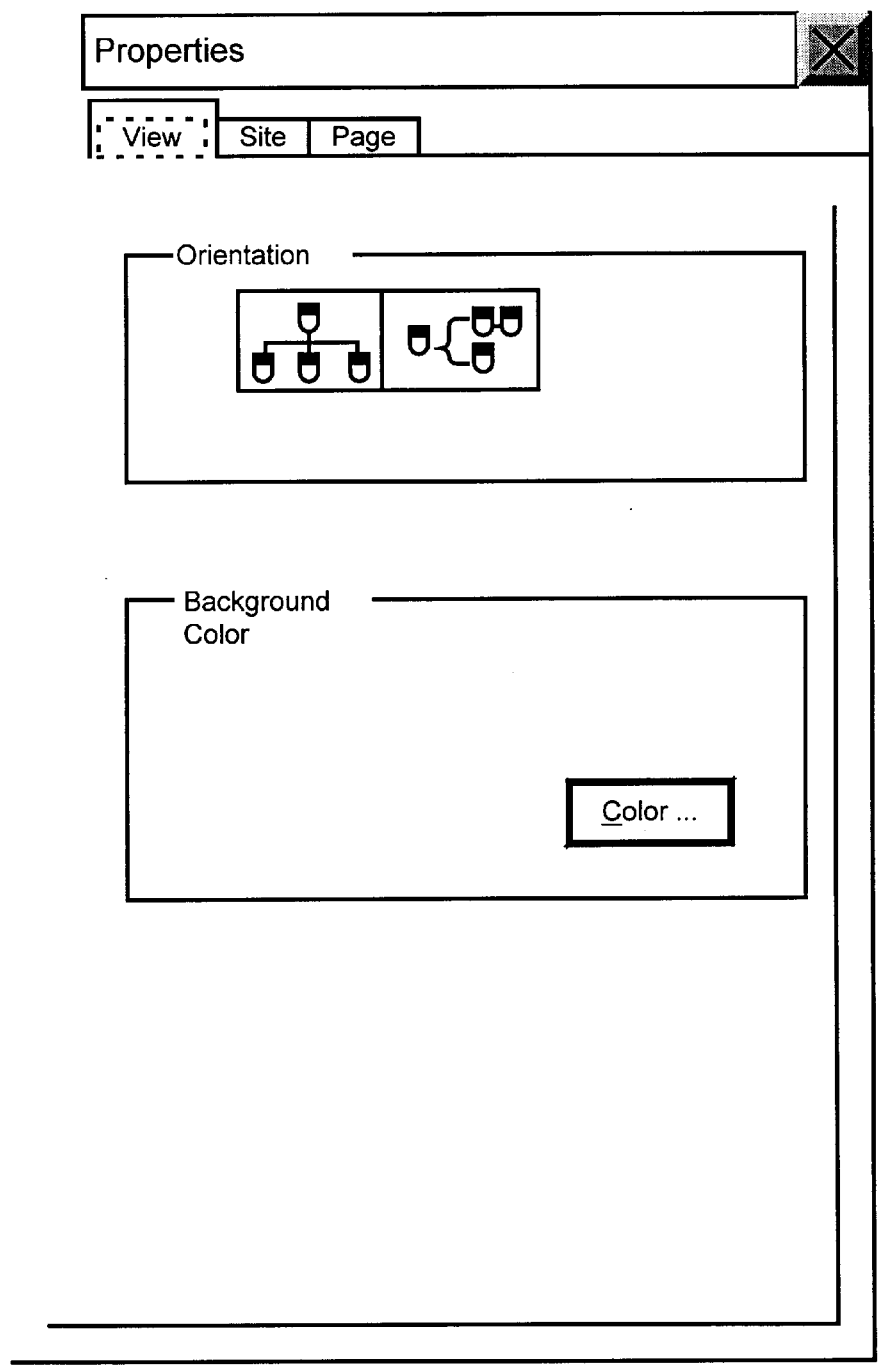
FIG. 14(b) shows an example of a View tab.
Figure 20:
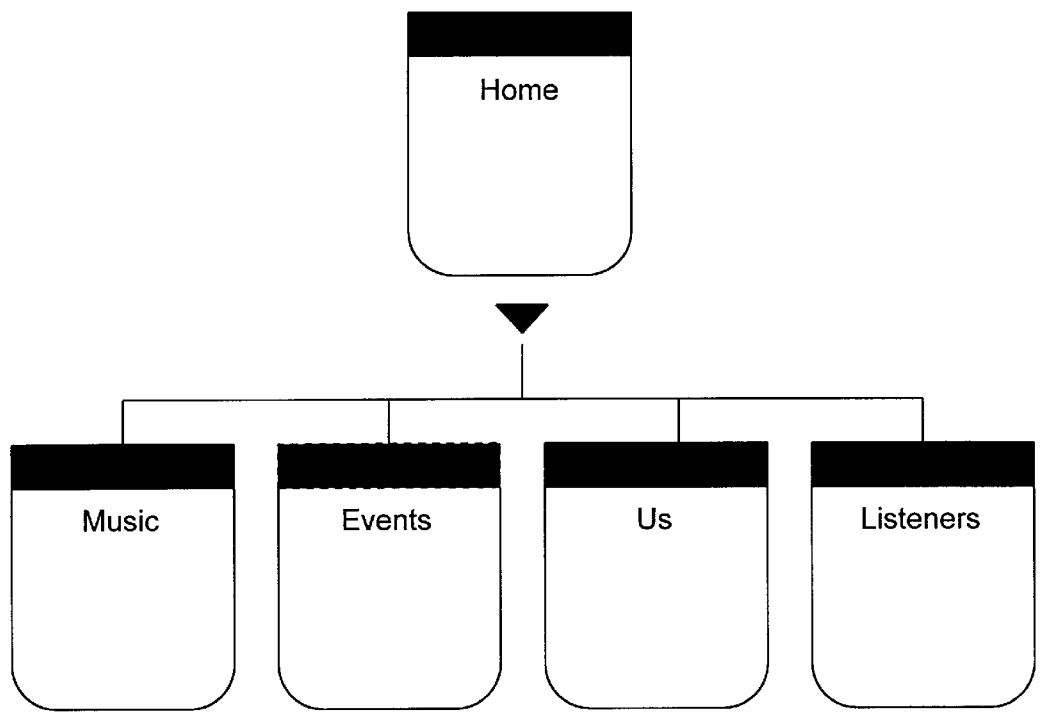
FIG. 20 shows an example of a horizontal display of pages of a site.
Figure 21:
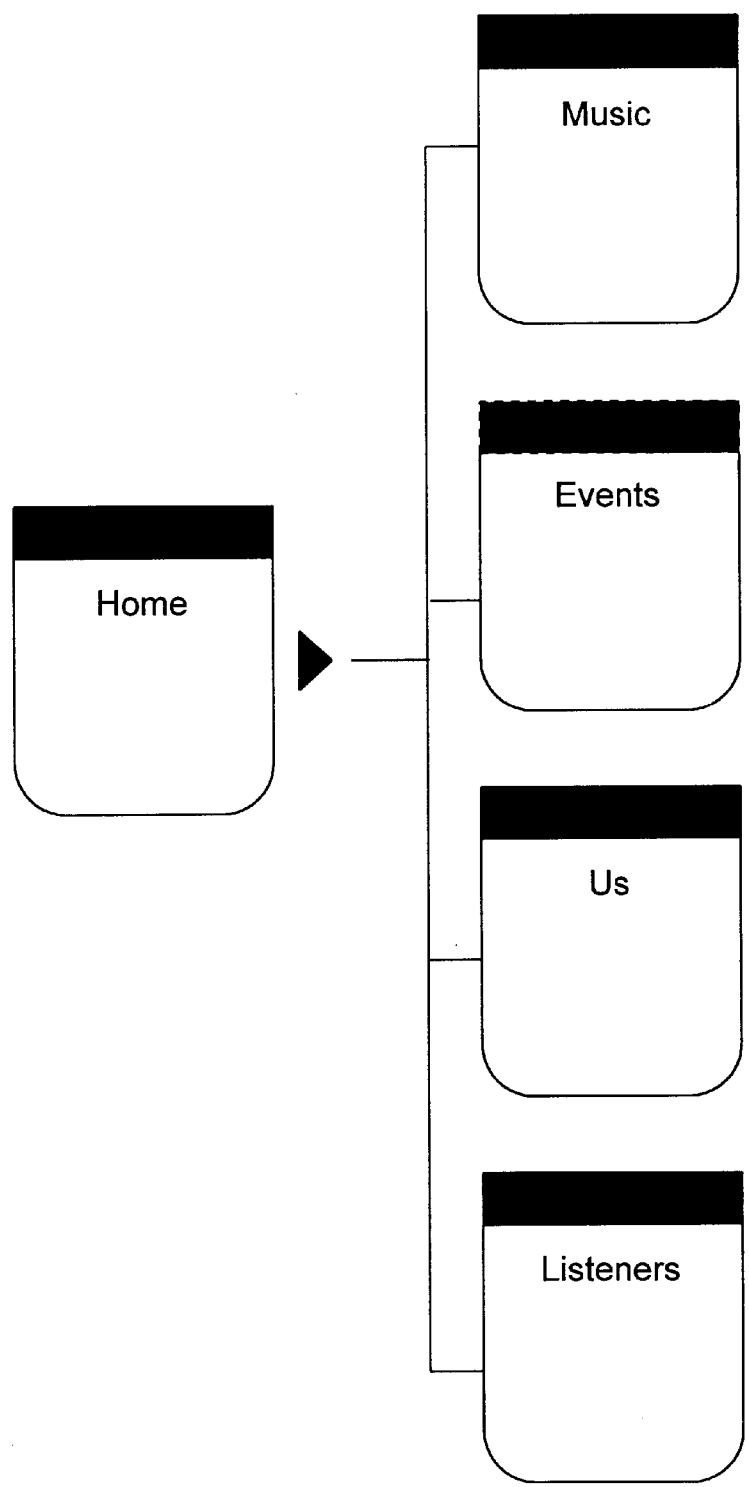
FIG. 21 shows an example of a vertical display of pages of a site.

FIG. 14(a) is a flow chart showing steps performed by structure editor software 120 when the user clicks on a View tab of a Site property window. The user can set the view to be either horizontal or vertical. FIG. 14(b) shows an example of a View Tab. FIG. 20 shows a horizontal view of the site hierarchy. FIG. 21 shows a vertical view of the site hierarchy.

Figure 15A:
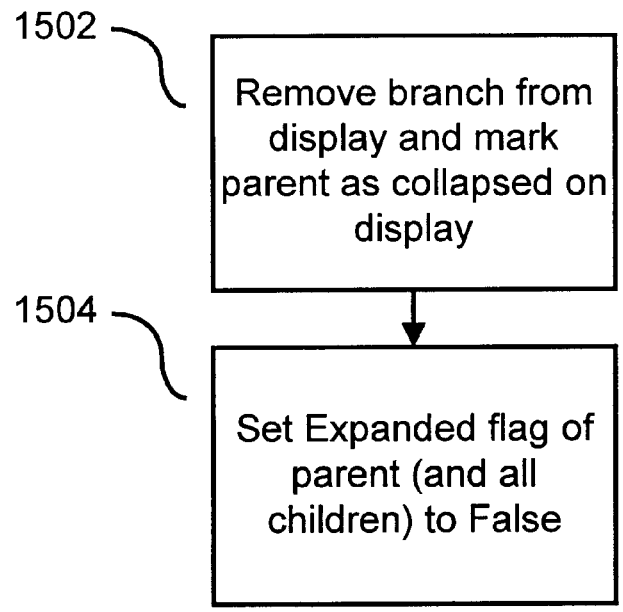
FIG. 15(a) is a flow chart showing steps performed by the is a flow chart showing steps performed by the structure editor software when the user changes a view of the site.
Figure 15B:
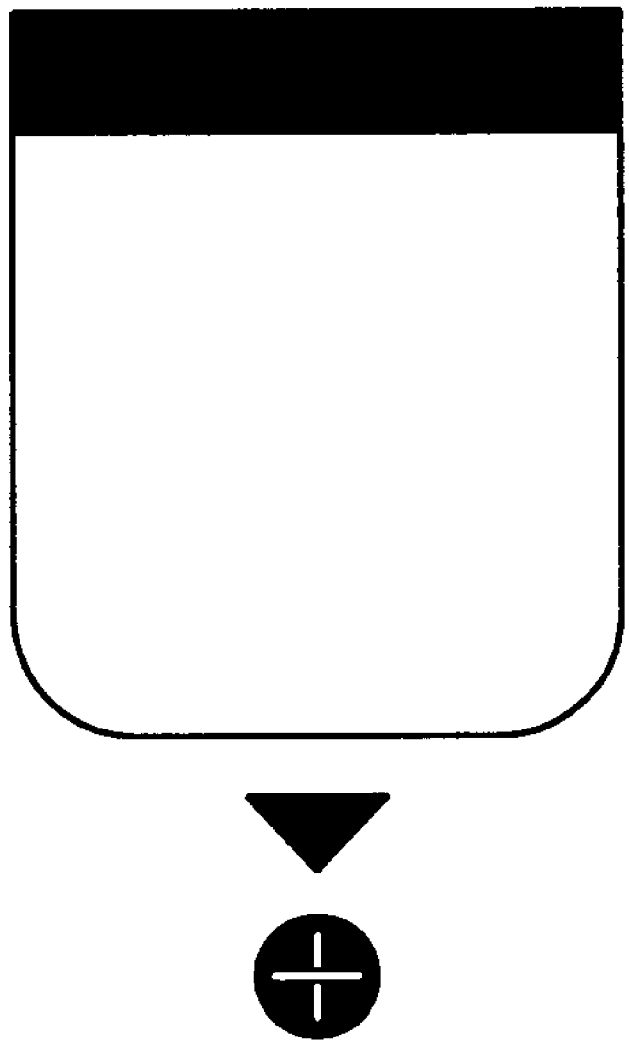
FIG. 15(b) shows a collapsed node.

FIG. 15(a) is a flow chart showing steps performed by structure editor software 120 when the user collapses a branch on the display. The user collapses a branch by selecting a page icon and selecting "Collapse" from the pull-down view menu. All nodes below the selected node are removed from the display and the selected node is displayed in a predetermined format indicating a collapsed branch. FIG. 15(b) shows an example of a collapsed node. When a node is collapsed, its collapsed flag is set to "true."

Figure 16:
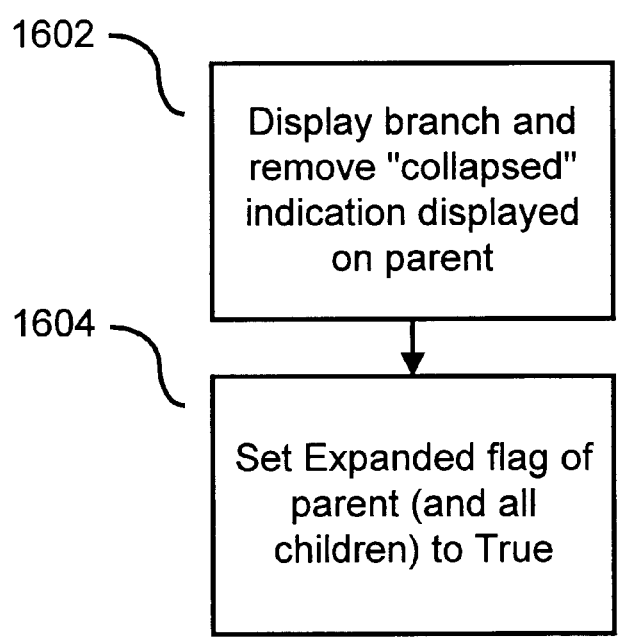
FIG. 16 is a flow chart showing steps performed by the structure editor software when the user expands a branch on the display.

FIG. 16 is a flow chart showing steps performed by structure editor software 120 when the user expands a branch on the display. The user expands a branch by selecting a page icon and selecting "Expand" from the pull-down view menu. The nodes below the selected node in the site hierarchy are displayed and the Collapsed indicator is removed from the selected node. When a node is expanded, its expanded flag is set to "true."

Figure 19:
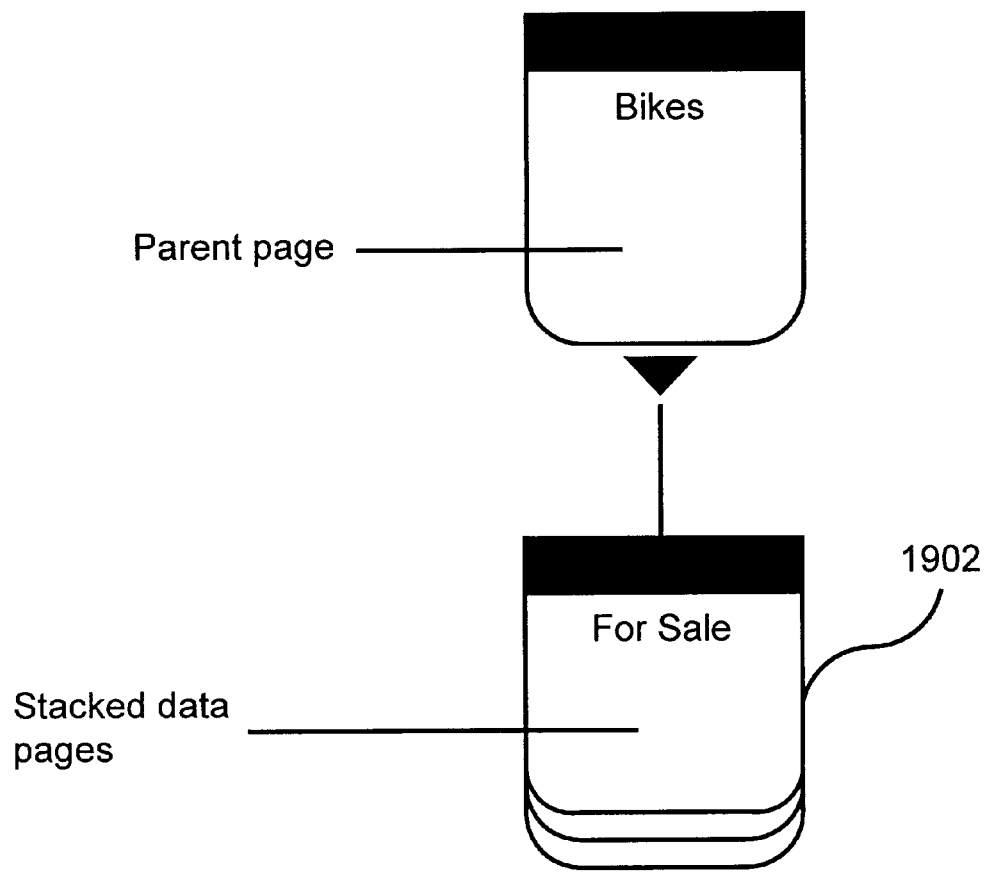
FIG. 19 shows an example of a stacked data page in the site view.

FIG. 19 shows an example of adding stacked data pages to the site hierarchy. When a page is a stacked page, it is displayed as overlapping pages 1902. The creation and management of pages is discussed in related U.S. application Ser. No. 08/687,971 of Samir Arora et al., filed concurrently herewith, and entitled "Draw-Based Editor for Web Pages." Generation of HTML for stacked pages are also discussed in the co-pending application. Stacked pages are moved at the site level of FIGS. 3 and 4 in substantially the same manner as normal pages, with the exception that a stacked page causes multiple HTML pages to be generated.

III. Page Creation and Manipulation for the Site

Figure 22:
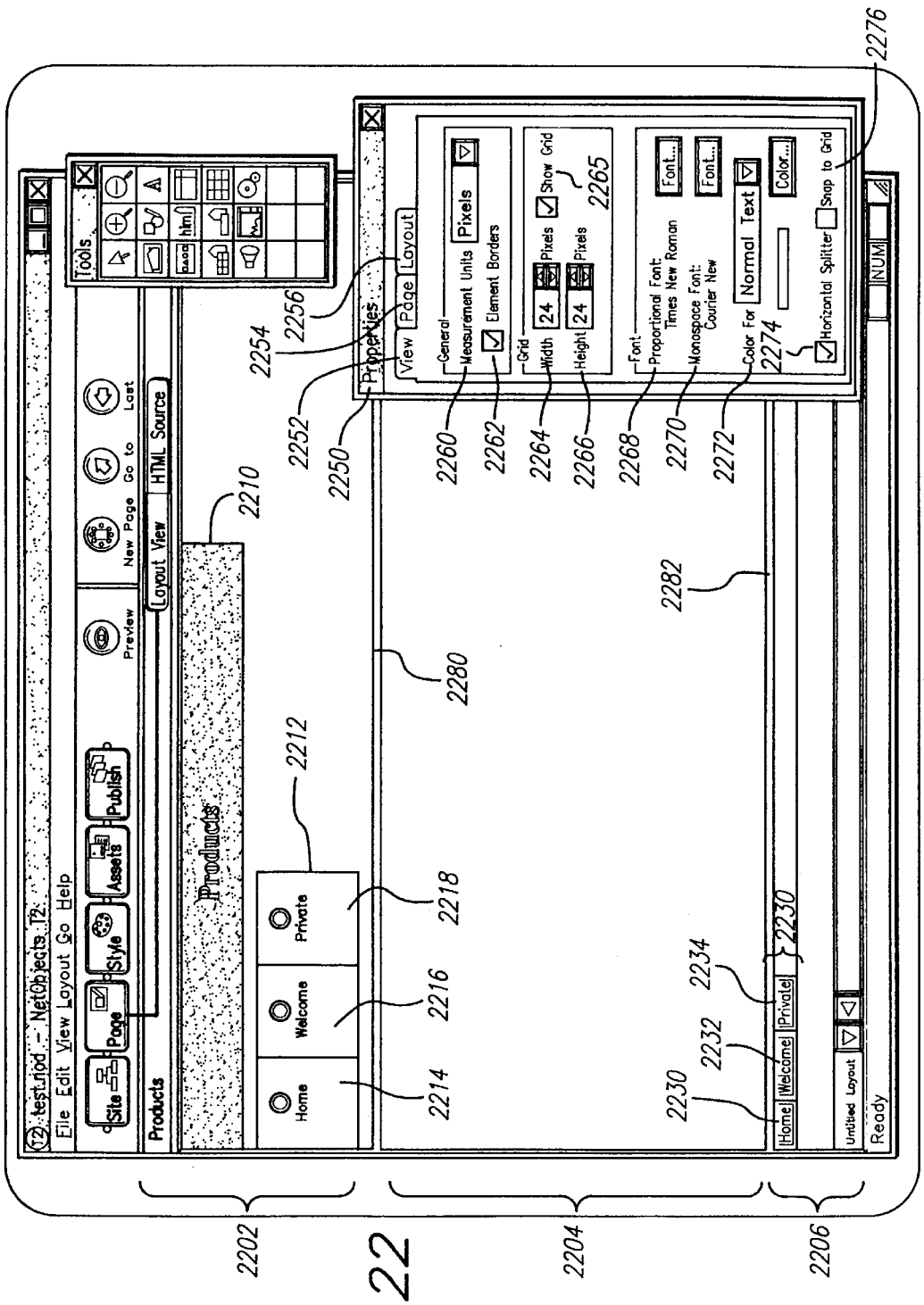
FIG. 22 shows an example of an initial page layout before the user has edited it.

FIG. 22 shows an example of an initial page layout before the user has edited it. FIG. 22 is displayed after the user indicates that he wants to edit a page by preferably: 1) double clicking on a page icon or 2) selecting a page icon and selecting "Page" button 304 of FIG. 3. The display of FIG. 22 is generated by a "page editor" which is described in more detail in related U.S. application Ser. No. 08/687, 971 of Samir Arora et al, filed concurrently herewith, and entitled "Draw-Based Editor for Web Pages." The described embodiment of the present invention automatically creates draw objects in memory for each page of the site. The automatically created draw objects reflect links between pages of the site, as described below.

The display of FIG. 22 creates a page having three parts: a header 2202, a body 2204, and a footer 2206. The page editor allows individual scrolling in each of these parts. The described embodiment of the present invention automatically creates display elements of header 2202 and footer 2206. Header 2202 automatically contains a banner 2210 and a plurality of navigator buttons 2212. In the example, the banner contains the name of the selected page icon 456 ("Products") of FIG. 4. Navigator buttons 2212 include buttons for home page 250 ("Home button 2214), the Welcome page 252 ("Welcome" button 2216), and the "Private" page ("Private" button 2216). Navigator buttons 2212 preferably include an image, such as the 3D button image shown in FIG. 22. This image may be predefined or defined by the user through use of a pop-up window.

Thus, in FIG. 22, the navigator buttons 2212 automatically include buttons corresponding to the home page, to the first hierarchical level below the homepage, and to the parent page. Alternate implementations of the present invention automatically display navigator buttons for one or more of the home page, the parent page, sibling pages, the first level, children pages, and any other appropriate pages. In some embodiments, the user chooses which navigator buttons are generated automatically by way of a pop-up site window.

Footer 2206 automatically contains a plurality of text buttons 2230. These text buttons preferably correspond to the navigator buttons 2212. Thus, text buttons 2230 include buttons for home page 250 ("Home text button 2230), the Welcome page 452 ("Welcome" text button 2232), and the "Private" page 454 ("Private" text button 2234). The internal memory representation of banner 2210 and of buttons 2212 and 2230 are discussed in detail below.

FIG. 22 also shows a "Properties" window 2250 in which a "View" tab is selected. Properties window 2250 includes three tabs: a "View" tab 2252, a "Page" tab 2254, and a "Layout" tab 2256. Properties window 2250 currently shows view properties because View tab 2252 is selected. Properties window 32250 includes a "Measurement Unit" area 2260, a "Element border" area 2262, "Grid Width" and "Grid Height" areas 2264, 2266, a "Show Grid" flag 2265, font size areas 2268, 2272, a "Color" area 2272, a "Horizontal Splitter" flag area 2274, and a "Snap to Grid" flag area 2276.

When the page editor is started, the values of Properties window 326 are properties for the displayed page. Thus, in the example, the grid is measured in unit of pixels. Element borders around each display element are displayed. A grid of 24×24 pixels is displayed. The specified fonts are used. The page uses the colors described in the colors area 2272. Horizontal splitters 2280, 2282 are displayed. The "Snap to Grid" property is turned off. It will be understood by persons of ordinary skill in the art that structure editor software 120 stores values corresponding to this Property window and each Property window discussed herein in memory 104.

Figure 24:
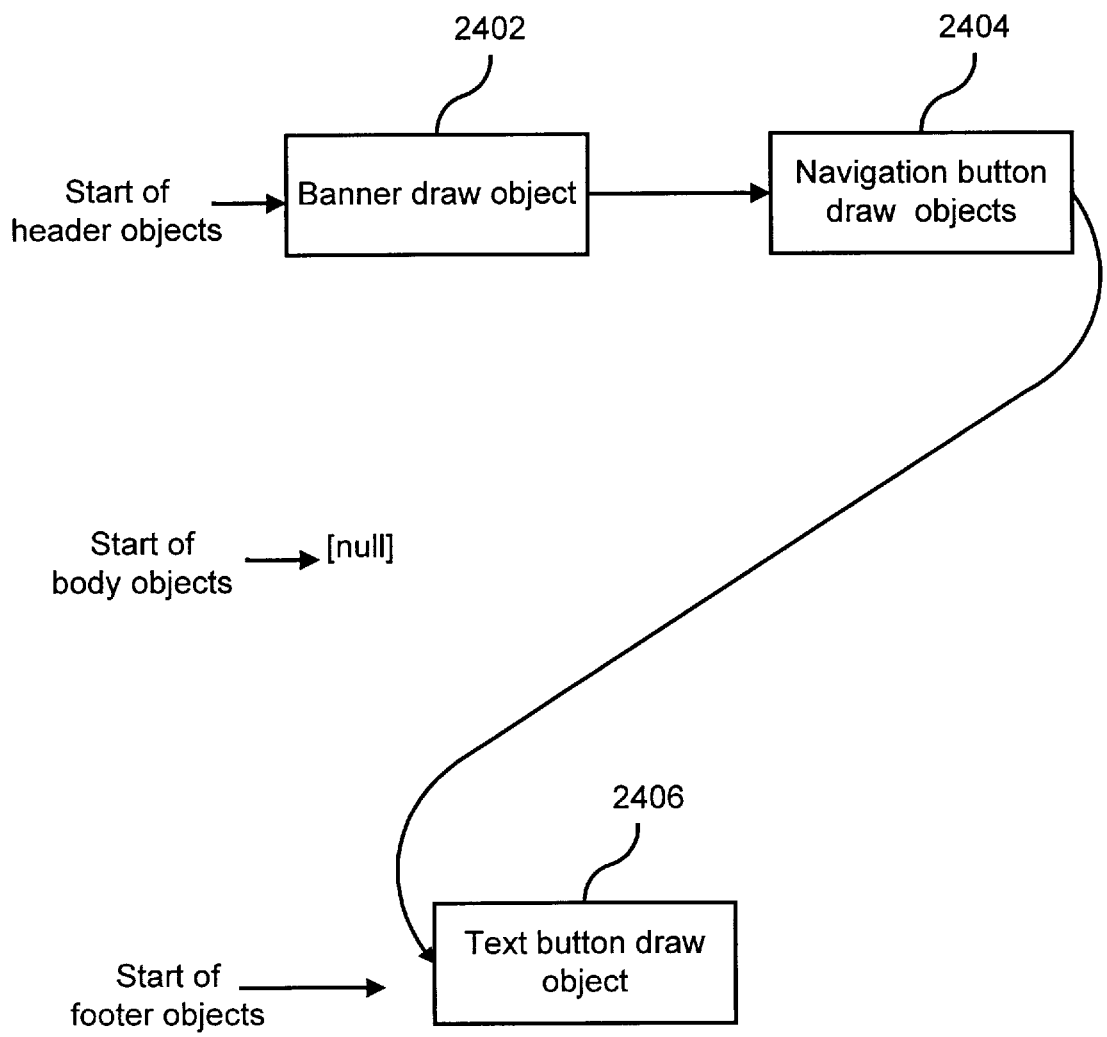
FIG. 24 is an example showing an internal representation stored in a memory of objects automatically generated on the page by the structure editor.

FIG. 24 is an example showing an internal memory representation of draw objects automatically generated by structure editor software 120. The draw objects are generated when a page layout is modified. The internal representation includes a list of objects (a layout object), representing the header, body, and footer of the page of FIG. 22. Thus, the list of draw objects includes a banner draw object 2402 (corresponding to banner 2210), a navigator buttons draw object 2404 (corresponding to navigator buttons 2212), and text buttons draw object 2406 (corresponding to text buttons 2214). In the described embodiment, all draw objects of the header 2202 are stored together in a layout object and a pointer points to the beginning of this list. Similarly, all objects of the footer 2206 are stored together in a layout object and a pointer points to the beginning of this list. In the described embodiment, the user has not entered any elements into the body 2204 and a pointer to body elements points to a null list.

Figure 25:
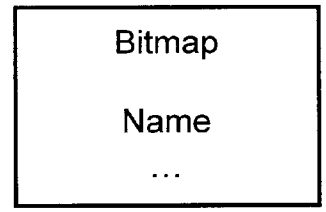
FIG. 25 is an example of a draw object for a page banner.
Figure 26A:
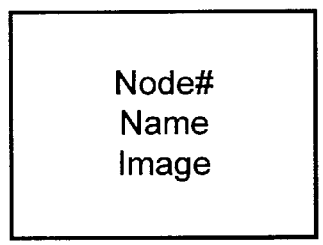
FIGS. 26(a) and 26(b) are examples of a draw object for a navigator button.
Figure 26B:
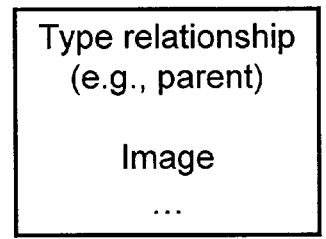
Figure 27:
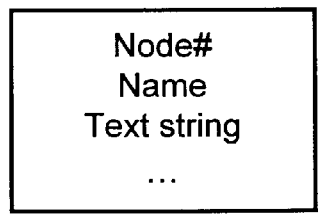
FIG. 27 is an example of a draw object for a text navigator button.

FIG. 25 is an example of a draw object for a page banner. It includes a bitmap of the banner and the name of the page (e.g., "Products"). FIG. 26(*a*) is an example of a draw object for a navigator button. FIG. 26(*a*) includes a node number to which it will link when displayed by a browser, a name of the linked to page, and an image of the navigator button (e.g., a GIF image). FIG. 26(*a*) includes a smart link to another node, which is specified by relationship, and an image. The identity of the link is determined when the page is displayed, previewed, or published. FIG. 27 is an example of a draw object for a text object. It includes a node number to which it will link when displayed by a browser, a name of the linked to page, and a string displayed in the text button. In the described embodiment, each draw object contains its type, its X position, Y position, width, and height. Appendix A shows an example of a draw object of text and a draw image for an image. It will be understood that each type of display element in a page (e.g., text, image, button, etc.) has a corresponding type of draw object.

Figure 23:
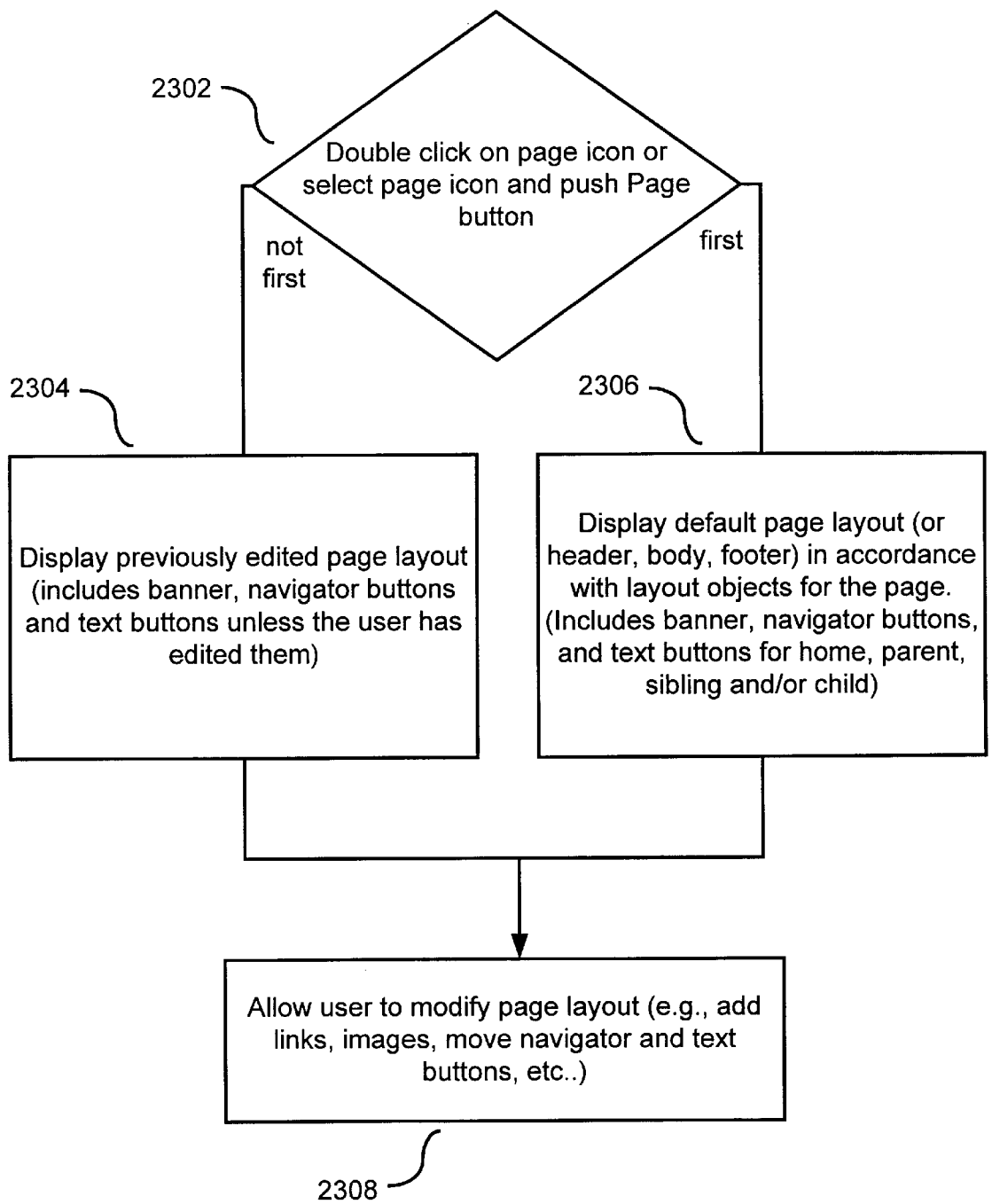
FIG. 23 is a flow chart showing steps performed by the structure editor software to display the page layout of FIG. 22.

FIG. 23 is a flow chart showing steps performed by structure editor software 120 to display the page layout of FIG. 22 during execution of the page editor. In step 2302, the page editor determines whether this is the first time that the page has been edited. If it is not the first time, in step 2304, the current page layout is displayed in accordance with the draw objects for the page. The page layout will include the automatically generated banner, navigator buttons, and text buttons, unless the user has previously deleted them.

If it is the first time, in step 2306, the editor displays the default page layout in accordance with the draw objects for the page. The page layout will include the automatically generated banner, navigator buttons, and text buttons. Step 2308 allow the user to modify the page layout using drag and drop methods as described in U.S. application Ser. No. 08/687,971 of Samir Arora et al, filed concurrently herewith, and entitled "Draw-Based Editor for Web Pages." It will be understood that the user does not have to modify the page at all if he doesn't want to. The automatically generated page elements will still be a part of the page. The user exits the page editor by, e.g., clicking on Site button 302, Style button 206, Assets button 308, or publish button 310. After the user has edited a page, he can still move the page around in the site hierarchy by using the structure editor.

IV. HTML Generation for the Site

Figure 28:
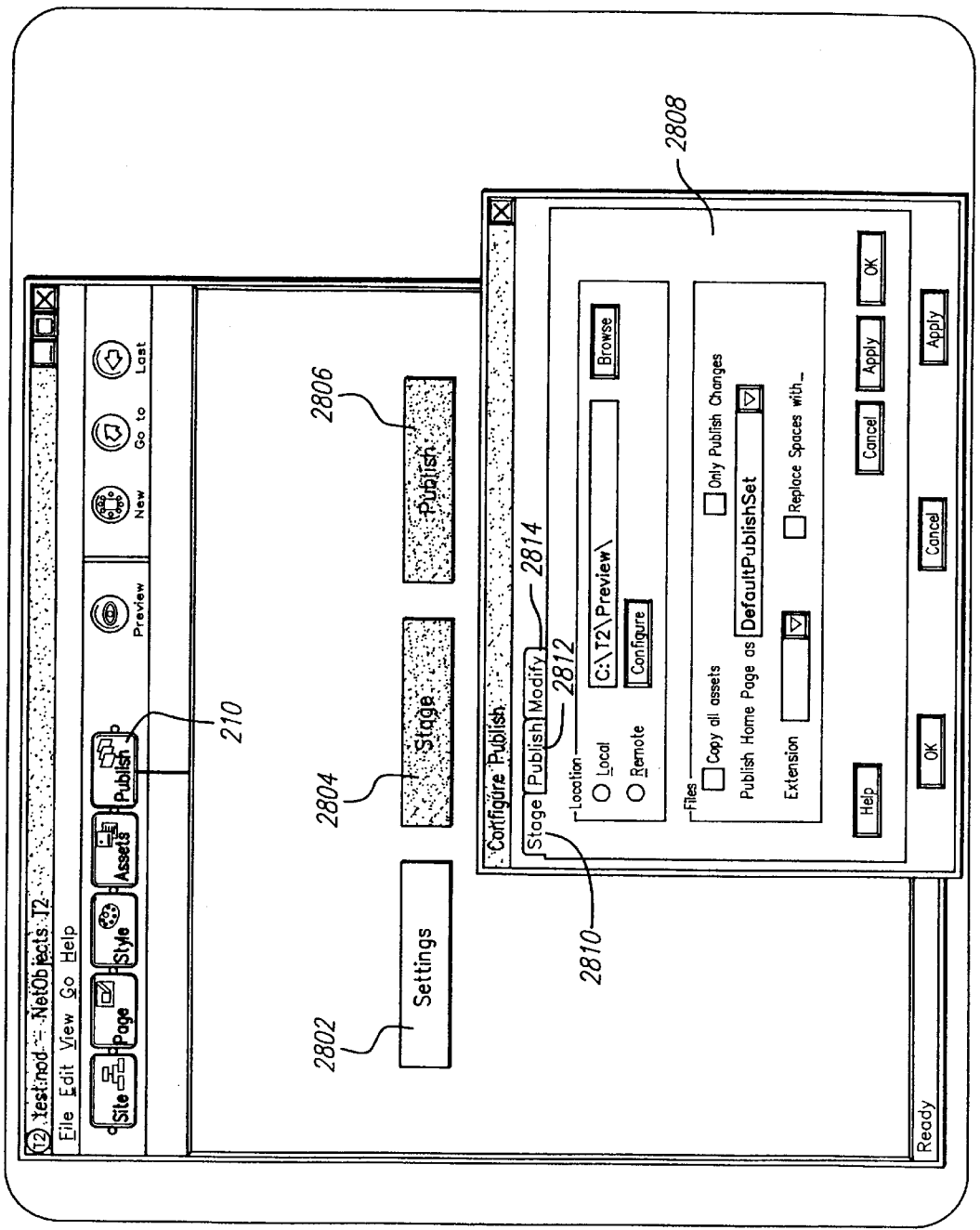
FIG. 28 shows an example of a display used to allow the user to publish the pages of a site.

Once the user has created a hierarchy of pages for the site as described above, the user needs to be able to generate HTML for all pages of the site. FIG. 28 shows an example of a display used to allow the user to publish the pages of a site. FIG. 28 shows a screen displayed when the user clicks on "Publish" button 310 of FIG. 3. The screen includes three buttons "Settings" 2802, "Stage" 2804, and "Publish" 2806. Once the display of FIG. 28 is displayed, the user can either "stage" or "publish" his site. Generally, staging is performed first and publishing is performed once the site is debugged. Staging and publishing are substantially the same, differing in when they are performed during the site development process. The user can also set configuration parameters to control the publishing or staging process. Clicking on either "publish" button 2802 or "Stage" button 2804 causes the described embodiment to generate HTML code for each page in the site (or only for pages indicated by the publish flag or by the user). This process is described below.

Figure 29:
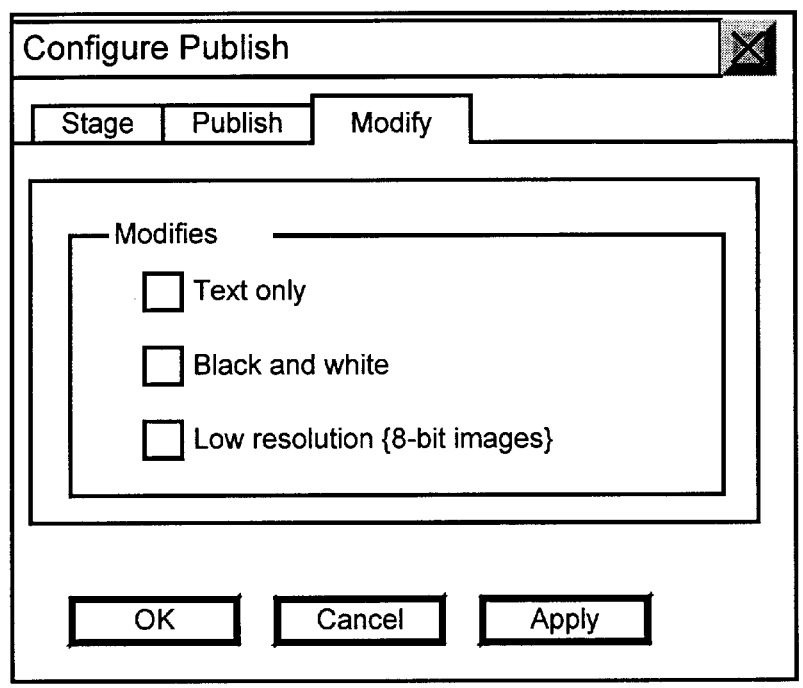
FIG. 29 shows an example of a display used to allow the user to specify details of how to publish a site.

Clicking on "Settings" button 2802 causes a pop-up window 2808 to be displayed. Clicking on "Stage" tab 2810 or "Publish" tab 2812 will display a window, which allows the user to specify a storage location for the staged or published site. Clicking on a "Modify" tab 2814 causes the pop-up window 2902 of FIG. 29 to be displayed. Window 2902 allows the user to indicate certain attributes of the HTML to be generated for the site (e.g., text only, black and white (grey scale), or low-resolution).

Figure 30:
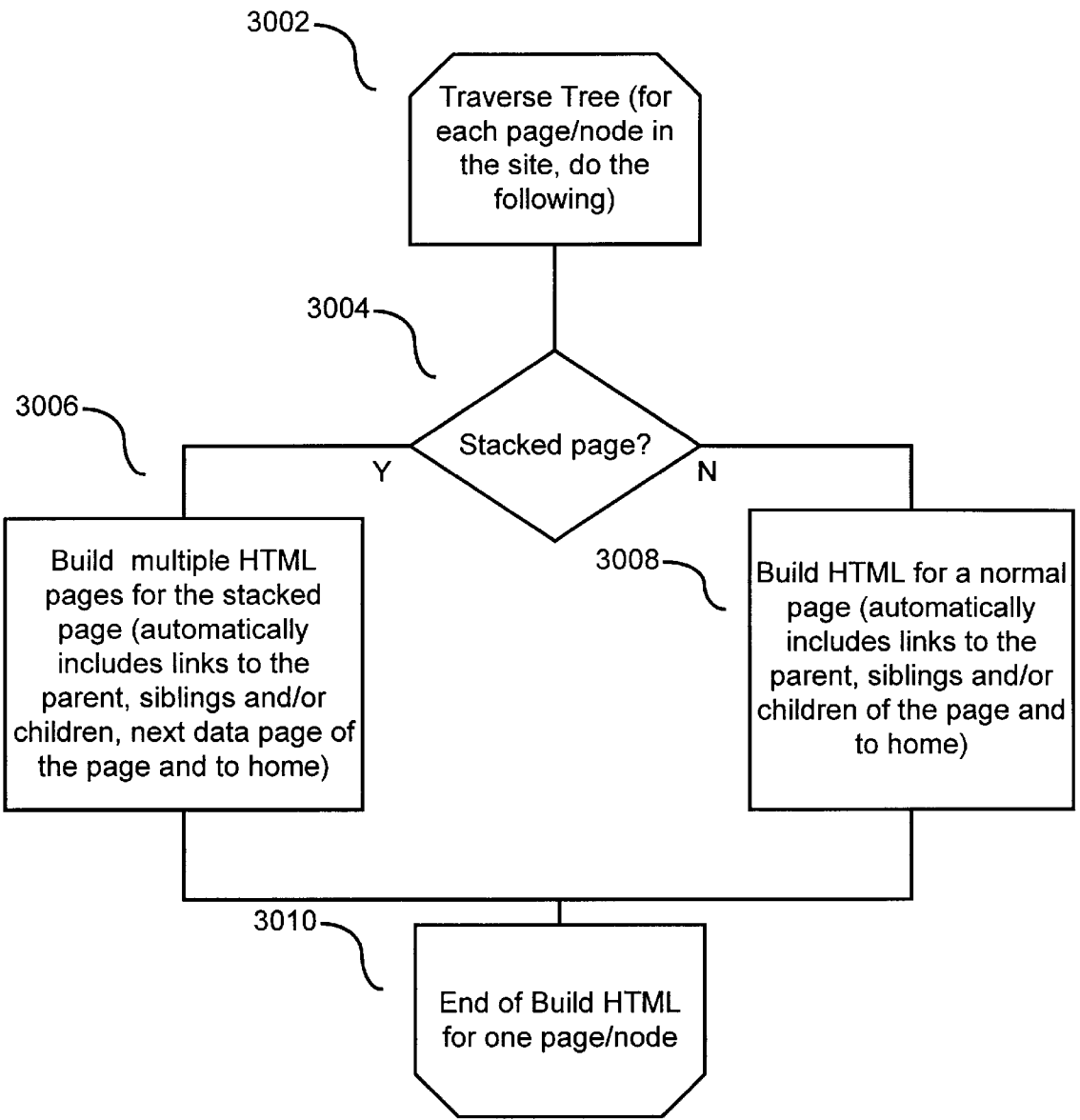
FIG. 30 is a flow chart showing steps performed by the structure editor software to publish all the pages of a site.

FIG. 30 is a flow chart showing steps performed by structure editor software 120 to publish all the pages of a site. It will be understood that the steps of FIG. 30 are performed by processor 102 executing instructions in structure editor software 120. In FIG. 30, steps 3002 through 3010 form a loop repeated for each page in the site, i.e., for each page object stored in the memory. In the described embodiment, the tree of page objects is traversed in a recursive, depth first manner in a manner known to persons of ordinary skill in the art. For each page object, in step 3004, if the stacked flag of the current page object indicates that the current page is a stacked page, then processor 102 creates HTML for a plurality of pages. If the current page object is not a stacked page then, in step 3008, processor 102 builds HTML for a "normal" page. In either case, the HTML for the page is then written to a storage medium of the system.

It will be understood that, generally, each page object has a corresponding list of draw objects describing the elements of the page for the header, body and footer of the page, and that processor 102 generates HTML in accordance with the draw objects. As described above, each list of draw objects automatically includes draw objects representing automatically generated banners and links (e.g., to the home, first level, parent, sibling, and/or children pages of that page). The draw objects of a page may also represent other, additional links added by the user that are not a part of the site hierarchy. Moreover, the user can use the page editor to remove some of the automatically generated draw objects links if he so desires. Unless the user explicitly removes them, however, these automatically generated links are present in each page layout. Thus, the generated HTML for each page will contain links to the home, parents, siblings, and/or children pages for each page of the site view.

V. HTML Generation for a Page

Figure 31:
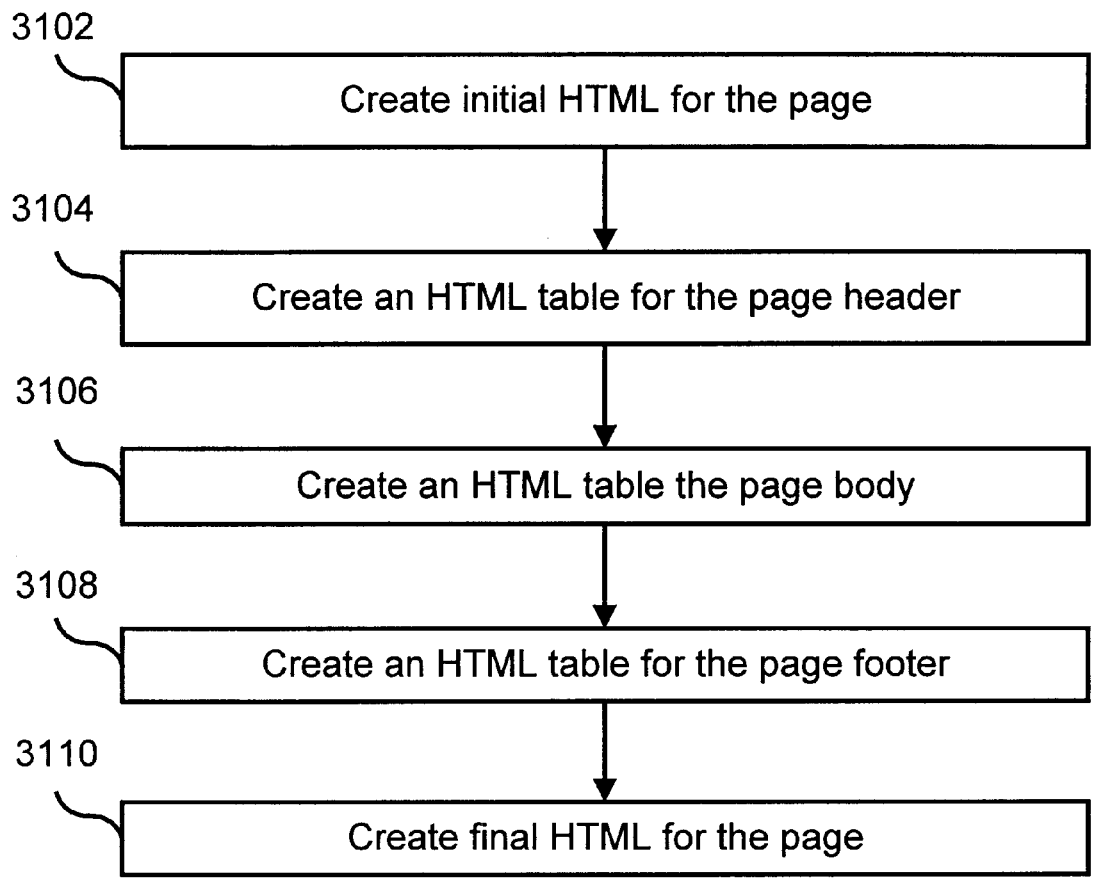
FIG. 31 is a flow chart showing steps performed by the structure editor software to publish a single page.
Figure 32:
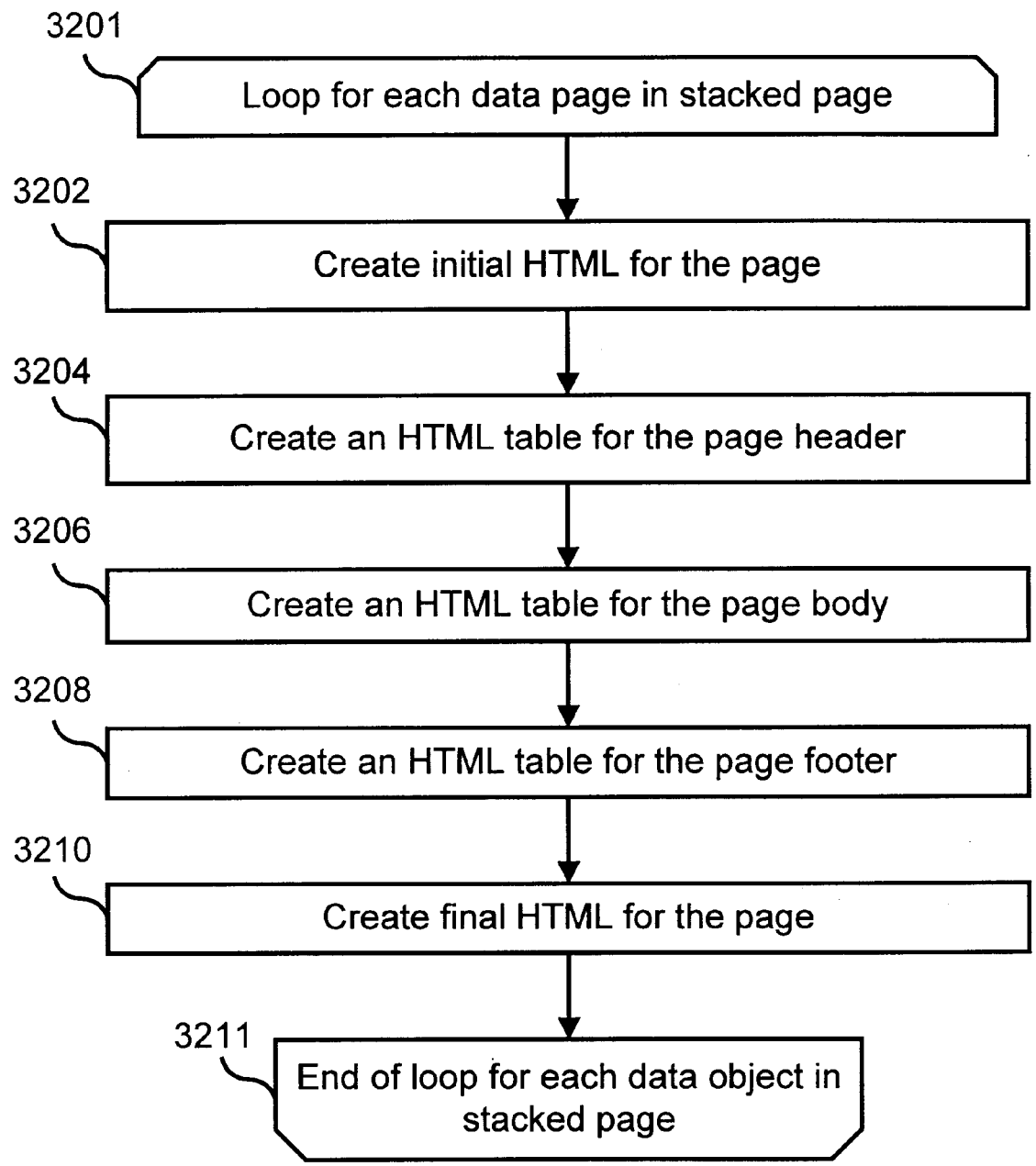
FIG. 32 is a flow chart showing steps performed by the structure editor software to publish a stacked page.

FIG. 31 is a flow chart showing steps performed by the structure editor software to publish a normal page. FIG. 32 is a flow chart showing steps performed by the structure editor software to publish a stacked page. The steps of FIGS. 31 and 32 are similar, except that the steps of FIG. 32 generates multiple HTML pages for the stacked page. Step 3110 creates initial HTML for the page as shown in FIG. 33.

Figure 34:
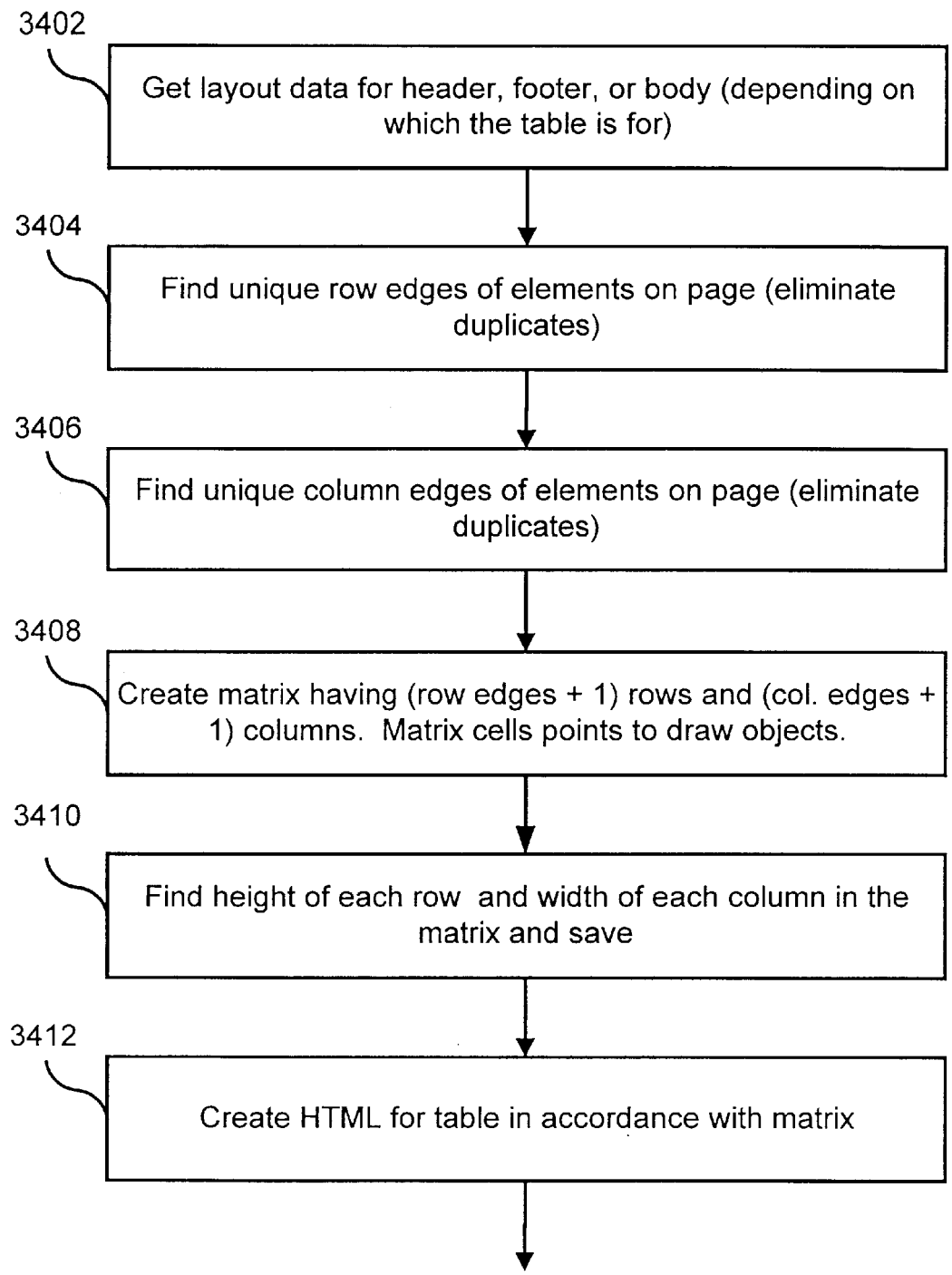
FIG. 34 is a flow chart showing further steps performed by the structure editor software to generate an HTML table for layout elements of a page, such as a header, body, and footer.
Figure 35:
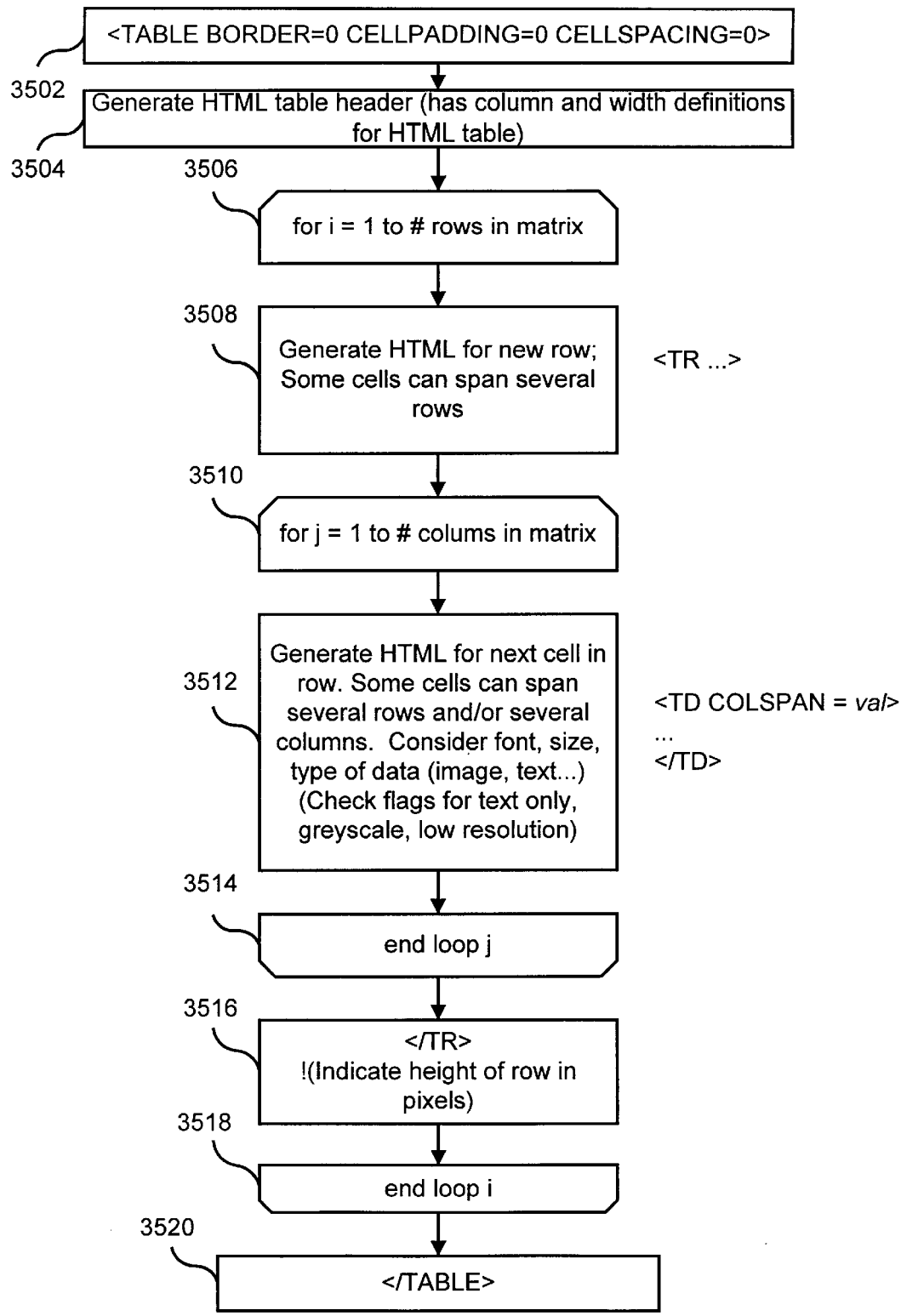
FIG. 35 is a flow chart showing steps performed by the structure editor software to generate an HTML table.

This step creates the beginning of an HTML page. Steps 3104–3108 create HTML tables for each of the header, body, and footer as shown in FIGS. 34 and 35. Step 3110 creates final HTML for the end of the page as shown in FIG. 36. The preferred embodiment generates Netscape HTML versions 3.X.

FIG. 32 shows the creation of a plurality of HTML pages for a stacked page. Each HTML contains, for example, data for one record of a database associated with the stacked page. Each of the plurality of HTML pages has a common format including the same fields of the database and the same layout of the fields. Each page of the plurality of pages has the same format, but different data.

Figure 33:
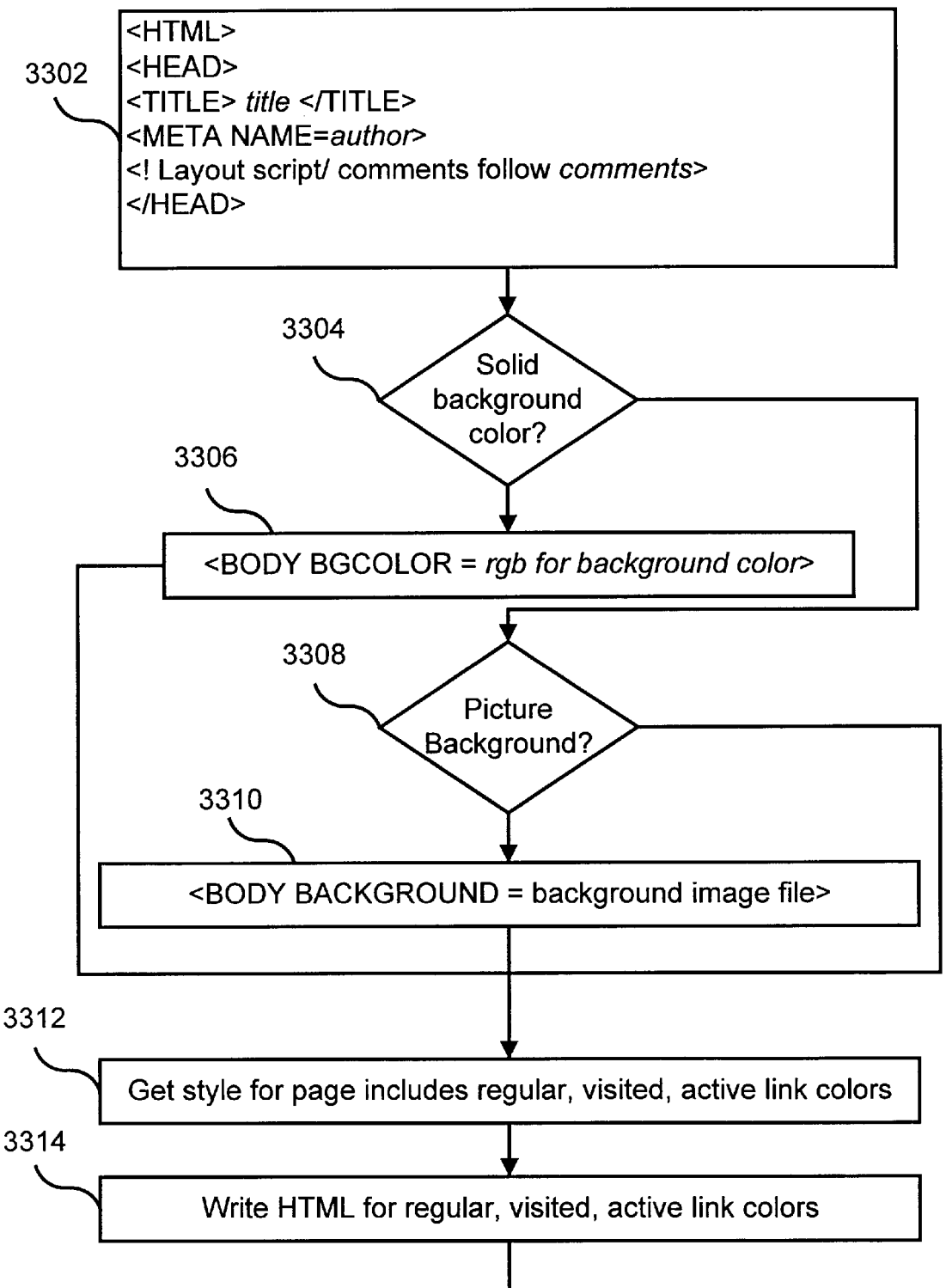
FIG. 33 is a flow chart showing steps performed by the structure editor software to generate initial HTML for a page.

Step 3314 of FIG. 33 shows that the HTML for a page includes a tag specifying the colors that a browser will use to display regular, visited, and active links. Other embodiments specify other HTML tags that specify other attributes common to the page.

FIG. 34 is a flow chart showing steps to build an HTML table.

In the described embodiment, an HTML table is generated for the header, body, and footer of each page. Steps 3402–3408 generate a matrix in memory 104 as discussed below in connection with FIGS. 37–40. Step 3410 create the HTML table in accordance with the matrix as shown in FIG. 35.

FIG. 35 shows steps that create an HTML table. Step 3502 writes a table tag including a border of zero width and cellpadding and cellspacing of zero. Step 3504 generates a table header including column and width definitions for the HTML table. Steps 3506–3518 go through each row and column of the matrix to generate a plurality of cells in the HTML table. Some of the cells in the HTML table can be several columns wide and/or several rows high. Step 3520 generates an end of table tag.

FIG. 37 is an example of first steps involved in determining an HTML table size for a layout element of a header, body, or footer. In the example, the layout element has four display elements. Each display element corresponds to one draw object of the page. As discussed above, each draw object has an X position (a start row) and a length. Each draw object also has a Y position (a start column) and a height. For each object, a first column edge is the X start position and a second column edge is the X start position plus the length. In addition, for each object, a first row edge is the Y start position and a second row edge is the Y start position plus the height. Processor 102 finds the row edges and columns edges for a current page, yielding data 3702 and 3704.

FIG. 37 is an example of second steps involved in determining an HTML table size for a layout element. Once the column and row edges of the draw objects are determined, the edges are sorted, duplicate edges are removed from the sorted list, yielding unique row edges and unique column edges (steps 3404 and 3406 of FIG. 34). The unique rows edges and column edges are then counted. In the example, the objects have six column edges and seven row edges. Once the unique row edges and column edges are determined, the column widths and row heights for each column and row are determined.

Figure 39:
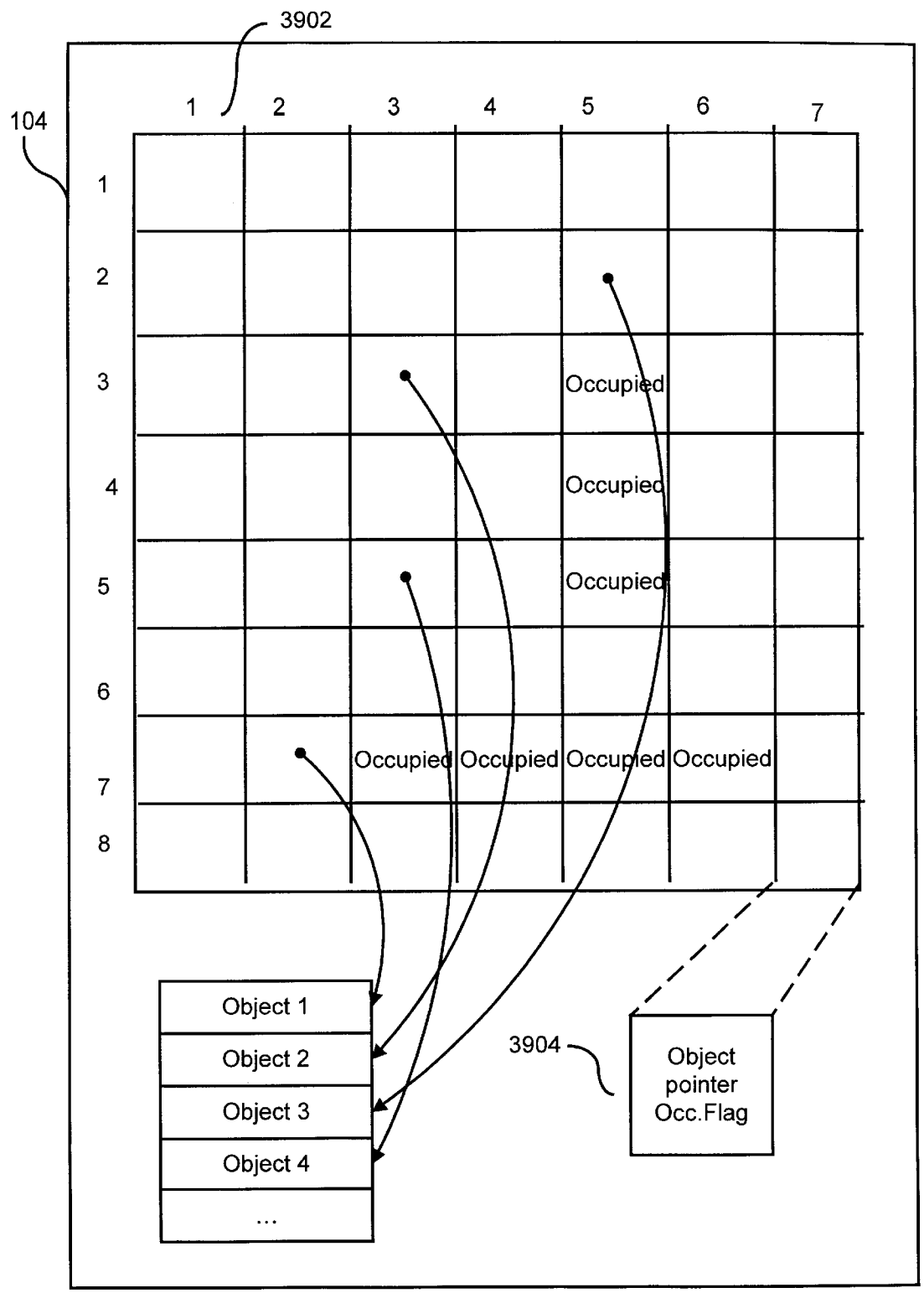
FIG. 39 is an example of a matrix generated by the steps of FIGS. 37 and 38.

FIG. 39 is an example of a matrix 3802 generated in accordance with the edges and draw objects. Matrix 3902 has a number of rows equal to the number of row edges plus one. The matrix has a number of columns equal to the number of column edges plus one. Thus, in the example, the matrix has seven columns and eight rows. Each element 3904 of the matrix has a pointer field and an occupied flag. The element of row 7, column 2 of the matrix points to object number 1 and is marked as occupied. The next four elements in row 2 are also marked as occupied. The element of row 3, column 3 points to object number 2 and is marked as occupied. The element of row 2, column 5 points to object number 3 and is marked as occupied. The next four elements in column 5 are also marked as occupied. The element of row 5, column 3 points to object number 4 and is marked as occupied.

FIG. 40 is a block diagram of how the matrix 3902 is used to generate an HTML table. The HTML table is used by a browser to display a portion of a page on display device 160 (such as a header, body, or a footer. (an alternate embodiment of the present invention creates a single table for each page of the site). Each element of the matrix is used to generate a cell in an HTML table (although some cells occupy more than one row or more than one column). For example, the matrix element in row 1, column 1 causes an empty table cell to be generated. Each row in the HTML table has a height in pixels that is equal to the height for that matrix row. Each cell in the HTML table has a width that is equal to the width of the matrix for that column.

As is known to persons of ordinary skill in the art, the cells in the table can be of varying sizes (i.e., can use the HTML tags "ROWSPAN" and "COLSPAN"). The matrix element in row 2, column 5 causes generates of a cell that spans four rows (ROWSPAN=4). The matrix element in row 7, column 2 causes generation of a cell that spans five column (COLSPAN=5).

Figure 41:
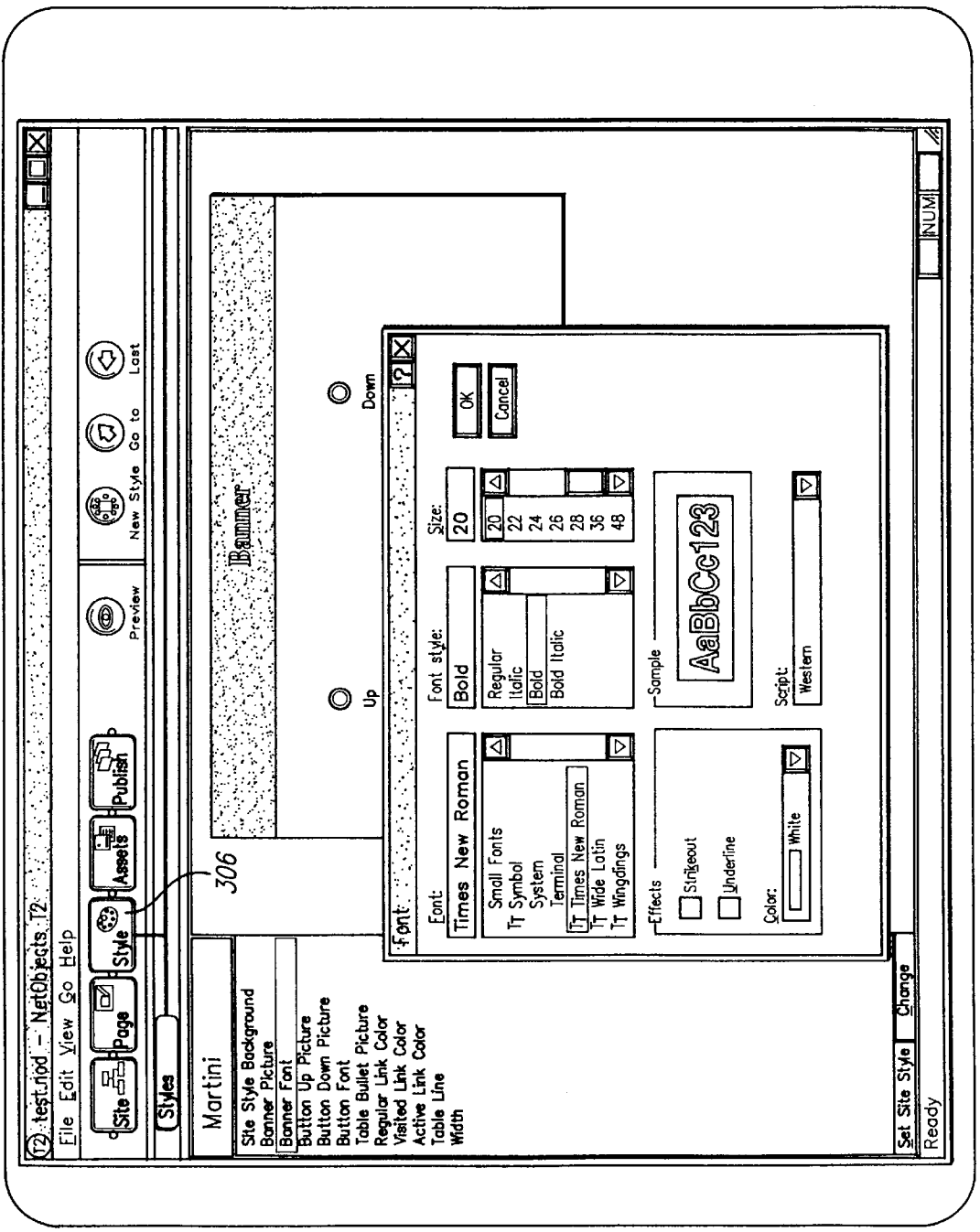
FIG. 41 shows an example of a Style display.

FIG. 41 shows an example of a Style display. The display of FIG. 41 is shown when the user selects Style button 306. The Style button display allows the user to select an overall default appearance of all pages in the site. The user can override the style for a given page by defining a different style for the page (not shown). In the described embodiment, the values shown in FIG. 41 are stored in locations of memory 104. The automatic generation of banners, navigation buttons, and text buttons is performed in accordance with user-specified style values.

Figure 42:
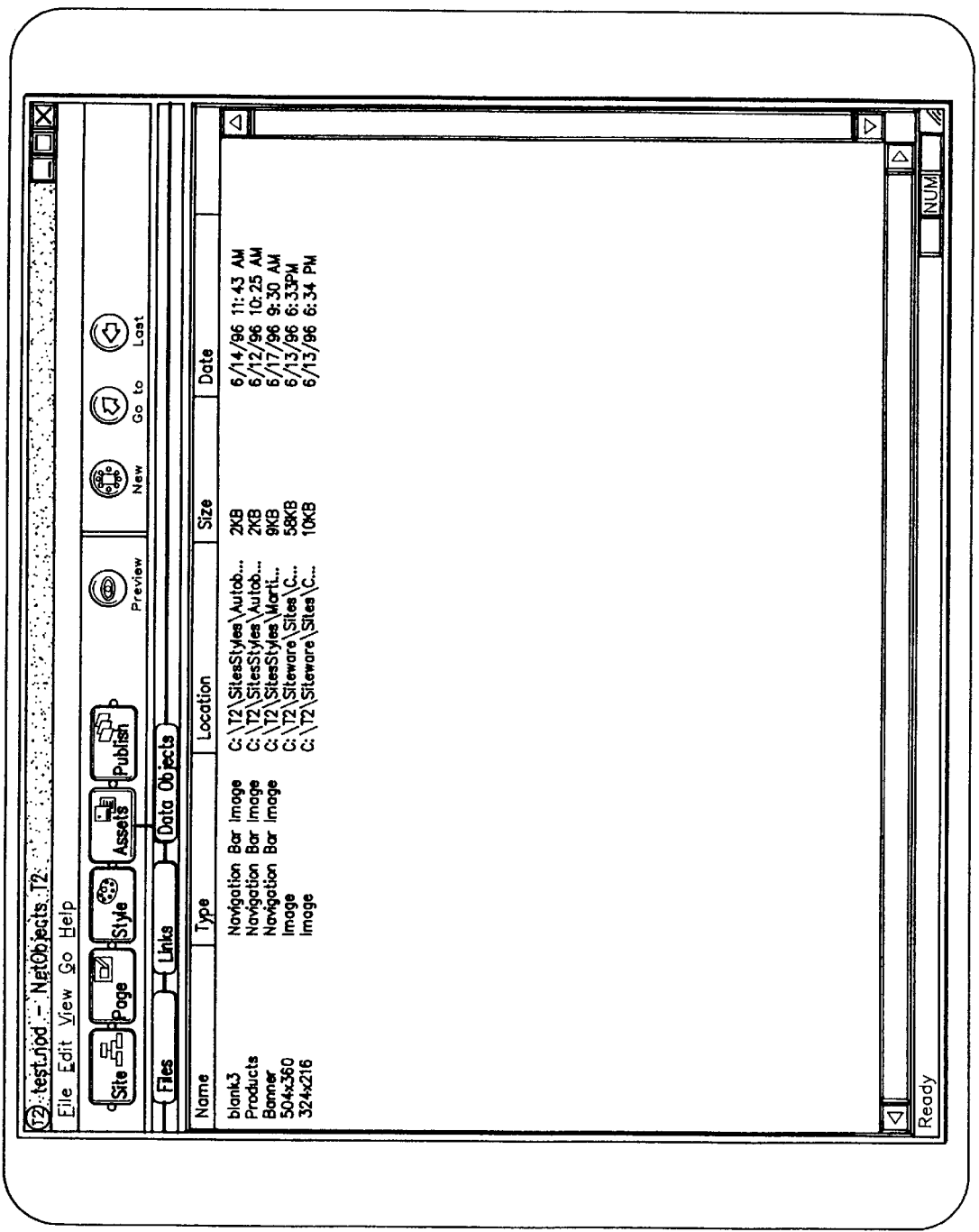
FIG. 42 shows an example of an Assets Display.

FIG. 42 shows an example of an Assets Display. The Assets display shows the files, links, and objects in the data processing system. For example, the assets shown in FIG. 42 are the draw objects for the "Products" page of FIG. 22.

FIG. 43 shows an example of a plurality of link dialog boxes, showing a structural link, an internal link, and an external link.

Figure 44:
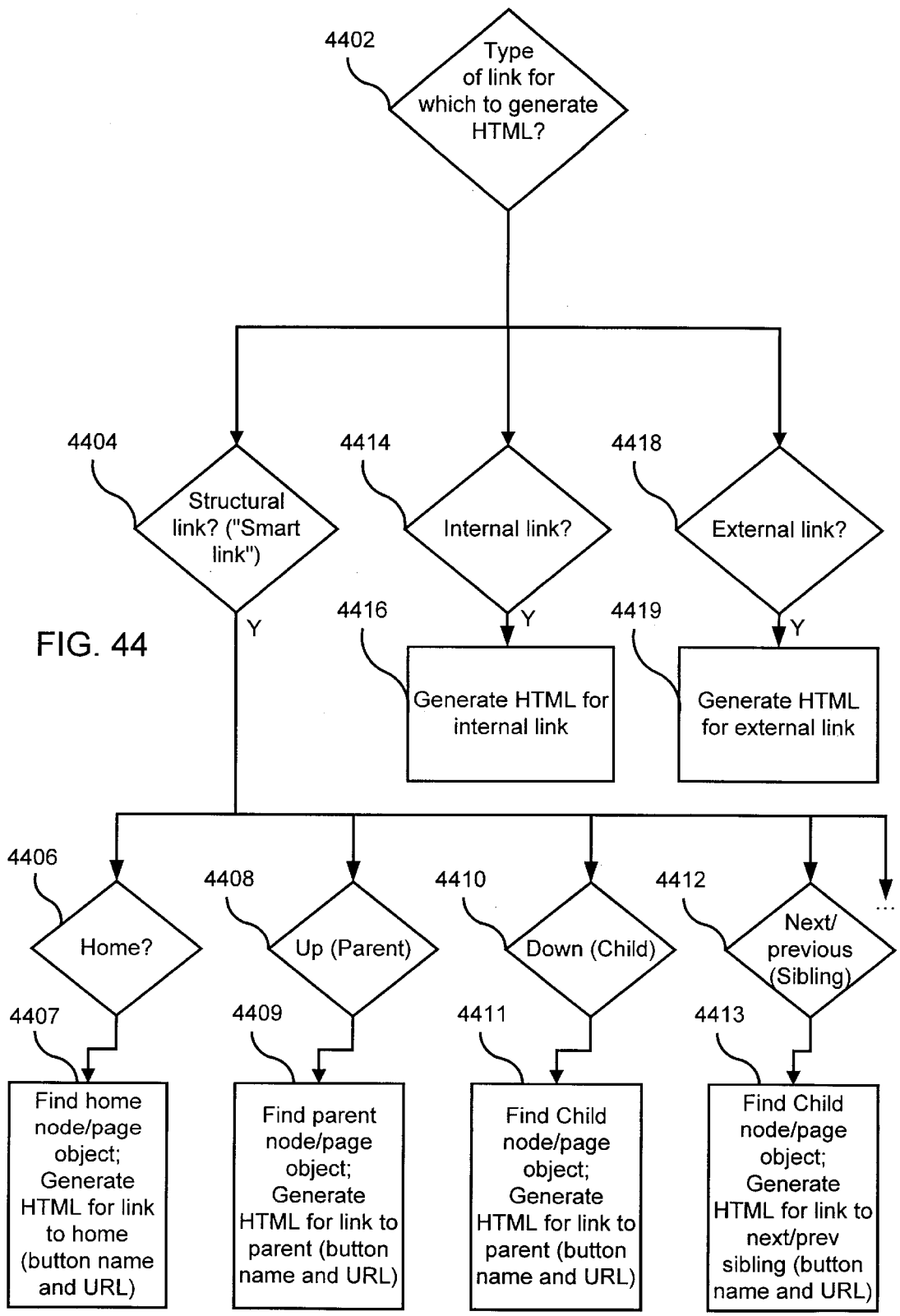
FIG. 44 is a flow chart showing identification of structural links for a page.

FIG. 44 is a flow chart showing identification of structural links for a page. The links preferably are identified when the page is displayed, previewed or published. Internal and external links are "absolute" links. Structural links are identified only as "next sibling link," "next child link", etc. For each link, the node-that-is-linked-to is identified by looking at the page hierarchy specified by the page layout tree. After the node is identified, the processor finds the URL, name, etc of the node and generates the display or HTML for the structural link.

In summary, the described embodiment of the present invention allows a user to define a hierarchy of pages for a Web Site. A structure editor in accordance with the present invention automatically creates page objects for each site that reflects the user-defined site hierarchy. Each page has an associated plurality of draw objects that define the display elements of the page. When the user "publishes" a page, the described embodiment generates HTML code for each page. Thus, even if the user never edits a page, and only creates a site hierarchy, each page will have an automatically created banner and automatically created links to other pages of the site. The links can be structural links (smart links), internal links, or external links. Moreover, the pages of the site conform to a user-specified style.

Other embodiments will be apparent to those skilled in the art from consideration of the specification and practice of the invention disclosed herein. It is intended that the specification and examples be considered as exemplary only, with a true scope of the invention being indicated by the following claims and equivalents.

```
/* NetObjects pictobj.h definition of piture object

*/ ifndef __PICTOBJ_H
define __PICTOBJ_H include "drawobj.h"
include "resource.h"
#include "DOFile.h"
#include "dlgbase.h"

class CModelessInsp;
class CHotSpot;
class CPictureGeneral;
class CDrawRect;

// flags for picture class
#define DRAW_NATURAL      1    //object not stretched
#define DRAW_STRETCHED    2    //object stretched to fit
#define DRAW_TILED        4    //objecxt tiled
#define DRAW_HOTSPOTON    16 // object has hot spots turned on
#define DRAW_H_ALIGN_LEFT 32       // alignment
#define DRAW_H_ALIGN_CENTER 64         // alignment
#define DRAW_H_ALIGN_RIGHT   128       // alignment
#define DRAW_V_ALIGN_TOP 256       // alignment
#define DRAW_V_ALIGN_CENTER    512       // alignment
#define DRAW_V_ALIGN_BOTTOM    1024 // alignment
#define DRAW_GIF_SOURCE       2048
#define DRAW_JPEG_SOURCE 4096
#define DRAW_UNKNOWN_SOURCE 8192
#define DRAW_GENERATEALWAYS 16384   // always rename and generate
this gif
define DRAW_DATAOBJECT       32768     // this is a data object // 'list' class for hot spots (requires afxtempl.h)
typedef CTypedPtrList<CObList, CHotSpot*> CHotSpotList;

class CDrawPicture : public CDrawRect
{
protected:

DECLARE_SERIAL(CDrawPicture);
    BOOL LoadBitmap();
    CDrawPicture();
public:

CDrawPicture(const CRect& position);
    ~CDrawPicture();
```

App A

```
        virtual void Serialize(CArchive &ar);
        //virtual void Serialize(CArchive& ar);
        virtual void    Draw(CDC* pDC,CLayoutView* pView,BOOL
bXorOutline = FALSE, CRect *pDrawRect = NULL);
                void TileBackGround(CDC* pDC,CLayoutView* pView,
CRect *pRect);

virtual BOOL   SetBitmap(const CPDString& aFileType =
cFILE_IMAGE_TYPE);   //does the file dialog etc.

BOOL           Changed(void);
        void           SetStretch(UINT);
        UINT           GetStretch();
        virtual CRect  GetImagePosition(CRect *position = NULL);

virtual CRect  GetImageSize();
        void           SizeToImage(CLayoutView *p);
        int                GetImageHandle(void) {return
m_ImageHandle;});
        long           ConvertImage(CPDString *theFileName,
CPDString * theFilePath);

BOOL           SetBitmap(const char *pStr, const CPDString&
aFileType = cFILE_IMAGE_TYPE);
        virtual   int       GetSourceType(void);
        virtual void       OnOpen(CLayoutView* pView);

CHotSpotList*  GetHotSpots() { return &m_objects; }
        virtual CDrawObj *RemoveChild(CDrawObj *obj);
        virtual void   AddChild(CDrawObj *obj);
        CHotSpot*      HotSpotAt(const CPoint& point,CLayoutView *
pView);
        CHotSpot*      HotSpotAt(const CRect& rect,CLayoutView *
pView);
        void           DeleteHotSpots(void);
        void           MakeChildrenFit(CRect *newPosition = NULL);
        virtual void   EndMove(CLayoutView* pView = NULL);
        virtual void   MoveChildren(CRect *lastPoistion = NULL,
CRect *newPosition = NULL); // offsets all childern difference of
last to new position
        void           MoveChildren(CPoint point);   // offsets all
children using point coords
        virtual        CDrawObj* FindChild(int id);
        virtual BOOL   mAutoGenerated();
        virtual int    HitTest(CPoint point, CLayoutView* pView,
BOOL bSelected);

void           SetHotSpotsOn(BOOL);
        BOOL           GetHotSpotsOn(void);

void           SetDataObjectOn(void) {m_PictureFlags |=
DRAW_DATAOBJECT; }
```

```
        virtual CDrawObj* Intersects(const CRect& rect,CLayoutView
*pView);

virtual void    AddPropPage(CObList&);

virtual   void AddProperties(CMenu *pPopup);

virtual BOOL    IsParent(void) {return TRUE;};
        virtual CDrawObj*  GetSelectedChild(void);
        virtual void    SetSelectedChild(CDrawObj *pObj, BOOL
set=TRUE);

virtual void    SaveUndo(CArchive&
ar,PROPERTY_TYPE,CLayoutView *pView);
        virtual void    LoadUndo(CArchive&
ar,PROPERTY_TYPE,CLayoutView *pView);
        virtual void    SetAssetInfo(PROPERTY_TYPE type = DRAWOBJ);
        virtual void    SetObjectData(void);

virtual   CDrawObj* Clone(CLayoutData *pLayoutData);

virtual   void SetInitialValue(CLayoutView*);
        virtual   BOOL DrawImageToMemory(CDC *);
        CString         m_csName;

int             m_PictureFlags;

CHotSpotList    m_objects;

void SetGenerateAlways(BOOL b = TRUE);

void            SetVAlignFlag(int);
        void            SetHAlignFlag(int);
        BOOL            HasPicture() {return m_pDIB != NULL;}
        void mGenerateHTML(CPDBuffer* theBuffer);

protected:

int             m_ImageHandle;
        char *             m_pDIB;
        BITMAPINFO *    m_biInfo;
        int                m_biWidth;
        int                m_biHeight;
        char *             m_biBits;

private:
        static    CPictureGeneral          *m_pPictureProp;

protected:

//{{AFX_MSG(CDrawPicture)
    afx_msg void OnPictureProperty();
    afx_msg void OnEditClear();
//}}AFX_MSG
```

```
    DECLARE_MESSAGE_MAP()
};

// PictureAlignment dialog class PictureAlignment : public CT2Dialog
{
// Construction
public:
    PictureAlignment(CWnd* pParent = NULL);   // standard
constructor CWnd *parentWnd;
    BOOL m_Cancel;
    UINT v;
    UINT h;
    DrawShape user;

void SetUser(DrawShape d) { user = d;}

// Dialog Data
    //{{AFX_DATA(PictureAlignment)
    enum { IDD = IDD_PICTURE_ALIGNMENT };
        // NOTE: the ClassWizard will add data members here
    //}}AFX_DATA // Overrides
    // ClassWizard generated virtual function overrides
    //{{AFX_VIRTUAL(PictureAlignment)
    protected:
    virtual void DoDataExchange(CDataExchange* pDX);    //
DDX/DDV support
    //}}AFX_VIRTUAL // Implementation
protected:

// Generated message map functions
    //{{AFX_MSG(PictureAlignment)
    virtual void OnOK();
    //}}AFX_MSG
    DECLARE_MESSAGE_MAP()
};

#endif //
__PICTOBJ_H///////////////////////////////////////////////////////
////////////////////////////
```

RICHTEXT.H

```c
// CDrawText - Text Object ifndef _CRICHTEXT_H__
define _CRICHTEXT_H__   //1 include "drawobj.h"

// General stuff
//////////////////////////////////////////////////////////////////
///////////////

// Tokens that we store in the token steam
// After a token there is potential more bytes and other tokens
// If this is the case then it is noted in the comments after the token
// All token take up 1 byte, Each item noted in [] take one byte // Note that all that contain data have a end token to enable backwards searching
typedef enum {
    T_TEXT = 0,        // Dummy token just use to communicate that its a text token
    T_NULL,            // Place holder to break up findtoken // Text formatting tokens turn on/off
    T_BOLDON,          // Bold
    T_BOLDOFF,
    T_ITALICON,        // Italics
    T_ITALICOFF,
    T_UNDERLINEON,     // underline
    T_UNDERLINEOFF,
    T_STRIKEOUTON,     // strikeout
    T_STRIKEOUTOFF,
    T_BLINKON,         // Blinking
    T_BLINKOFF,
    T_FIXEDON,         // Fixed pitch font
    T_FIXEDOFF,
    T_DUMMY1,          // Raw html code. Used to insert HTML code directly into the token stream // Text formatting with extra data
    T_FACE,            // Font face stored as T_FACE <name> T_FACE
    T_SIZE,            // Size of font; stored as T_SIZE [size] T_SIZE
    T_COLOR,           // Change to COLORREF color; stored as T_COLOR <COLORREF> T_COLOR
    T_HEADING,         // Heading marker; stored as T_HEADING [heading id] T_HEADING - should follow <P>
    T_PARAFMT,         // Formatting belonging to T_PARAGRAPH - stored as T_PARAFMT <ParaFormat> T_PARAFMT T_SYMBOL,          // Stores a symbol <T_SYMBOL> symbol value (int) <T_SYMBOL>
```

A5

```
      T_HTMLTAG,              // A HTML tag stored

// String flow control
      T_END,                  // End of text object
      T_NEWLINE,      // New line - still inside the paragraph
      T_PARAGRAPH,    // New paragraph
      T_SOFTNEWLINE,  // Soft end of line - autowrap symbol // Support for html links
      T_LINKNAME,     // Link name stored as T_LINKNAME <display
text T_LINKNAME2
      T_LINKNAME2,
      T_LINKURL,             // Link URL stored as T_LINKURL <url>
T_LINKURL2
      T_LINKURL2
} TokenTypes;

// Notes:
// T_COLOR:
//         The COLORREF is stored as 4 bytes. The maximum byte
that is normally 0x00 will be
//         0x00 when the color is reset back to the default color
defined for the view, In this case
//         the rest of the color is unused. When a color ride is
in effect the byte is 0x00.\
// T_PARAGRAPH: The line number is stored in the paragraph as
<P><#><P>
// T_SOFTNEWLINE: Only used for return in FindToken // Link should be stored as
// <T_LINK1> tokens <T_LINK2> URLStruct <T_LINK3> define OVERRIDE_OF( CR) *( ( (char*)  &(CR) )+3 )

define MAX_INDENT  31

// Alignment settings as they apply to one paragraph
typedef enum {
      AlignLeft = 0,
      AlignCenter,
      AlignRight
};

// Bullit types
typedef enum {
      Bull_None = 0,
      Bull_Bullit,
      Bull_Square,
      Bull_Disc,
      Bull_ABC,
      Bull_abc,
      Bull_III,
      Bull_iii,
      Bull_123,
```

```
    Bull_UnUsed,    // Used when promoting and demoting
paragraphs
};

// Pitchtype, used to select between the proportional and fixed
type font
typedef enum {
    Proportional,
    Fixed,
} PITCHTYPE;

// T_PARAFMT <ParagraphFormat> T_PARAFMT, size = 4 bytes
struct ParaFormat {
    unsigned short aAlign : 2;
    unsigned short iIndent : 5;   // [ 0 .. 31 ] levels
    unsigned short iBullit : 4;
    unsigned short iOrder : 10;        // Order item number
[0..1024[
    unsigned short bStart : 1;         // Special start value
for ordered lists
};

// Usage of the Font list
#define FONTINDEX_AUTOMATIC      0              // position of
the Automatic font
#define FONTINDEX_MAX            127

// The complete set of font settings as will be treated for text
object.
// These settings are at any given location applied to the
current setting
// in the global font setting.
struct FontAttrib {
    BYTE     rgbRed;               // 1 b
    BYTE     rgbGreen;             // 2 b
    BYTE     rgbBlue;              // 3b
    BOOL     bColorOverride : 1;   // Is the color currently
overridden
    short           iSize : 7;             // 4 b
    BOOL     bBold : 1;
    PITCHTYPE ptPitch : 3;
    BOOL     bItalic : 1;
    BOOL     bUnderline : 1;
    BOOL     bStrikeout : 1;
    BOOL     bBlink : 1;                   // 5 b
    BOOL     bURL : 1;             // Are we inside an URL
display string
    unsigned short iFontIndex : 7;         // 6 b
    ParaFormat     pf;                     // 10 b
};

// URL control structure
//////////////////////////////////////////////////////
// The URLStruct is stored between the LINK and URL
```

A7

```
struct URLStruct
{
    int    iJavaEventId;
};

class ExtFontAttrib{
    // Current attribute;
public:
    // Utility information
    CString      sHeading;
    int          iStyleIdx;
    URLStruct urlInfo;

FontAttrib   fAttrib;

// Functions
    int operator== (ExtFontAttrib &fs);
    ExtFontAttrib &operator= (ExtFontAttrib &fs);
};

// Search commands to the FindText function
#define FIND_HOME        1
#define FIND_END         2
#define FIND_PREVCHAR    3
#define FIND_NEXTCHAR    4
#define FIND_PREVWORD    5
#define FIND_NEXTWORD    6
#define FIND_PREVPARA    7
#define FIND_NEXTPARA    8
#define FIND_PREVLINE    9
define FIND_NEXTLINE    10 class CLayoutView;

define TALIGN_LEFT      0x01
#define TALIGN_CENTER    0x02
define TALIGN_RIGHT     0x04 struct FindReplaceData {
    int    iIndex;
    CFindReplaceDialog *pFRDlg;
    int    iFound1;
    int    iFound2;
    int    caret0, caret1;
    BOOL   bRewrapped;
};

// CDrawText
///////////////////////////////////////////////////////////////
///////////
struct CaretStruct
{
    BOOL      getIndex; // is index valid, if not then pos is
valid - calc index in UpdateCaret
```

A8

```
      int       index;        // index into m_text;
      BOOL      valid;        // if index set - status if its OK CPoint    pos;          // mouse pos, not maintained if
valid is TRUE
      int       height;       // height of character at
caret position - if
      CPoint    mousePos;
      BOOL      xset;
};

struct LineInfoStruct
{
public:
      int       width;        // width of text excl. the
space needed for indent or bullit
      int       height;
      int       base;
      CPoint    ul;           // Top left corner of the text
box, if bullit then its before the text box
      int       idxLine;      // Index into the text stream of
line. either point to <P> <BR> or to char that is first on
softbreak line
      FontAttrib fa;          // FontAttrib for the start of the
line after all heading and aling have been applied
      int       iStyleIdx;    // Index of the style used
      int       fFlags;       // Flags for the line
};

// Line flags
#define LINE_PARAGRAPH   0x0001        // Line is start of new
paragraph // Different hardcoded sizes that HTML assumes
define INDENT_SIZE      40    //700        // Total indent size define BULLIT_SIZE      30    //300        // Space for bullit define BULLIT_SPACE     6     //50         // Space after bullit and
before text // Minimum Wrap width accepted
define MIN_WIDTH        10

// Edit mode flags
#define EDIT_READONLY    0x00000001    // Field is
read-only - user may not change ny content - inspector is
disabled
#define EDIT_ASCIIFIELD  0x00000002    // Field may only
contain ascii string
#define EDIT_SINGLELINE  0x00000004    // User must not be
able to insert line break or paragraph // Undo information
```

A-9

```
enum UndoOp {
    OpInsert,       // Insert bytes into buffer
    OpDelete,       // Delete bytes from buffer
    OpCarets,       // Position carets
    OpAssign,       // assign single byte in buffer
    OpSetT_NULL,    // assign range to T_NULL
    OpMoveBytes,    // move range inside buffer
    OpAssignBytes,  // assign range of bytes in buffer
    OpRewrapAll,    // whole object should be rewrapped
};

struct UndoRecord {
    char nOpType;
    union {

// Used when inserting (OpInsert) or deleting
(OpDelete) bytes in the stream
        // and when setting bytes to T_NULL (OpSetT_NULL)
        // and when assigning a range of bytes (OpAssignBytes).

// and used for OpMoveBytes
        // When OpDelete it is followed by bytes deleted
        struct {
            unsigned short iNoBytes;
            unsigned short iIndex;
        } insdel;

// Used when position the carets
        struct {
            unsigned short index0;
            unsigned short index1;
        } caret;

// Used when []= assigning a single byte
        struct {
            unsigned short iIndex;
            char cOldByte;
        } assign;

} data;
};

#define UNDOBUFFER_INCREMENT        256         // increase buffer
increment
define UNDOBUFFER_MINSIZE                  UNDOBUFFER_INCREMENT define   MAX_FONT_LENGTH                   256         // Max
size for a font face name define PRIVATE_KEYSTATE    8 define MAX_TEXT                (65536 * 4)
define MAX_TEXT_EDIT           (MAX_TEXT - 1000)
```

```
#define WRAP_FIRSTLINE          0
#define WRAP_LASTLINE           MAX_TEXT
define WRAP_UNDEFINED          -1 extern BOOL IsChar( char c);
extern BOOL IsToken( char c);
extern BOOL WordDelimiter( char c);
extern BOOL HardLineDelimiter( char c);
extern BOOL LineDelimiter( char c);
extern BOOL ParaDelimiter( char c);
extern BOOL ParaFormatting( char c);
extern BOOL IsFormatToken( char c);
extern BOOL IsNonNormalizeToken( char c);
extern BOOL IsOrdered( int iType);
extern BOOL IsUnordered( int iType);
extern int TokenSize( int token, BOOL bForward);
extern int iT2clipbordFormat;
extern int iRTFclipboardFormat;

extern int m[];
extern int d[];

class CTextStyle;

// Class CDrawText
////////////////////////////////////////////////////////////////

//class CTextHTMLGenerator;

class CDrawText : public CDrawRect
{
        friend class CTextHTMLGenerator;

public:
        char        *m_text;
        int         m_nText;
        BOOL        bSelectAnchor;       // Are we currently
selecting using achor point
        static    CStringArray *m_FontFaceArray;   // Font face
list private:
        int         m_needsWrap;
        CPoint      m_LeftMargin;
        CPoint      m_RightMargin;
        int         m_clickCount;        //dont start edit mode
until second click CFont       *m_oldCFont;
        CFont       m_CFont;             //Active font, setup
during calls to gettextsegment
        int         m_iWrapIdx1;
        int         m_iWrapIdx2;
```

A11

```
    int     m_maxText;                    ///maximum allocated text int     m_insertIndex;

int     m_haveCaretAndHeight;
     int    m_iCaretWidth;

CRgn    *m_pRgnCaret;        //marked block

BOOL    m_setMouseXPos;

// For mouse selection
static CaretStruct  *m_pDblClick_Carets;      // contains dbl
marked selection while mouse is still down
static CaretStruct  *m_pTriClick_Carets;      // contains tri
marked selection while mouse is still down
static CaretStruct  *m_pClick_Carets;   // contains mouse marked
selection while mouse is still down
static BOOL m_bMDragOverride;           // Override that we must
NOT do word extension in single click draw select LineInfoStruct * m_lineInfo;   // display lines
    int   m_nLines;                // used lines in above
    int   m_maxLines;              // max no lines int   m_hMarg;
    int   m_vMarg;

static   CTextStyle    *m_pTextProp;       //property
sheet belonging to object
    static BOOL bReturnFirstPara;              //return a <P>
at start of data FindReplaceData
            *m_FindReplace;

BOOL    m_Transparent;       // Is the control
transparent
    BOOL    m_LockedSize;        // Is the text size
locked
    CSize   m_sizeLockSize;              // The locked size
    UINT    m_EditMode;                  // Edit mode flags COLORREF m_BackGroundColor;  // Background color when not
transparent char *m_pUndo;     // Undo record buffer
    int   m_nUndoLen;                    // length of under buffer int   m_iUndo;                // Next location in undo
buffer
    BOOL bRecordUndo;        // wheater to record or not in
::Insert and ::Delete
```

A12

```
    CaretStruct    m_caret[2];        //cursor/block location,
if postions are the same, no marking ExtFontAttrib
            m_FontSet;                 // Settings set
while gettextsegment traverses text
    ExtFontAttrib
            m_OldFontSet;      // Compare copy for
SelectFont int  m_TrueHeight;          //true height of text,
different than size when m_Locked is TRUE private:
    static COLORREF    m_TextColor;
    static COLORREF    m_TextLinkColor;

protected:
    DECLARE_SERIAL(CDrawText);
    CDrawText();

public:
    CDrawText(const CRect& position);
    ~CDrawText();
    virtual void Serialize(CArchive &ar);

virtual void AddProperties(CMenu *pPopup);
    virtual void Draw(CDC *pDC,CLayoutView* pView,BOOL
bXorOutline = FALSE, CRect *pDrawRect = NULL);
    virtual void MoveTo(const CRect& positon, CLayoutView* pView
= NULL,BOOL fAutosize = TRUE,BOOL fOutline = TRUE);

//property sheet support
    virtual void AddPropPage(CObList&);
    virtual void Select(CPoint p1, CPoint p2);
    virtual void KeyDown(UINT nChar, UINT nRepCnt, UINT nFlags);

virtual void CharDown(UINT nChar, UINT nRepCnt, UINT
nFlags);
    virtual void SysKeyUp(UINT nChar, UINT nRepCnt, UINT
nFlags);

virtual void StartMove( void);
    virtual void EndMove( CLayoutView *pView);

virtual void OnLButtonDown(CLayoutView* pView, UINT nFlags,
const CPoint& point);
    virtual void OnLButtonUp(CLayoutView* pView, UINT nFlags,
const CPoint& point);
    virtual void OnMouseMove(CLayoutView* pView, UINT nFlags,
const CPoint& point);
    virtual void OnLButtonDblClk(CLayoutView* pView, UINT
nFlags, const CPoint& point);
```

A13

```
    virtual void SaveUndo(CArchive& ar,PROPERTY_TYPE,CLayoutView
*pView);
    virtual void LoadUndo(CArchive& ar,PROPERTY_TYPE,CLayoutView
*pView);

virtual void mSynchronizeAssetNumbers();

BOOL virtual FindReplace( frOperations frOp, void *pData);

void Activate( TrackerState tsNewState = tsNormal);
    void Deactivate( TrackerState tsNewState = tsNormal);

virtual void SetFocus( void);
    virtual void KillFocus( void);

void GetText(char ** data, int * nData);
    void SetText(char * data, int nData);

void SetAsciiText(char *pString, BOOL bKeepFormat);
    char *GetAsciiText( void);

void mGenerateHTML(CPDBuffer* theBuffer);

void GetFont(ExtFontAttrib &fs, int iCaretIdx = -2);
    void SetFont(TokenTypes t_type);
    void SetFontAlignment( int iAlign);
    void SetFontBullit( int iBullit);
    void SetFontSize( int iSize);
    void SetFontColor( COLORREF *pColor);
    void SetFontFace( char *pFontFace);
    void ChangeIndent( int iChange);
    void SetSizeList( CComboBox *pComboBox, ExtFontAttrib& fs);

void SetBulletList( CComboBox *pComboBox, ExtFontAttrib&
fs);
    int FindFontIndex( char *pFontFace);
static void InitFontFaceArray( void);
static void SetFontFaceList( CComboBox *pComboBox);

void SetStyle( CString *psStyle);
    void ApplyURL(CString& sDisp, CString& sURL, char lToken,
char rToken,int iJavaEventId = 0);
    void SetURL( CString& sDisp, CString& sURL, BOOL bAddSpaces
= FALSE, int iJavaEventId = 0);
    BOOL GetURL( CString& sDisp, CString& sURL, int& link1, int&
link2, int& url1, int& url2, int& iJava);
    void UpdateURL( CString& sURL, int i1, int i2);
    void Unlink( int i1, int i2, int l1, int l2);
    BOOL GetSelectedText( CString& sText, int& i1, int& i2);

// Java event access functions
    int GetJavaEvent( void);
    BOOL SetJavaEvent( int iJavaEventId);
```

A14

```
    // External access methods
    COLORREF GetBackColor( void);
    void SetBackColor( COLORREF c);
    BOOL GetTransparent( void);
    void SetTransparent( BOOL t);
    BOOL GetLockedSize( void);
    void SetLockedSize( BOOL ls);
    BOOL IsStyleUsed( CString *psStyleName);
    void ResizeToOneLine( CLayoutView *pView, int iIndex = 0);
    void ResizeObject( CLayoutView *pView, int iX, int iY);
    void GetWordCounts( int *pLine, int *pPara, int *pWord, int
*pChars);
    UINT GetEditMode( void) {return m_EditMode;};
    void SetEditMode( UINT fFlags) {m_EditMode = fFlags;};

static void GetMinRect(CRect&);
    int  GetTrueHeight();

private:
    void CalcFontSizes( PITCHTYPE pt, int *pFontSizes);
    virtual BOOL HasFont() {return TRUE;}
    BOOL CreateFont( CFont& font, ExtFontAttrib& fs);
    void InitSelectFont( CDC *pDC);
    BOOL SelectFont(ExtFontAttrib& fs, CDC *pDC);
    void AsciiSelectAll( void);

void MouseSelectWord(CLayoutView* pView, UINT nFlags, const
CPoint& point);
    void MouseSelectParagraph(CLayoutView* pView, UINT nFlags,
const CPoint& point);
    void UpdateCarets( CLayoutView *pView);
    BOOL IsEmpty();

char NextChar(int& iStart);
    char PrevChar(int& iStart);
    BOOL FindStream( int& index, int where);
    void GetFontAtIndex(ExtFontAttrib &fs, int index);
    int GetParaFormat( int iLine);
    int FindFirstLineAtLevel( int iLine, int iLevel);
    void RewrapLevelAtLine( int iLine, int iLevel);
    void ApplyBulletToParagraphLevel( int iLine, int
iBulletType);
    void ApplyParaFormat( int iKind, int iValue);
    void ApplyIndentToParagraph( int iLine, int iChange);
    int ApplyStyleToPara( CString *psStyle, int iPara, BOOL
bRemoveFormatting);
    void ApplyStyle( CString *psStyle, BOOL bRemoveFormatting);

void SetSimpleType( char *token1, char *token2, int
iTokenSize1, int iTokenSize2, BOOL bSymetric = TRUE);
    void LineInfoUpdate( int iLocation, int nData);
    void Insert(int iIndex, const char * data, int nData);
    void Insert(int iIndex, char token);
    void Delete(int nData);
```

```
        void DelText(int index1, int index2, BOOL bPreserveTokens =
TRUE);
        void EnsureURLforDelete( int& idx1, int& idx2);
        BOOL DeleteSelection( void);
        int ExtractAsciiToBuffer( char *pText, int iIndex1, int
iIndex2, int iLen);
public:
        void Delete( int index, int count);
private:
        BOOL SkipJunk( int& index, BOOL bForward);

void UpdateCaret(char token, int iC, int nL, int iStart, int
nChars, CPoint gpos, CDC *pDC);
        void UpdateSelectRegion( CLayoutView* pView);
        void RemoveSelectRegion( CLayoutView* pView);
        void FreeSelectRegion( void);
        void InvertSelectRegion( CDC *pDC);

CRgn *GetSelectRegion( void);

void ScrollCaretIntoView( CLayoutView* pView, int iCaret);
        void UpdateWndCaret( CLayoutView* pView);
        void FreeWndCaret( CLayoutView* pView);

void UpdateMarking( CLayoutView *pView);
        void UpdateTextObject( CLayoutView *pView = NULL);

int FindMatchToken( char token, int& iSize, int iStart, int
iEnd);
        int CompressTokens( int idx1, int idx2);
        int NormalizeStream( int idx1, int idx2, int *piNewEnd);
        void Normalize( int idx1, int idx2);
        void Normalize( void);

void InitFontSet( ExtFontAttrib& fs);
        void InitFontSettings( void);
        void InitFindToken( BOOL bReturnFirstParagraph = FALSE);
        int FindToken( int& iStart, int *iText = NULL, int *iTextLen
= NULL, int iLineBreak = 0);
        BOOL FindText(int where);
        void Realloc(int reqSize);

// Wrap functions
        void AllWrapped( void);
        void RewrapParagraph( int iParaIdx);
        void Rewrap( int idx1, int idx2);
        void RewrapLines( int iLine1, int iLine2);
        void RewrapAll( void);
        void Wrap( CLayoutView *pView, CDC *pDCin = NULL);
        void SkipLineDelimiter( int& idx);

void SkipRTF();
        void SelectText( CPoint p1, CPoint p2 );
        void PositionIndex( int& index);
```

A16

```
    void PositionCaret( int idx);
    void PositionCarets( void);

int DocToClientToDoc( CDC *pDC, int iY);
    void DisplayBackground(CLayoutView* pView, CDC *pDC, CRect
*pDrawRect);
    void Display(CLayoutView* pView, CDC *pDC, CRect
*pDrawRect);
    void DisplayText(CDC *pDC, BOOL extentOnly, BOOL drawItAll);

void CommonInitialization();
    int EnsureCorrectForCopy( int& idx1, int& idx2);
    void EnsureCorrectStartMarking( int& si, int& ei);
    int GetSelection( int& si, int& ei);
    int InsertColorSize( FontAttrib& fa);
    int InsertSettings( FontAttrib& fa);
    char *MakeOnSettings( FontAttrib &fa, int *pLen, BOOL
bOnlyColorSize = FALSE);
    int CompressTNULLs( char *pTokens, int len, int idx1, int
idx2, BOOL bUpdateCaret);
    void CompressTNULLs( void);
    void ClearRegion( int& idx1, int& idx2);
    void EnsureURLforCopy( int& idx1, int& idx2);
    void RemoveURLs( char *pToken, int len);
    void InvalidateLines( int iFirstLine, int iLastLine);
    void InvalidateLine( int iLine);
    int GetLineFromIndex( int index);
    void InvalidateRange( int idx1, int idx2);
    void InvalidateSelection( void);
    void InvalObjAndParent( CLayoutView *pView, BOOL bErase =
TRUE);

// Undo buffer functions
    void InitUndo( void);
    void AllocUndo( int iNeeded);
    void RecordUndo( UndoOp opCode, int iInt1, int iInt2, void
*pBytes = NULL);
    void FreeUndo( void);
    void EmptyUndo( void);
    void MarkUndo( void);
    void Undo( void);
    void RecordCarets( void);
    void RecordRewrapAll( void);
    void AssignTokenUndoable( int iIndex, char cNewValue);
    void AssignTokensUndoable( int iIndex, int iNoBytes, char
*pData);
    void SetT_NULLundoable( int iIndex, int iNoBytes);
    void MoveTokensUndoable( int iDest, int iSrc, int iSize);
    void OnPreUndo(void *pObj);

private:
    void MoveDelete( int iKind);
```

A17

```
        BOOL FindMatch( BOOL bCaseSensitive, int iStart, int iLen,
LPCSTR pTarget, int &iNext);
        BOOL Find( void);
        BOOL Replace( void);
        BOOL nextFindReplace(CLayoutView *pView, frOperations frOp,
int& iReplace);

protected:
        //{{AFX_MSG(CDrawText)
        afx_msg void OnTextProperty();
        afx_msg void OnEditCut();
        afx_msg void OnEditCopy();
        afx_msg void OnEditPaste();
        afx_msg void OnEditSelectAll();
        afx_msg void OnEditClear();
        afx_msg void OnToolsPromote();
        afx_msg void OnToolsDemote();
        afx_msg void OnToolsWordCount();
        afx_msg void OnToolsInsertSymbol();
        afx_msg void OnToolsListStart();
        afx_msg void OnUpdateToolsListStart(CCmdUI* pCmdUI);
        afx_msg void OnUpdateEditCut(CCmdUI* pCmdUI);
        afx_msg void OnUpdateEditCopy(CCmdUI* pCmdUI);
        afx_msg void OnUpdateEditPaste(CCmdUI* pCmdUI);
        afx_msg void OnUpdateEditSelectAll(CCmdUI* pCmdUI);
        afx_msg void OnUpdateEditClear(CCmdUI* pCmdUI);
        afx_msg void OnStyleChanged(void *pObj);
        afx_msg void OnRecalc(void *pObj);
        afx_msg void OnInitialUpdate(void *pObj);
        //}}AFX_MSG
        DECLARE_MESSAGE_MAP()
};

//#define COLOR_LINK      RGB(0,0,255)
//#define COLOR_RAWHTML   RGB(255, 0, 0)
#endif
```

What is claimed is:

1. A method of allowing a user to define a World Wide Web site having a plurality of pages with a hierarchical organization comprising the steps, performed by a data processing system, of:

displaying a hierarchical representation of icons, wherein the hierarchy of the page icons reflects the hierarchical organization of the pages;

receiving an indication that the user has added an icon to the screen display, the icon representing a new page at a position in the hierarchical organization; and altering at least one link in the hierarchical organization of the World Wide Web site to add the new page to the Word Wide Web site in accordance with the position of the new page in the hierarchical organization.

2. The method of claim 1, wherein the step of altering the hierarchical organization includes the step of:

automatically creating in the memory a layout data structure for the new page, the layout data structure having a link in accordance with the position of the new page in the hierarchical organization.

3. The method of claim 2 where the link is a URL pointing to one of the plurality of pages.

4. The method of claim 2, wherein the link references a parent page of the new page.

5. The method of claim 2, wherein the link references a sibling page of the new page.

6. The method of claim 2, wherein the link references a child page of the new page.

7. The method of claim 2, wherein the link references a homepage of the hierarchical organization.

8. The method of claim 2, wherein the step of automatically creating in the memory a layout data structure for the new page includes the step of:

creating a draw object for the new page, where the draw object describes a navigator button having a link to another page in the hierarchical organization.

9. The method of claim 2, wherein the step of automatically creating in the memory a layout data structure for the new page includes the step of:

creating a draw object for the new page, where the draw object describes a text button having a link to another page in the hierarchical organization.

10. The method of claim 2, further comprising the step of:

automatically creating in the memory a layout data structure for the new page, where the layout data structure describes a banner for the new page.

11. The method of claim 2, wherein the step of automatically creating in the memory a layout data structure for the new page includes the step of creating a layout data structure representing at least a header, a body, and a footer of the new page.

12. The method of claim 1, wherein the step of receiving an indication that the user wants to add a new page includes the step of:

receiving an indication that the user has selected a "New Page" button displayed on a display device.

13. The method of claim 1, wherein the step of altering the hierarchical organization includes the step of:

adding a page data structure for the new page to a tree of other page data structures in memory reflecting the hierarchical organization, where the page data structure is added in accordance with the position of the new page in the hierarchical organization.

14. The method of claim 13, wherein the step of adding a page data structure for the new page to a tree of other page data structures reflecting the hierarchical organization includes the step of:

inserting a page object into a tree structure of page objects, each page object corresponding, respectively, to a one of the plurality of pages.

15. The method of claim 1, further comprising the steps of:

displaying an alternate view of the structure of the hierarchical organization of the site via an outline view of the hierarchical organization; and allowing the user to restructure the hierarchical organization of the site by dragging and dropping icons in the outline view.

16. A method of allowing a user to define a World Wide Web site having a plurality of pages with a hierarchical organization comprising the steps, performed by a data processing system, of:

displaying a plurality of page icons in a hierarchical fashion, on a display device where the hierarchy of the page icons reflects the hierarchical organization of the pages;

receiving an indication that the user has dragged a first one of the page icons from an old position to a new position;

receiving an indication that the user wants to move the page corresponding to the first page icon to the new position;

removing the first page icon from the old position on the display device; and displaying the first page icon at the new position.

17. The method of claim 16, wherein a draw object for a link in the moved page automatically changes to reflect the new position of the moved page.

18. The method of claim 16 wherein a draw object for a link in the parent of the moved page automatically changes to reflect the new position of the moved page.

19. The method of claim 16, wherein a draw object for a link in the sibling of the moved page automatically changes to reflect the new position of the moved page.

20. The method of claim 16, further comprising the step of:

moving a page object, corresponding to the first page icon, within a tree data structure in memory in accordance with the new position of the first page icon.

21. The method of claim 16, further comprising the step of:

displaying, before the page is added, an indicator on a second page icon on the display screen, indicating where the first page icon would be added in the hierarchical organization.

22. The method of claim 16, further comprising the steps of:

displaying an alternate view of the structure of the hierarchical organization of the site via an outline view of the hierarchical organization; and allowing the user to restructure the hierarchical organization of the site by dragging and dropping icons in the outline view.

23. A method of allowing a user to define a World Wide Web site having a plurality of pages with a hierarchical organization comprising the steps, performed by a data processing system, of:

displaying a plurality of page icons on a display device in a hierarchical fashion, where the hierarchy of the page icons reflects the hierarchical organization of the pages;

receiving an indication that the user has selected a page icon;

receiving an indication that the user wants to add a new page as a child of the selected page icon;

displaying a page icon corresponding to the new page as a child of the selected page icon and altering the hierarchy of the web site in accordance with the displayed hierarchy of web pages.

24. The method of claim 23, further comprising the step of;

adding a draw object for a hypertext link to a parent page of the new page.

25. The method of claim 23, wherein a draw object in a parent page of the new page automatically adds a hypertext link to the new page.

26. The method of claim 23, wherein a draw object in a sibling page of the new page automatically adds a hypertext link to the new page.

27. The method of claim 23, further comprising the steps of:

displaying an alternate view of the structure of the hierarchical organization of the site via an outline view of the hierarchical organization; and allowing the user to restructure the hierarchical organization of the site by dragging and dropping icons in the outline view.

28. A computer program product, comprising:

a computer usable medium having computer readable code embodied therein for allowing a user to define a World Wide Web site having a plurality of pages with a hierarchical organization, the computer program product including:

computer readable program code devices configured to cause a computer to effect receiving an indication that the user wants to add a new page at a position in the hierarchical organization; and computer readable program code devices configured to cause a computer to effect altering at least one link in the hierarchical organization of the World Wide Web site to add the new page to the Web site in accordance with the position of the new page in the hierarchical organization.

29. The computer program product of claim 28, wherein the computer readable program code devices for altering include:

computer readable program code devices configured to cause a computer to effect adding a page data structure for the new page to a tree of other page data structures reflecting the site hierarchical organization, where the page data structure is added in accordance with the position of the new page in the hierarchical organization.

30. The computer program product of claim 28, wherein the computer readable program code devices for altering include:

computer readable program code devices configured to cause a computer to effect automatically creating in the memory a layout data structure for the new page, the layout data structure having a link in accordance with the position of the new page in the hierarchical organization.

31. The computer program product of claim 30, wherein the program code devices configured to automatically create a layout data structure for the new page include:

computer readable program code devices configured to cause a computer to effect creating a layout data structure representing at least a header, a body, and a footer of the new page.

32. The computer program product of claim 28, further comprising:

computer program code devices causing a computer to effect displaying an alternate view of the structure of the hierarchical organization of the site via an outline view of the hierarchical organization; and computer program code devices causing a computer to effect allowing the user to restructure the hierarchical organization of the site by dragging and dropping icons in the outline view.

33. A computer program product, comprising:

a computer usable medium having computer readable code embodied therein for allowing a user to define a World Wide Web site having a plurality of pages with a hierarchical organization, the computer program product including:

computer readable program code devices configured to cause a computer to effect displaying a plurality of page icons in a hierarchical fashion on a display device, where the hierarchy of the page icons reflects the hierarchical organization of the pages;

computer readable program code devices configured to cause a computer to effect receiving an indication that the user has dragged a first one of the page icons from an old position to a new position;

computer readable program code devices configured to cause a computer to effect receiving an indication that the user wants to move the page corresponding to the first page icon to the new position;

computer readable program code devices configured to cause a computer to effect removing the first page icon from the old position on the display device; and computer readable program code devices configured to cause a computer to effect displaying the first page icon at the new position.

34. The computer program product of claim 33, further comprising:

computer readable program code devices configured to cause a computer to effect moving a page object, corresponding to the moved page icon, within a tree data structure in accordance with the new position of the first page icon.

35. The computer program product of claim 33, further comprising:

computer program code devices causing a computer to effect displaying an alternate view of the structure of the hierarchical organization of the site via an outline view of the hierarchical organization; and computer program code devices causing a computer to effect allowing the user to restructure the hierarchical organization of the site by dragging and dropping icons in the outline view.

36. A method of adding a new page at a predetermined hierarchical position in a multipage hierarchy in a World Wide Web site, comprising the steps, performed by a data processing system, of:

adding a new page data structure for the new page to a tree of page data structures of the existing pages in the multipage hierarchy, the position of the new page data structure in the tree being determined from the position of the new page in the multipage hierarchy; and creating a layout data structure for the new page having a link to another page defined by the position of the new page in the multipage hierarchy.

37. The method of claim 36, wherein the step of creating a layout data structure for the new page includes the step of creating a layout data structure representing at least a header, a body, and a footer of the new page.

38. The method of claim 36, further comprising the steps of:

displaying an alternate view of the structure of the hierarchical organization of the site via an outline view of the hierarchical organization; and allowing the user to restructure the hierarchical organization of the site by dragging and dropping icons in the outline view.

39. A computer data signal embodied in a carrier wave and representing sequences of instructions which, when executed by a processor, cause said processor to allow a user to define a World Wide Web site having a plurality of pages with a hierarchical organization, by performing the steps of:

receiving an indication that the user has added an icon to a hierarchically organized display screen, the icon representing a new page at a position in the hierarchical organization corresponding to a position on the hierarchically organized display screen; and altering at least one link in the hierarchical organization of the World Wide Web site to add the new page to the World Wide Web site in accordance with the position of the new page in the hierarchical organization.

40. The computer data signal of claim 39, wherein the step of altering the hierarchical organization of the World Wide Web site to add the new page to the World Wide Web site includes:

adding a page data structure for the new page to a tree of other page data structures in memory reflecting the hierarchical organization, where the page data structure is added in accordance with the position of the new page in the hierarchical organization.

41. The computer data signal of claim 39, wherein the step of altering the hierarchical organization of the Web site to add the new page to the Web site includes:

automatically creating in the memory a layout data structure for the new page, the layout data structure having a link in accordance with the position of the new page in the hierarchical organization.

42. The computer data signal of claim 41 where the instructions of the automatically creating step include instructions that perform the step of automatically creating a link that is a URL pointing to one of the plurality of pages.

43. The computer data signal of claim 41, wherein the step of automatically creating in the memory a layout data structure for the new page includes the step of creating a layout data structure representing at least a header, a body, and a footer of the new page.

44. The computer data signal of claim 39, further comprising instructions that perform the steps of:

displaying an alternate view of the structure of the hierarchical organization of the site via an outline view of the hierarchical organization; and allowing the user to restructure the hierarchical organization of the site by dragging and dropping icons in the outline view.

45. A computer data signal embodied in a carrier wave and representing sequences of instructions which, when executed by a processor, cause said processor to allow a user to define a World Wide Web site having a plurality of pages with a hierarchical organization, by performing the steps of:

displaying a plurality of page icons on a display device in a hierarchical fashion, where the hierarchy of the page icons reflects the hierarchical organization of the pages;

receiving an indication that the user has selected a displayed page icon;

receiving an indication that the user wants to add a new page as a child of the selected page icon;

displaying a page icon corresponding to the new page as a child of the selected page icon and altering the hierarchy of the web site in accordance with the displayed hierarchy of web pages.

46. The computer data signal of claim 45, wherein the instructions further comprise instructions that perform the step of adding, for a draw object in a parent page of the new page, a hypertext link to the new page.

47. The computer data signal of claim 45, wherein the instructions further comprise instructions that perform the step of adding, for a draw object in a sibling page of the new page, a hypertext link to the new page.

48. The computer data signal of claim 45, further comprising instructions that performs the steps of:

display the alternate view of the structure of the hierarchical organization of the site via an outline view of the hierarchial organization; and allowing the user to restructure the hierarchial organization of the site by dragging and dropping icons in the outline view.

* * * * *